Figure 1:
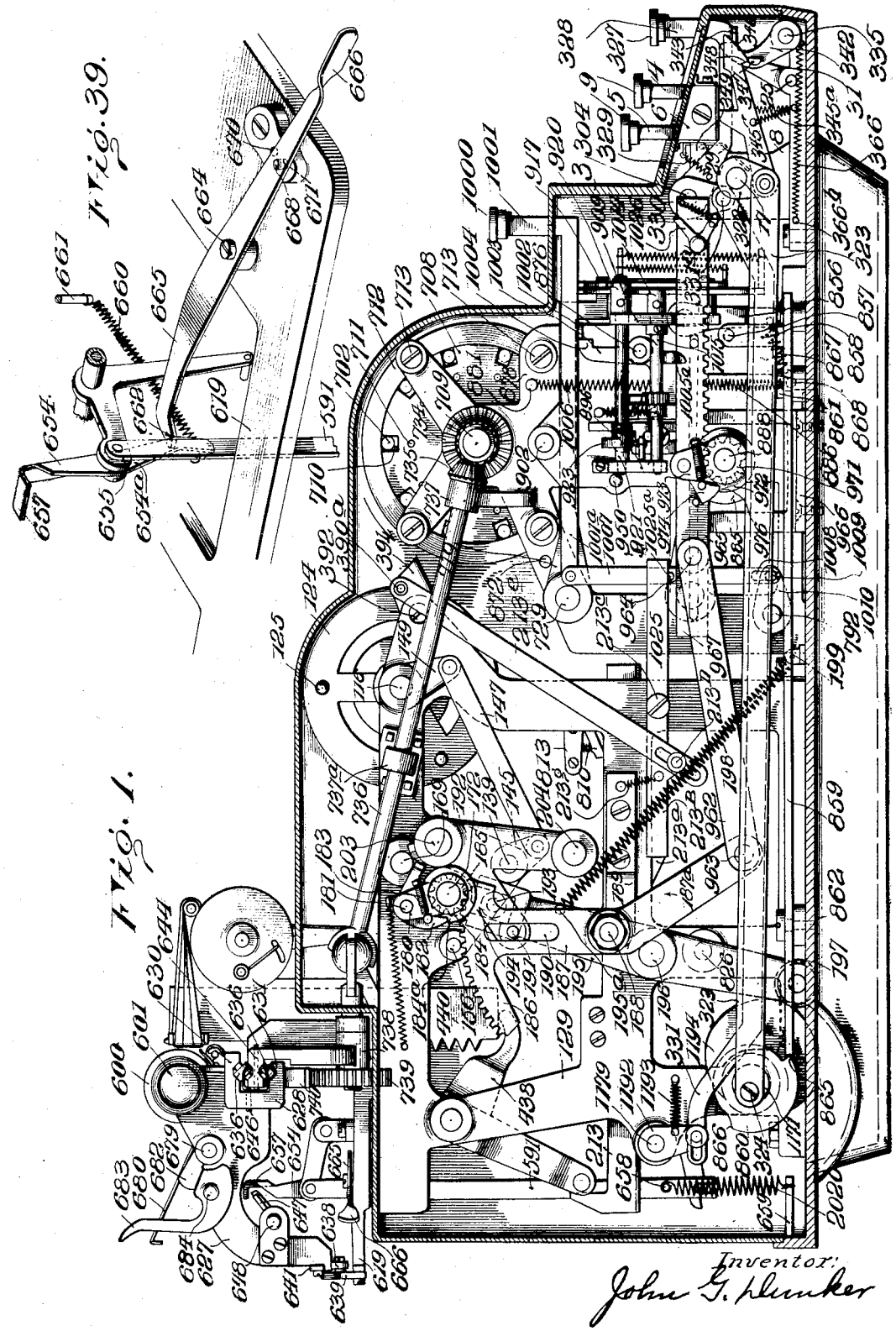

March 14, 1933. J. G. DUNKER 1,901,152
CALCULATING MACHINE
Filed March 23, 1915 24 Sheets-Sheet 1

Inventor:
John G. Dunker

March 14, 1933.  J. G. DUNKER  1,901,152

CALCULATING MACHINE

Filed March 23, 1915   24 Sheets-Sheet 5

Fig. 5.

March 14, 1933.  J. G. DUNKER  1,901,152
CALCULATING MACHINE
Filed March 23, 1915  24 Sheets-Sheet 6
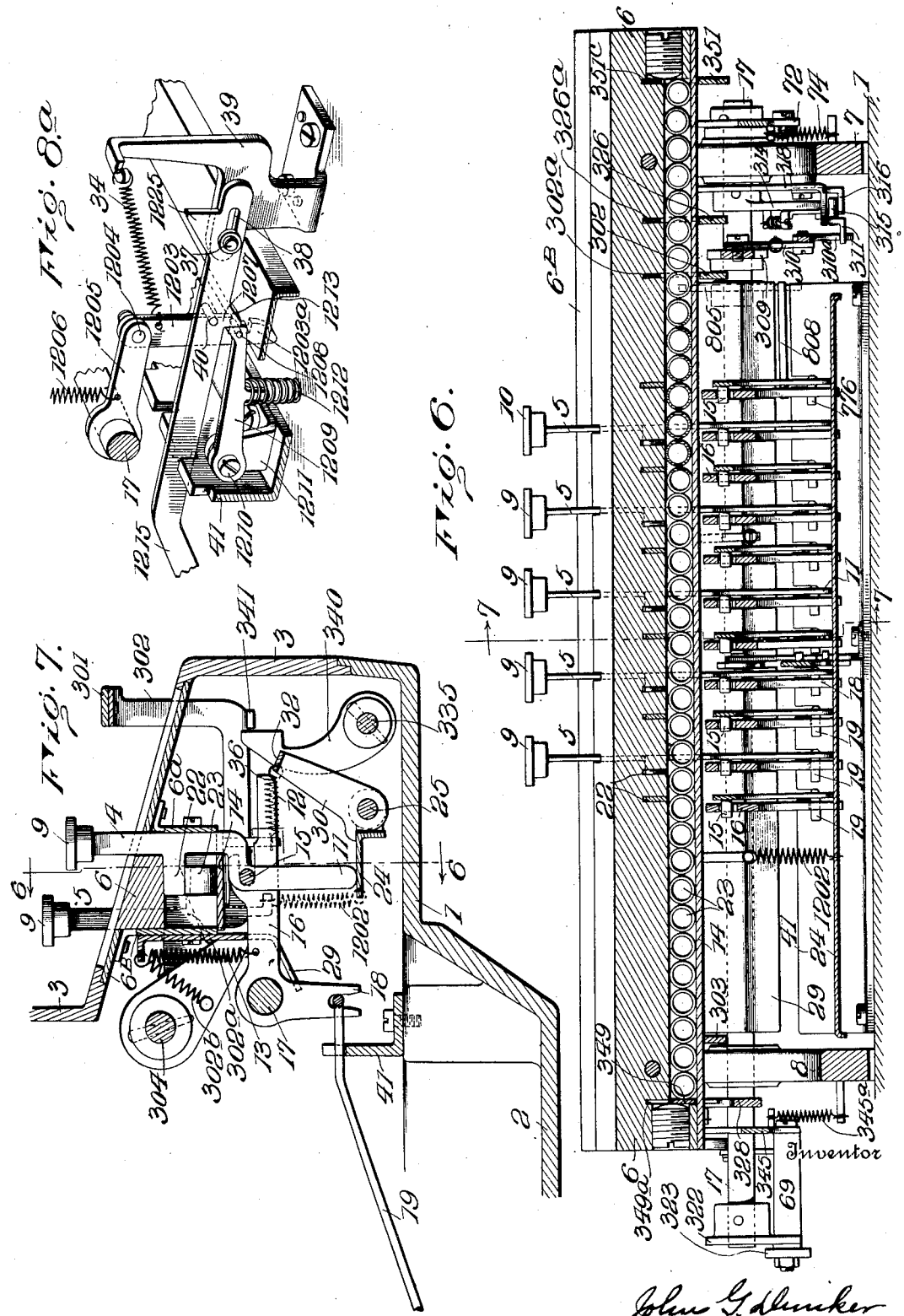

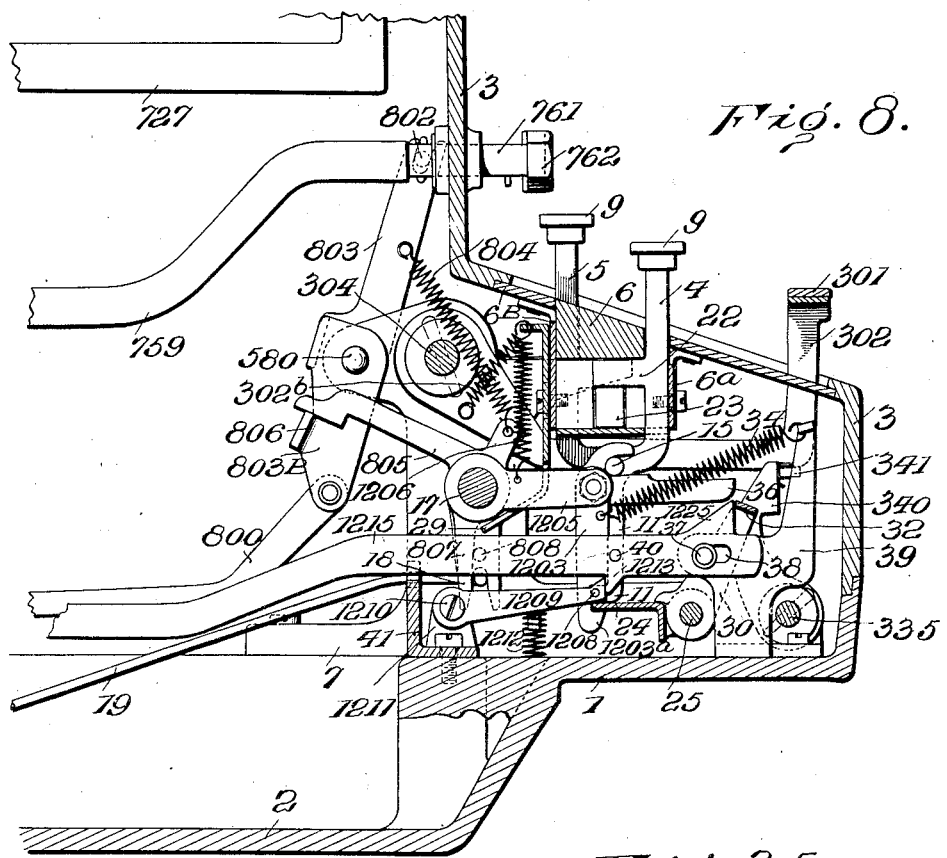

March 14, 1933.  J. G. DUNKER  1,901,152
CALCULATING MACHINE
Filed March 23, 1915    24 Sheets-Sheet 8
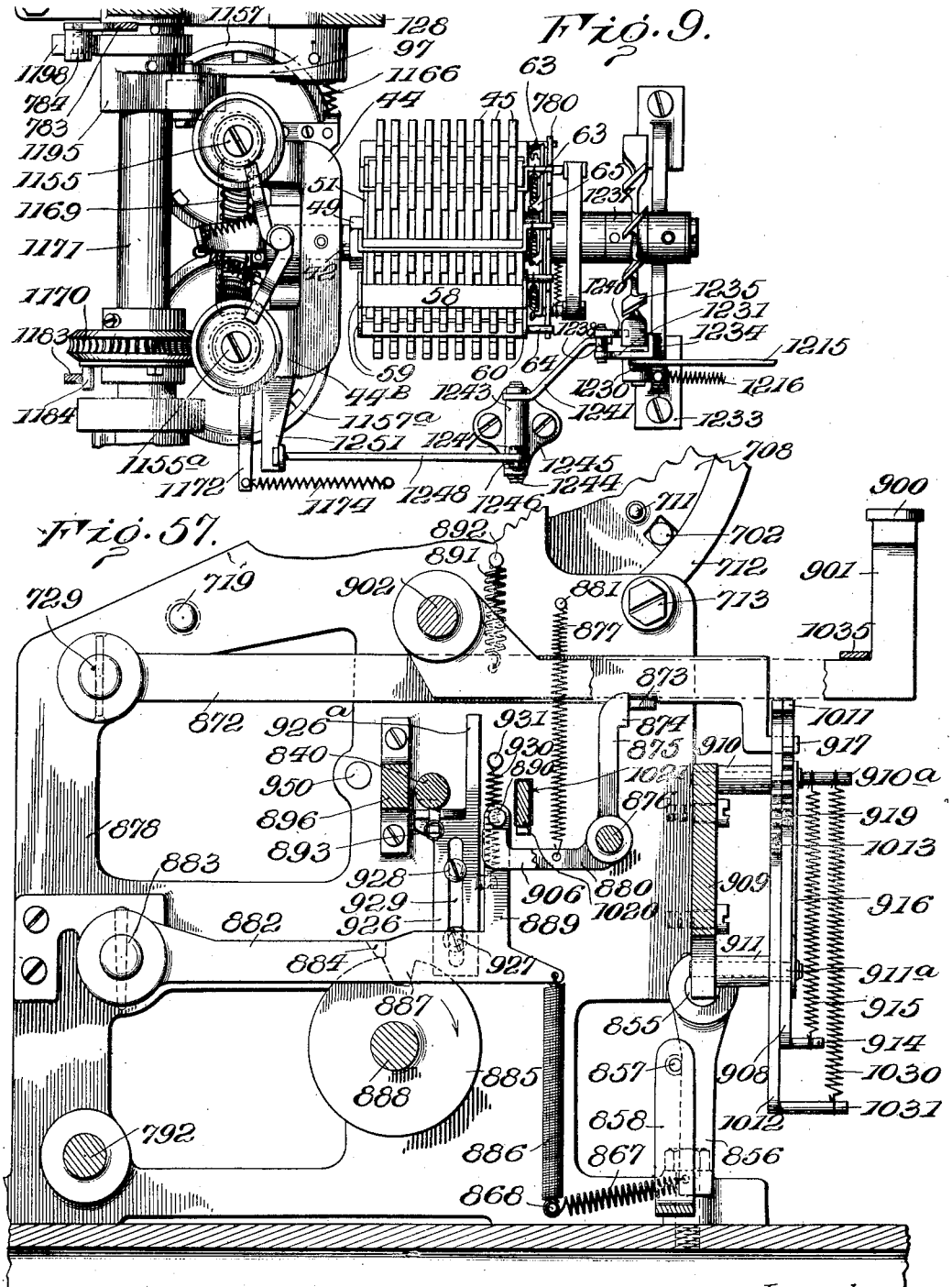

March 14, 1933. J. G. DUNKER 1,901,152
CALCULATING MACHINE
Filed March 23, 1915 24 Sheets-Sheet 9
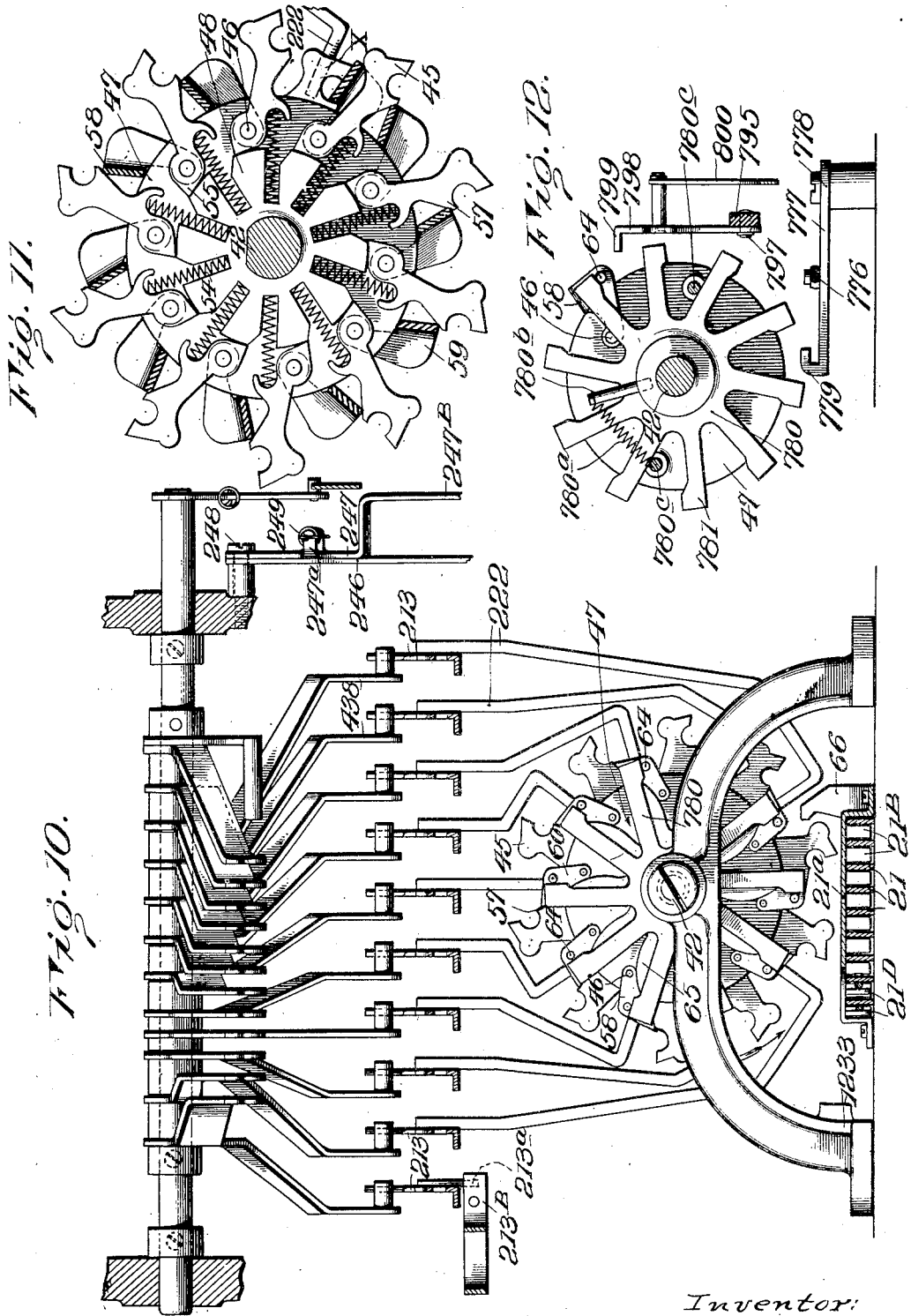
Inventor:
John G. Dunker March 14, 1933. J. G. DUNKER 1,901,152
CALCULATING MACHINE
Filed March 23, 1915 24 Sheets-Sheet 10
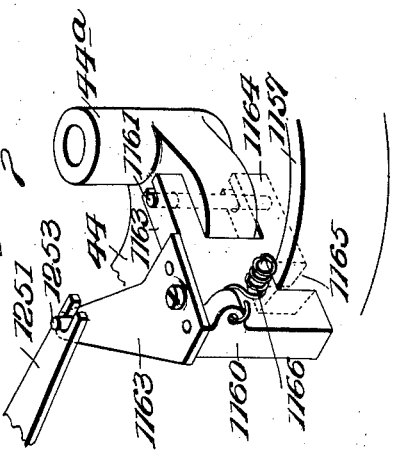
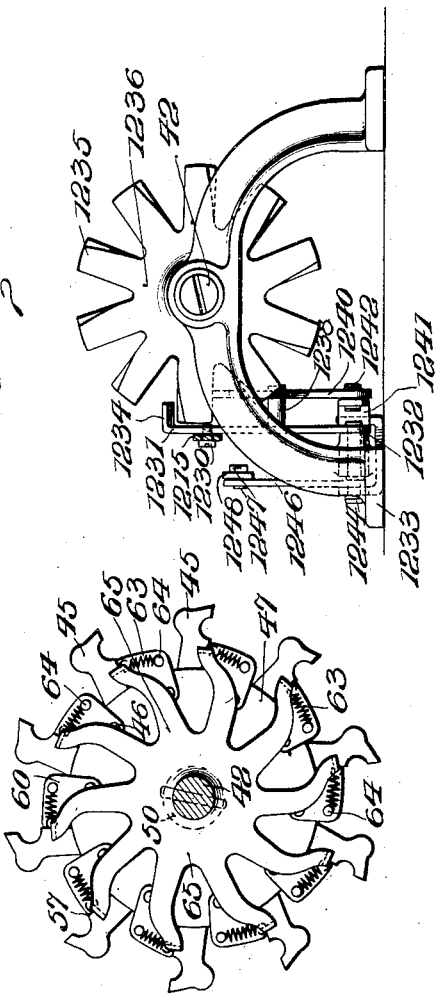
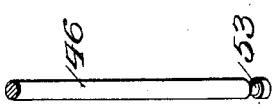
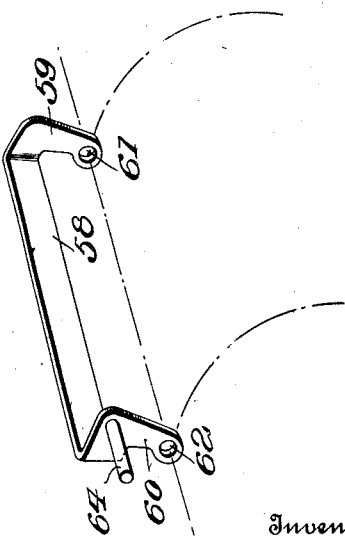
Inventor
John G. Dunker March 14, 1933.  J. G. DUNKER  1,901,152
CALCULATING MACHINE
Filed March 23, 1915   24 Sheets-Sheet 11
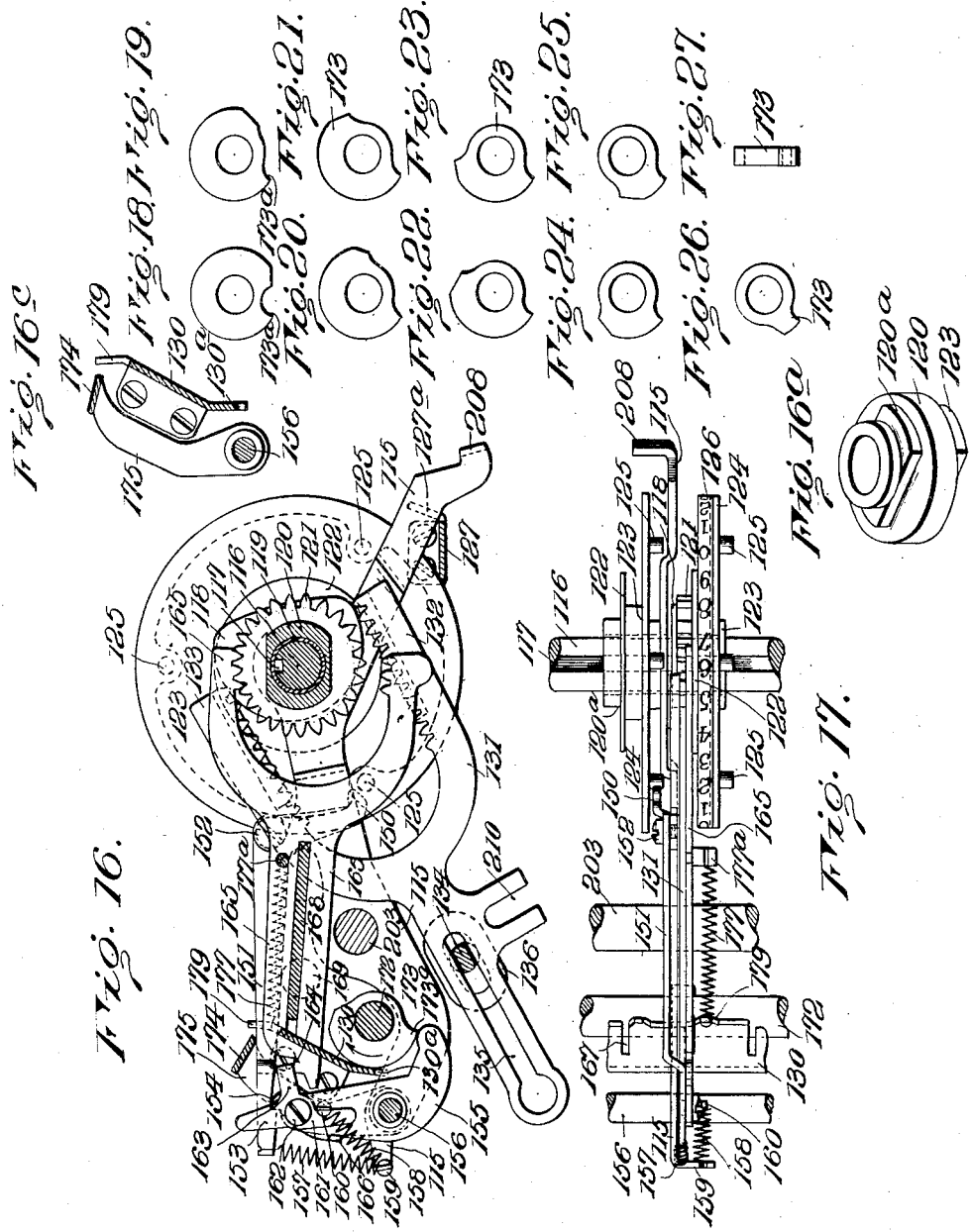
Inventor
John G. Dunker March 14, 1933. J. G. DUNKER 1,901,152
CALCULATING MACHINE
Filed March 23, 1915 24 Sheets-Sheet 12
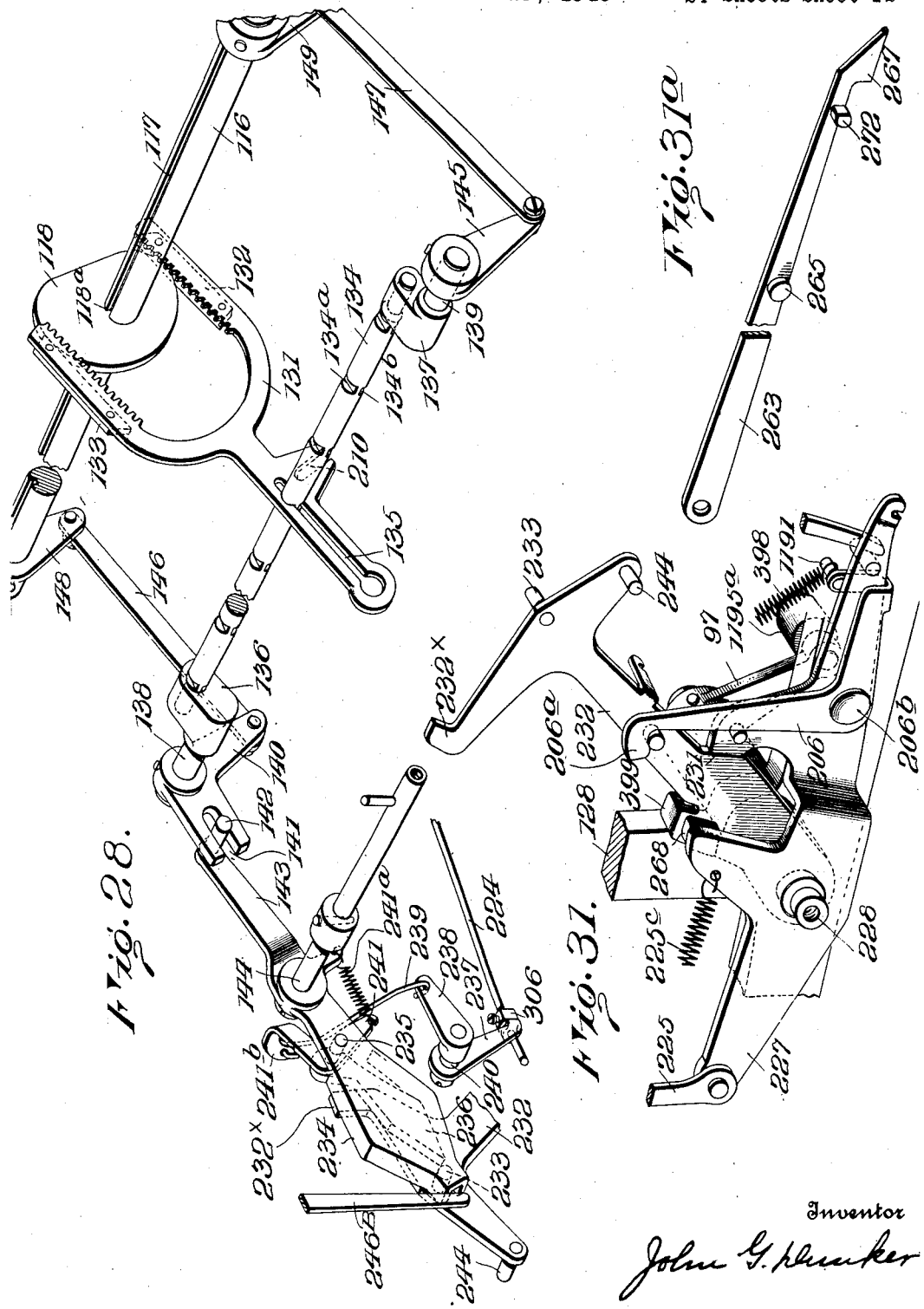
Inventor
John G. Dunker

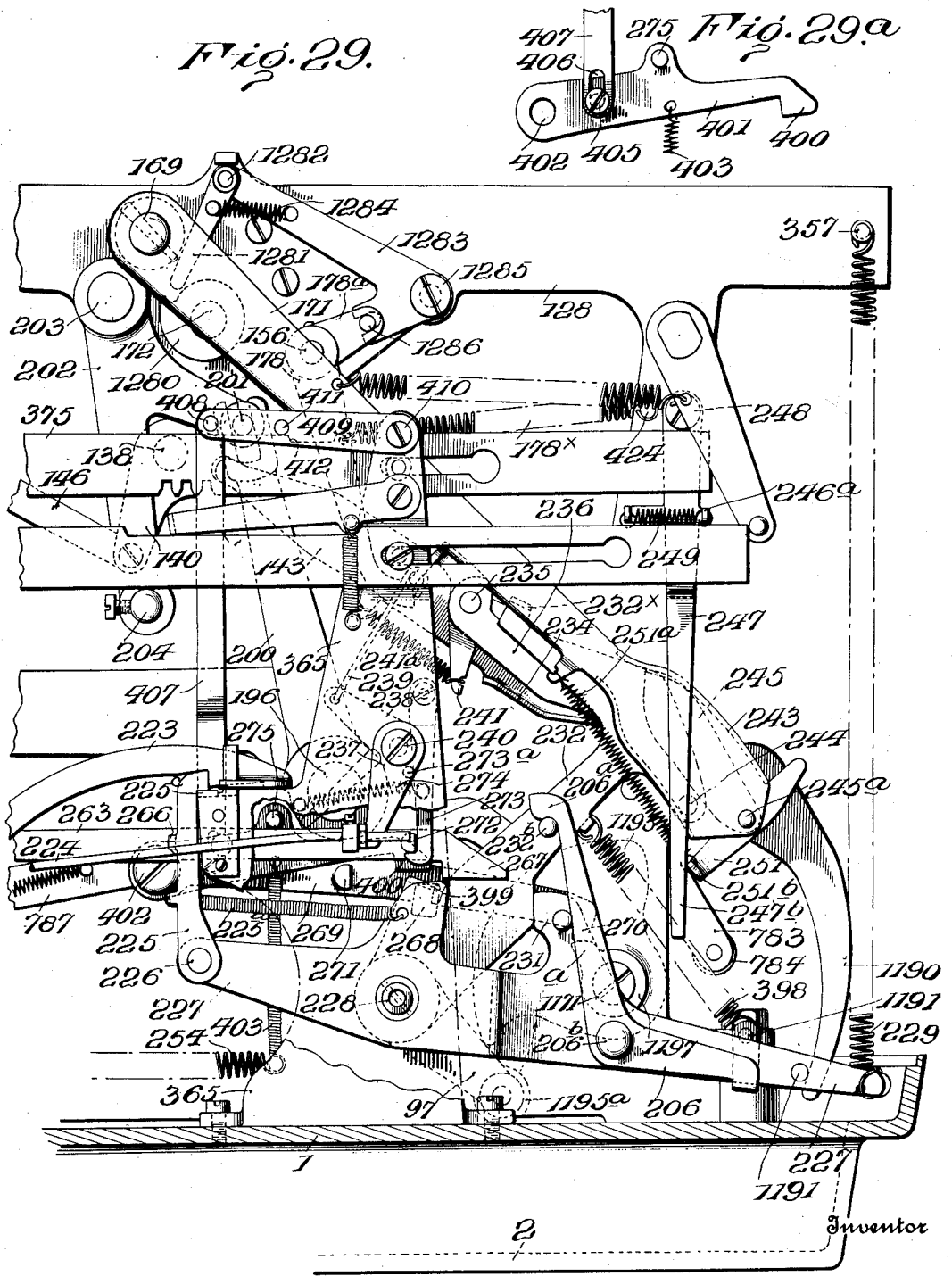

March 14, 1933.  J. G. DUNKER  1,901,152

CALCULATING MACHINE

Filed March 23, 1915  24 Sheets-Sheet 14

Inventor
John G. Dunker

March 14, 1933.  J. G. DUNKER  1,901,152
CALCULATING MACHINE
Filed March 23, 1915    24 Sheets-Sheet 16
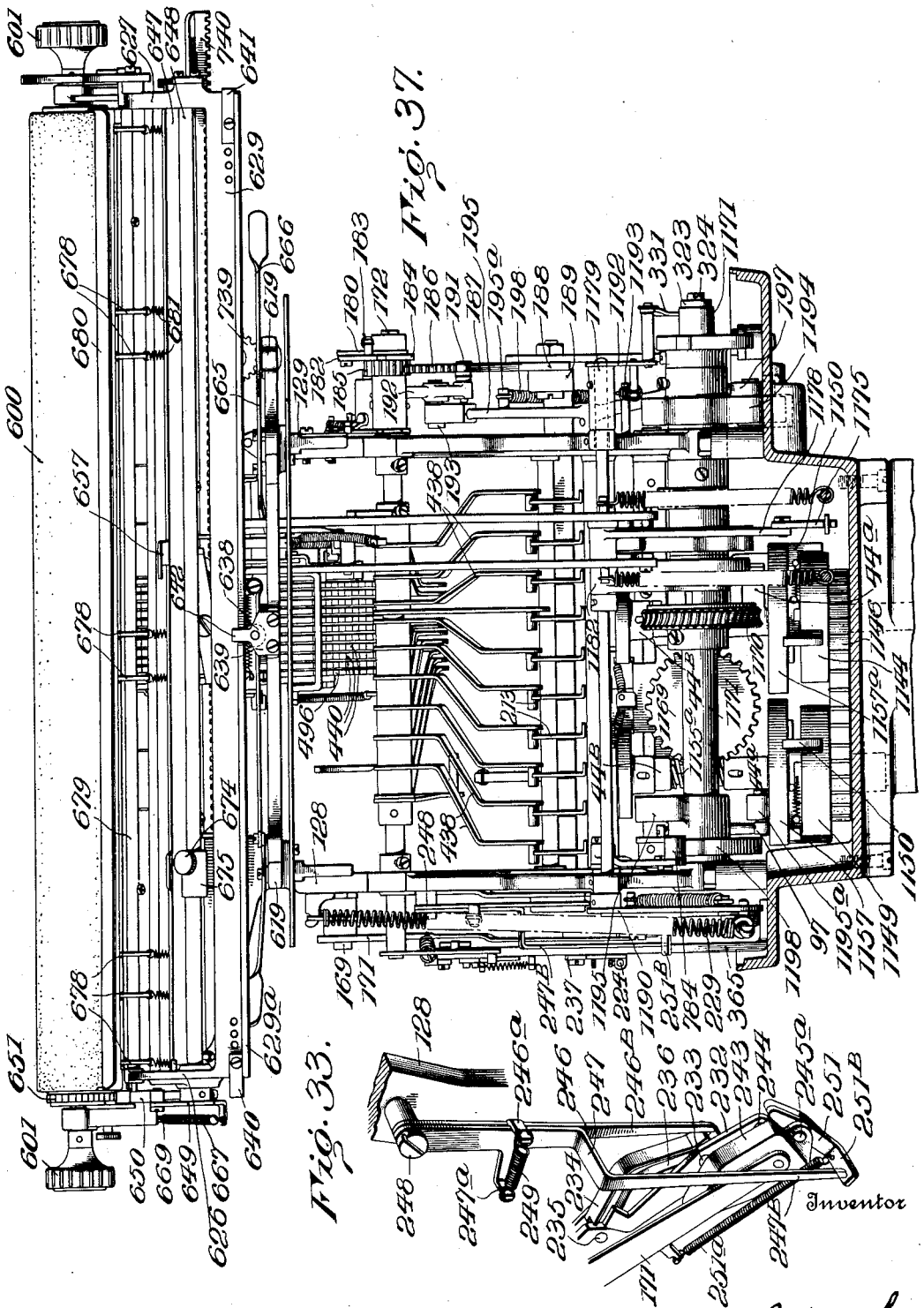

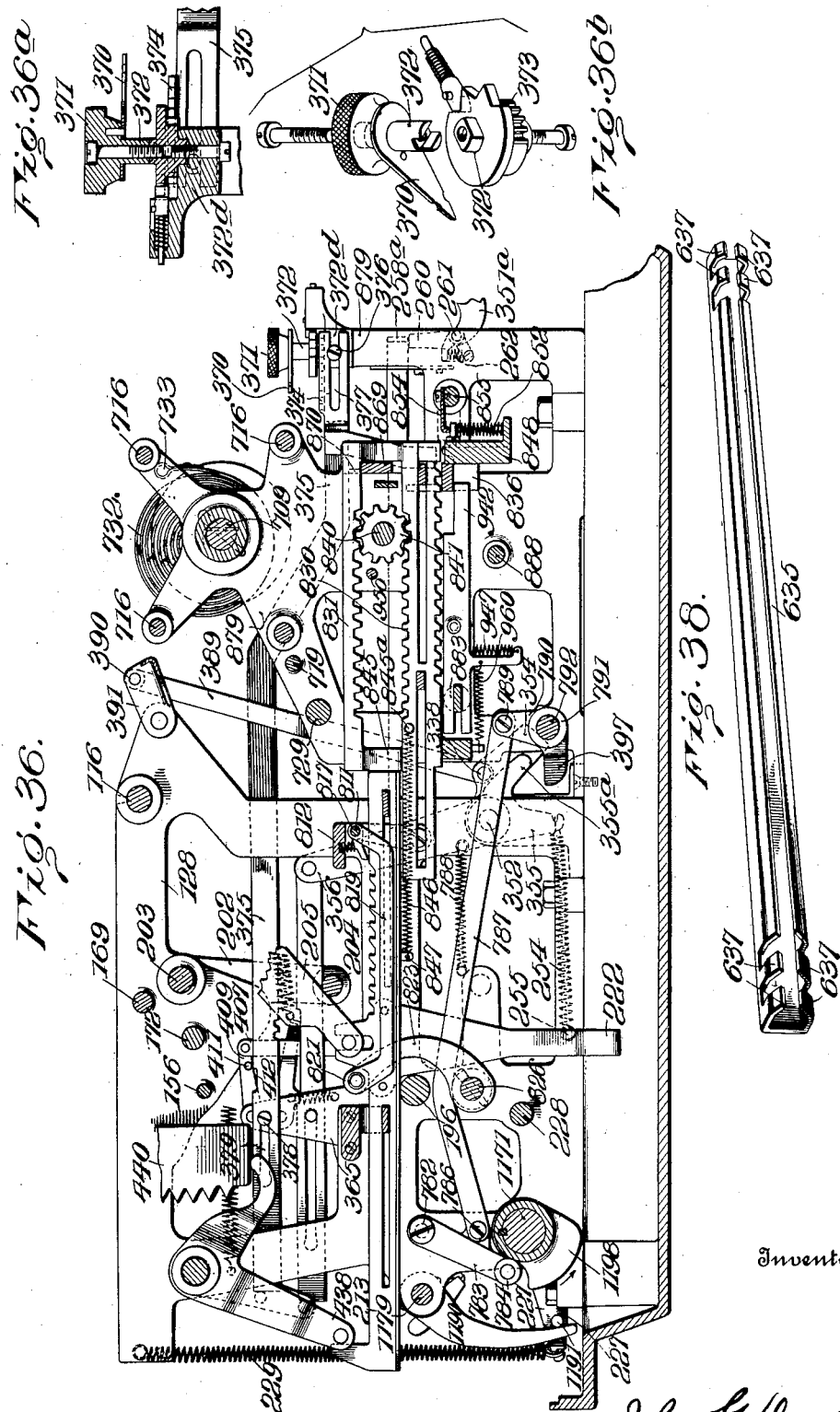

March 14, 1933.　　J. G. DUNKER　　1,901,152
CALCULATING MACHINE
Filed March 23, 1915　　24 Sheets-Sheet 18
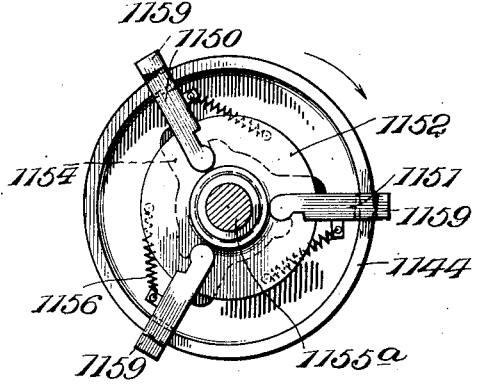
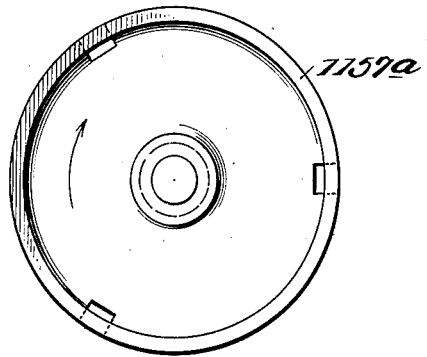
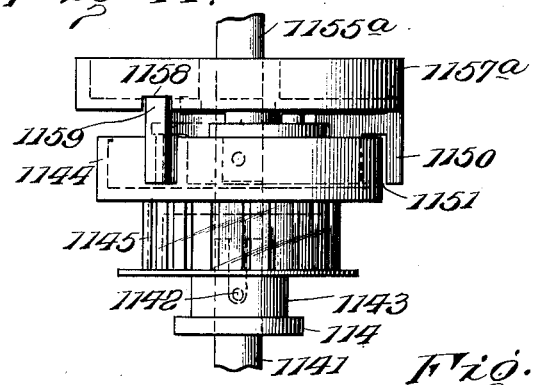
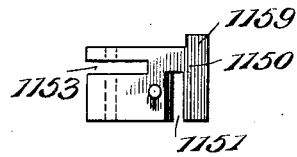
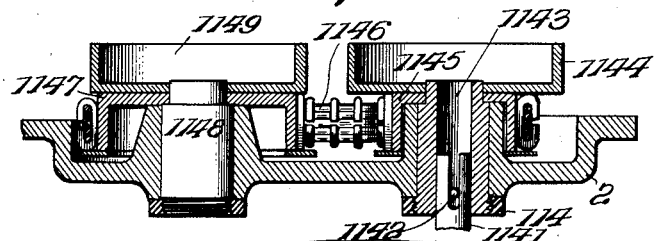
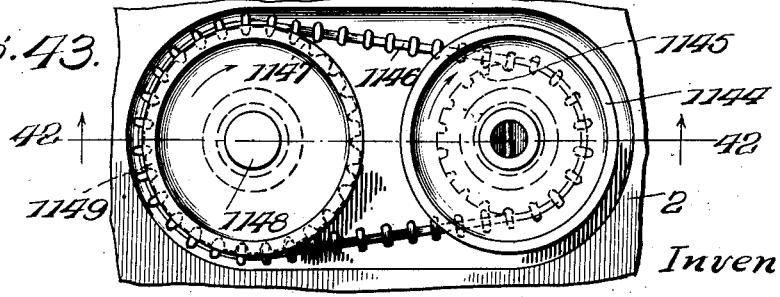
Inventor:
John G. Dunker

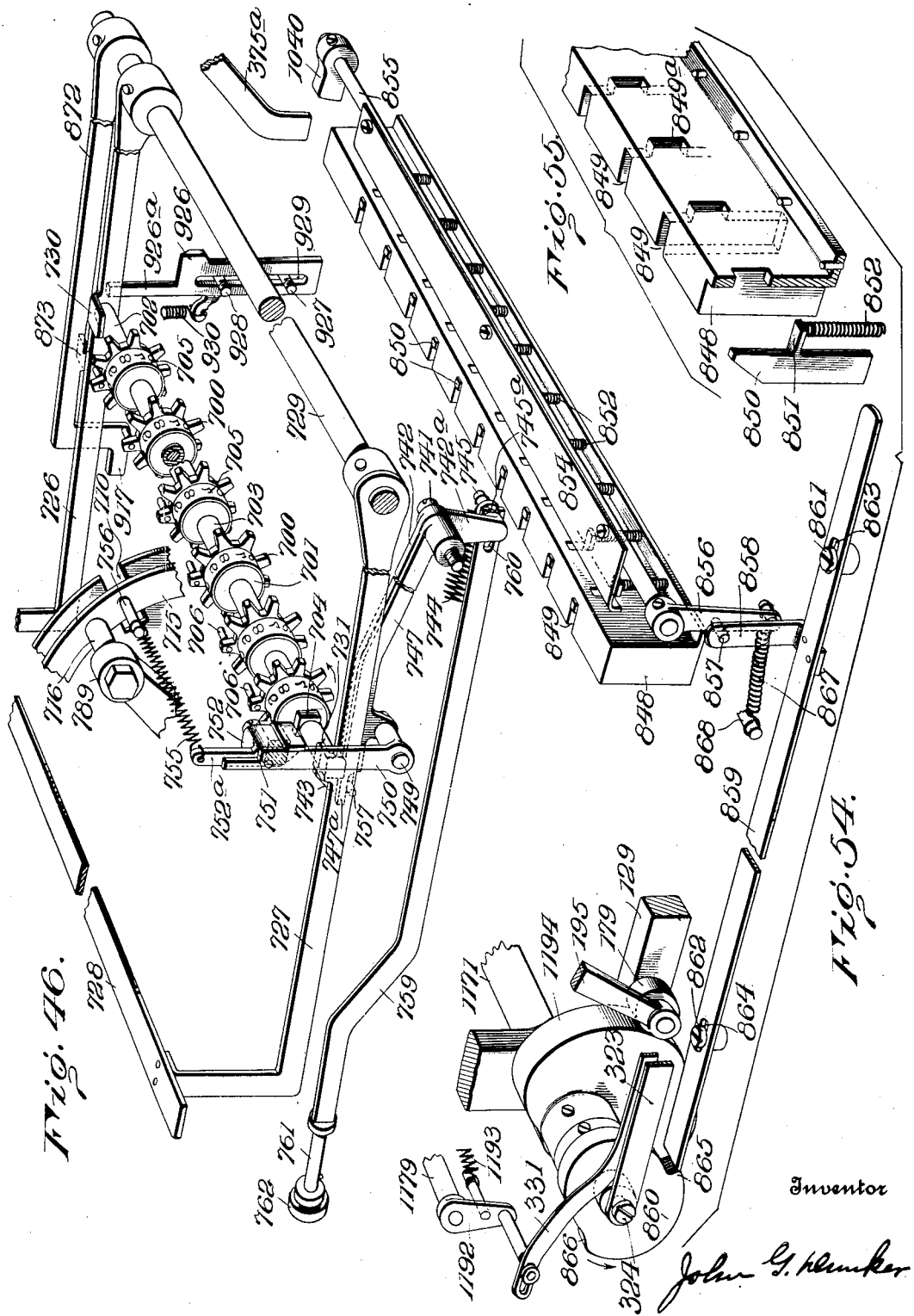

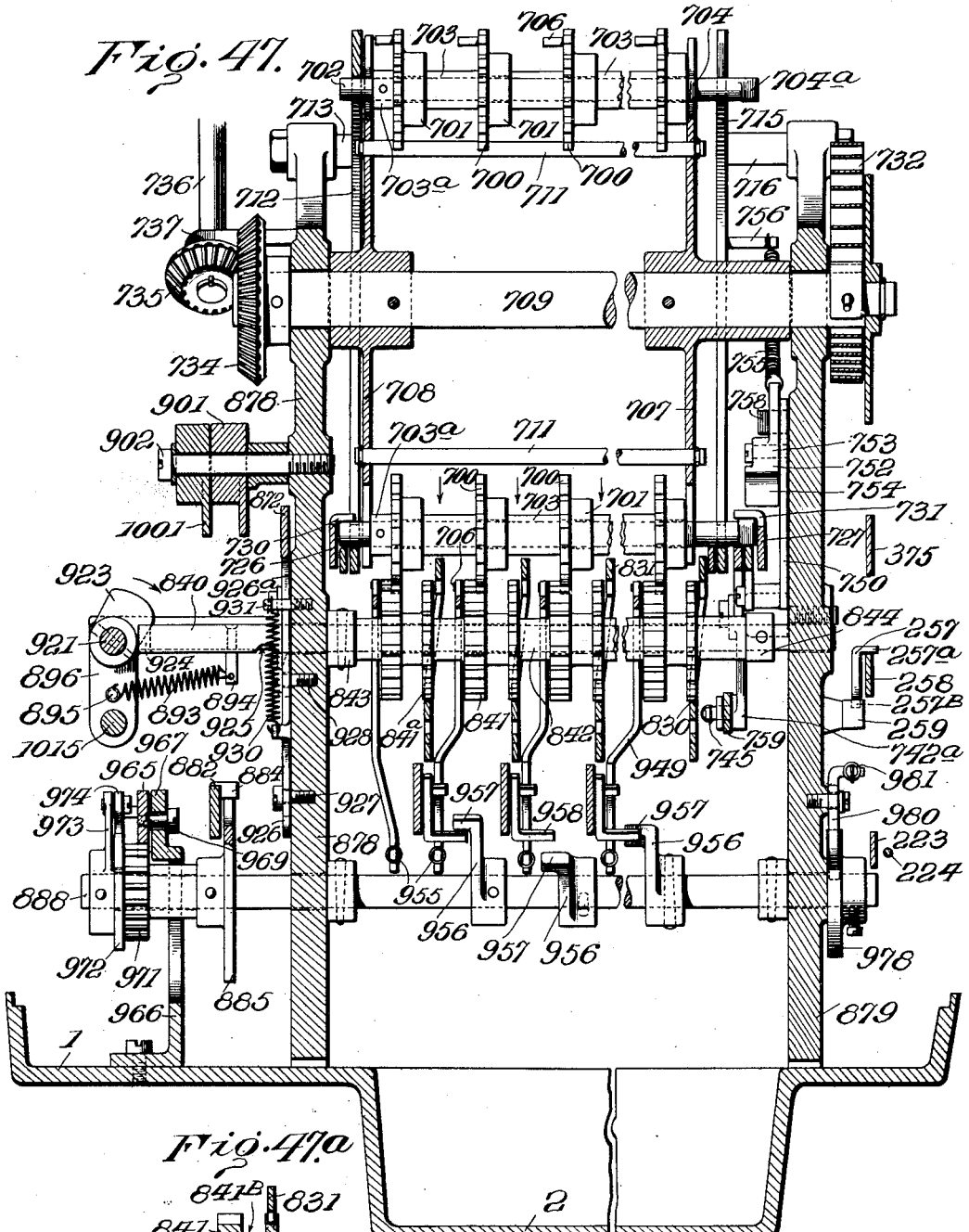

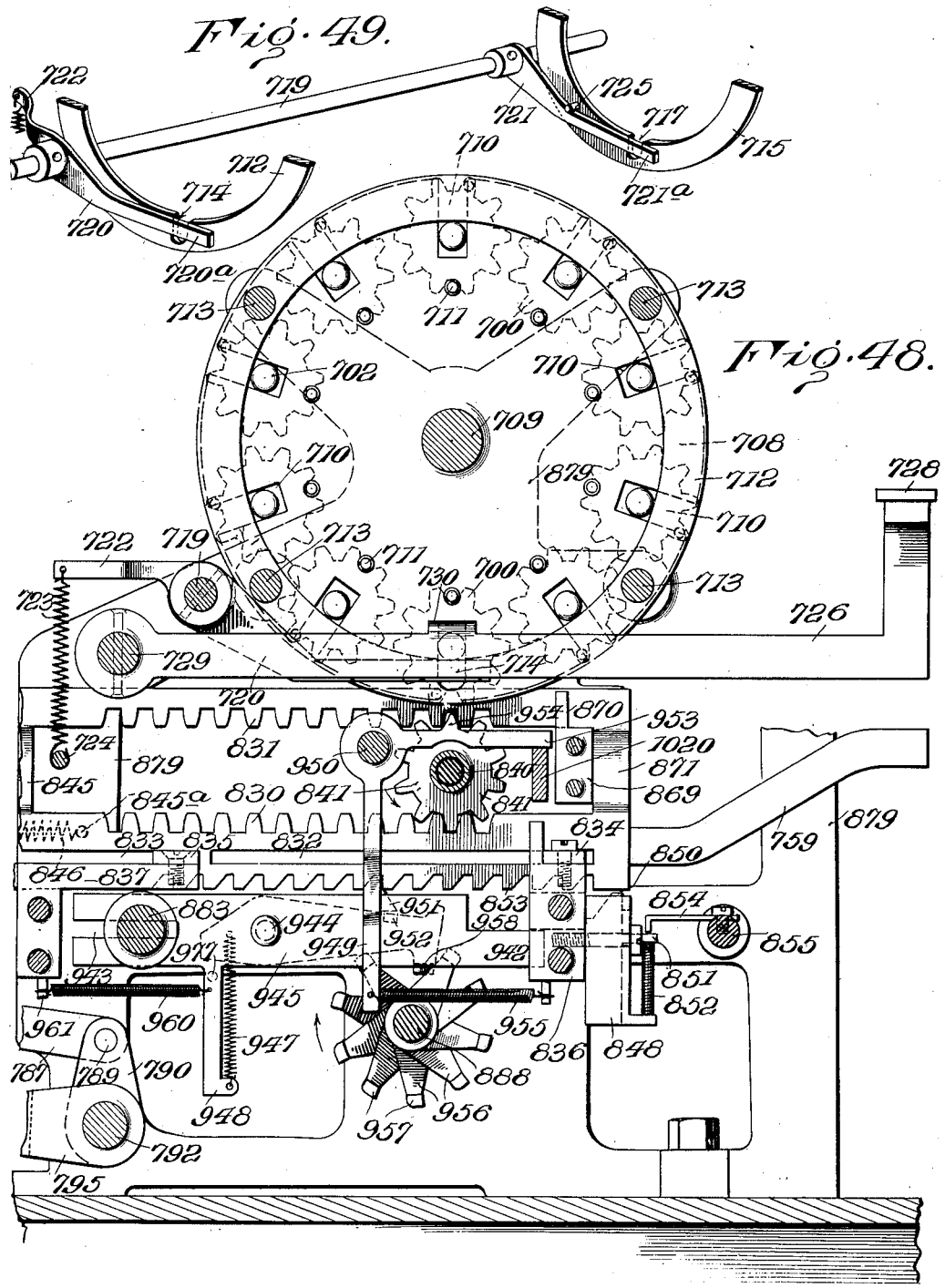

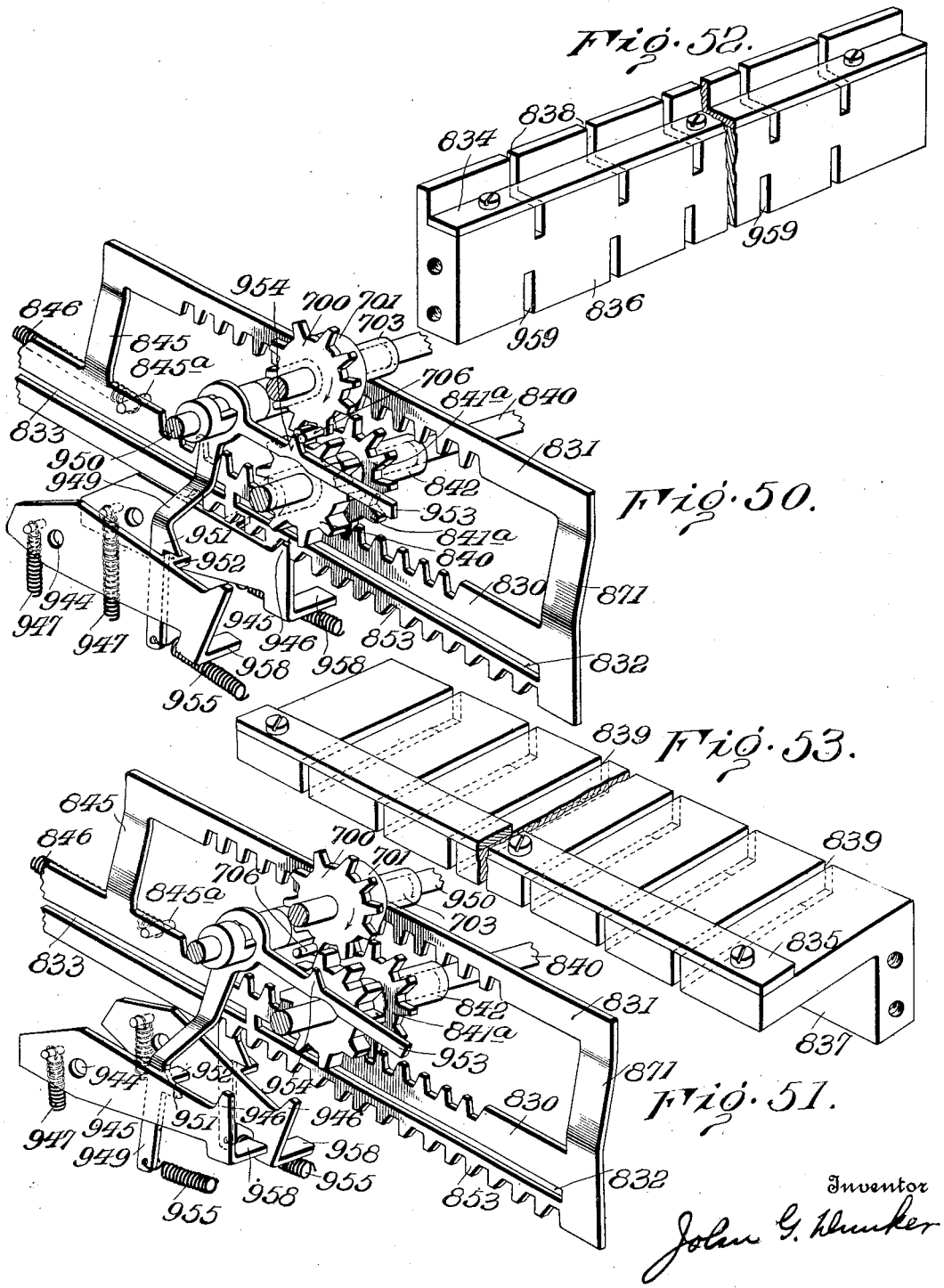

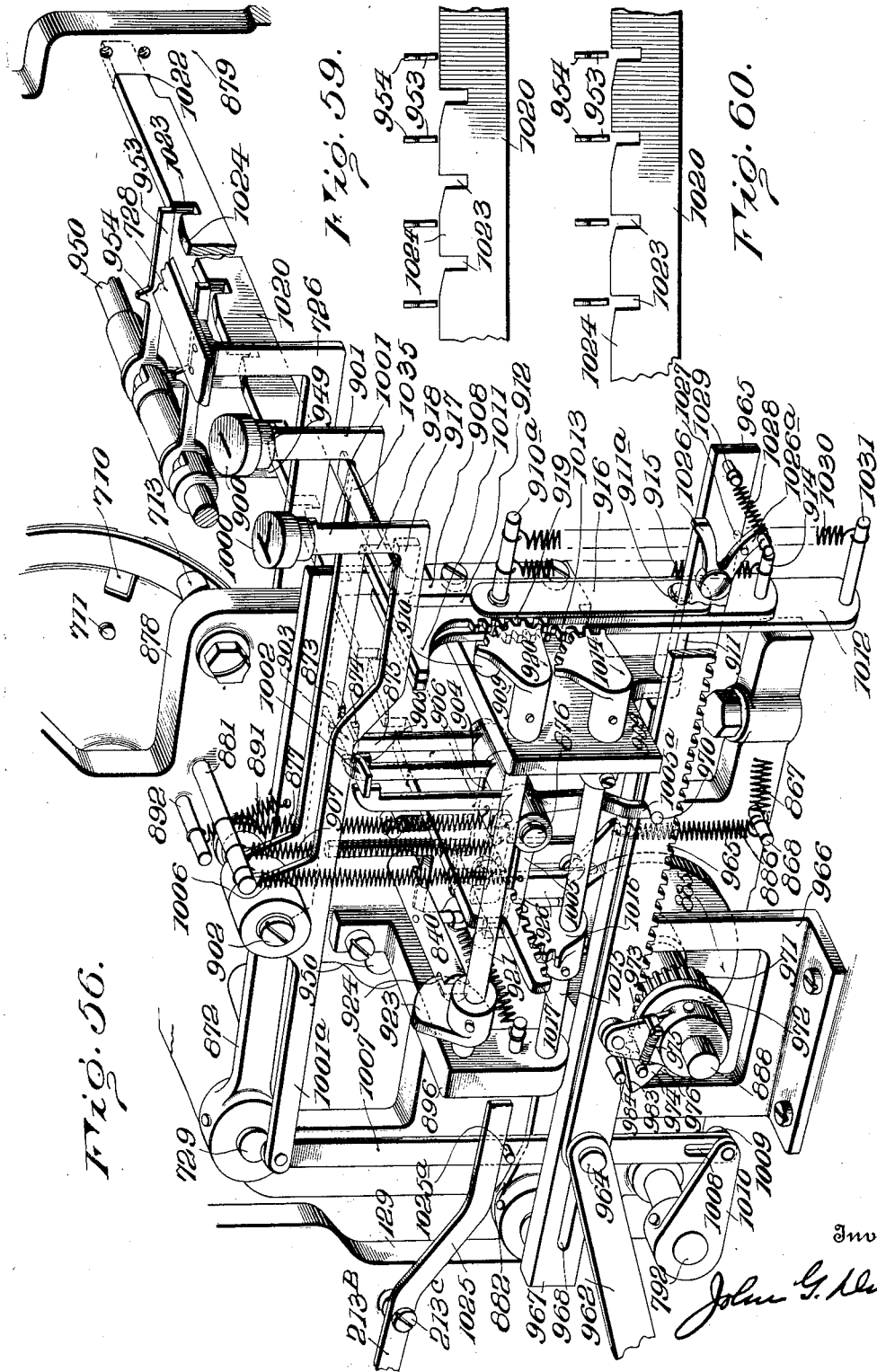

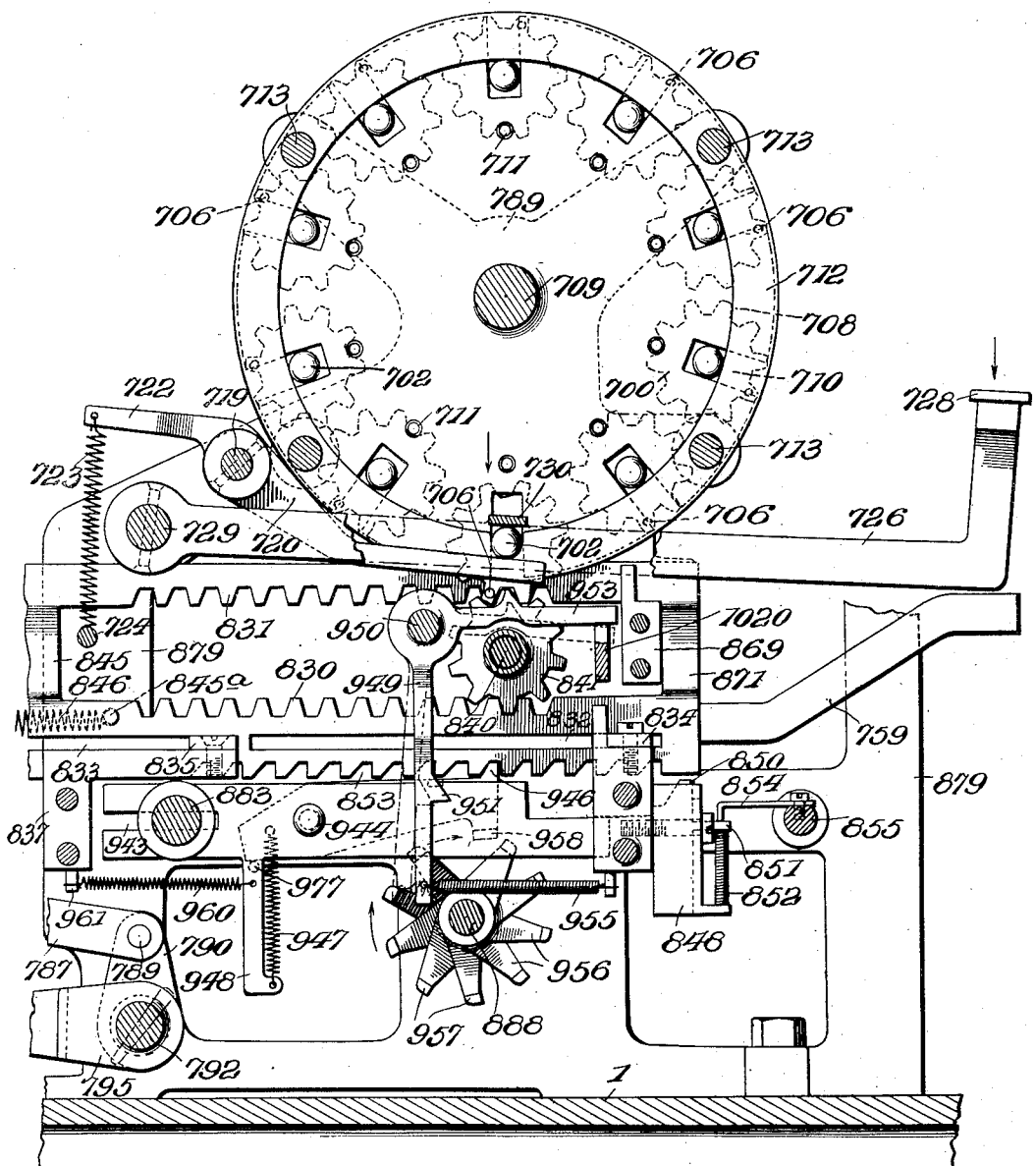

Patented Mar. 14, 1933

1,901,152

UNITED STATES PATENT OFFICE

JOHN G. DUNKER, OF CHICAGO, ILLINOIS, ASSIGNOR, BY MESNE ASSIGNMENTS, TO THE NATIONAL CASH REGISTER COMPANY, OF DAYTON, OHIO, A CORPORATION OF MARYLAND

CALCULATING MACHINE

Application filed March 23, 1915. Serial No. 16,500.

The present invention is an improvement in computing machines, and the objects of the invention are to simplify the construction of the machine, to broaden the scope of operations of like constructions heretofore devised, and to provide means whereby the computing is effected with greater efficiency, accuracy and speed than heretofore.

Briefly stated, the invention consists, among other things, in providing at least two computing constructions and in so arranging the parts that computations, such as addition and subtraction, may be made in both constructions, either independently or simultaneously. Further, these computing constructions are preferably so constituted that either one may be operated to take a total or sub-total, and the results of such operations simultaneously introduced into the other computing construction by addition or subtraction.

One computing construction hereinafter described comprises ten computing wheels constituting what is termed the "horizontal" accumulator. This part of the machine is substantially that disclosed in McCaskey German Patent No. 266,890, dated April 1, 1911, and is described in Sections 1–11 inclusive herein. The other computing construction comprises a plurality of rows of accumulator wheels, here shown as ten rows—though a greater or less number may be employed—which are termed "vertical" accumulators.

The present invention relates particularly to these vertical accumulators, considered alone, and in combination with the mechanism of the horizontal accumulator.

The plurality of vertical accumulators are mounted on a rotatable reel that is connected, preferably by gearing, to the paper-carriage of the machine, so that when the paper-carriage is moved for an operation in a desired column, for example, the proper accumulator on the reel will be moved to a position to be engaged by its actuating means. The rows of accumulator wheels on the reel are normally locked against independent movement on their shafts when the reel is free to rotate, and the reel is locked against rotation when any of the vertical accumulators is engaged with its actuating mechanism.

Preferably, a separate addition bar, subtraction key, and totalizing lever are provided for the computing construction of the vertical accumulators, but the clutch of the machine is operated, preferably, only by the manual operating devices for the horizontal accumulator, or the non-accumulating key.

By the present construction, a mechanical proof of the operations may be secured without delay. This is accomplished by simultaneously computing the amounts in both computing constructions, as will be hereinafter described.

The invention will be better understood by reference to the accompanying drawings, illustrating one expression of the inventive idea, and wherein—

Figure 2:
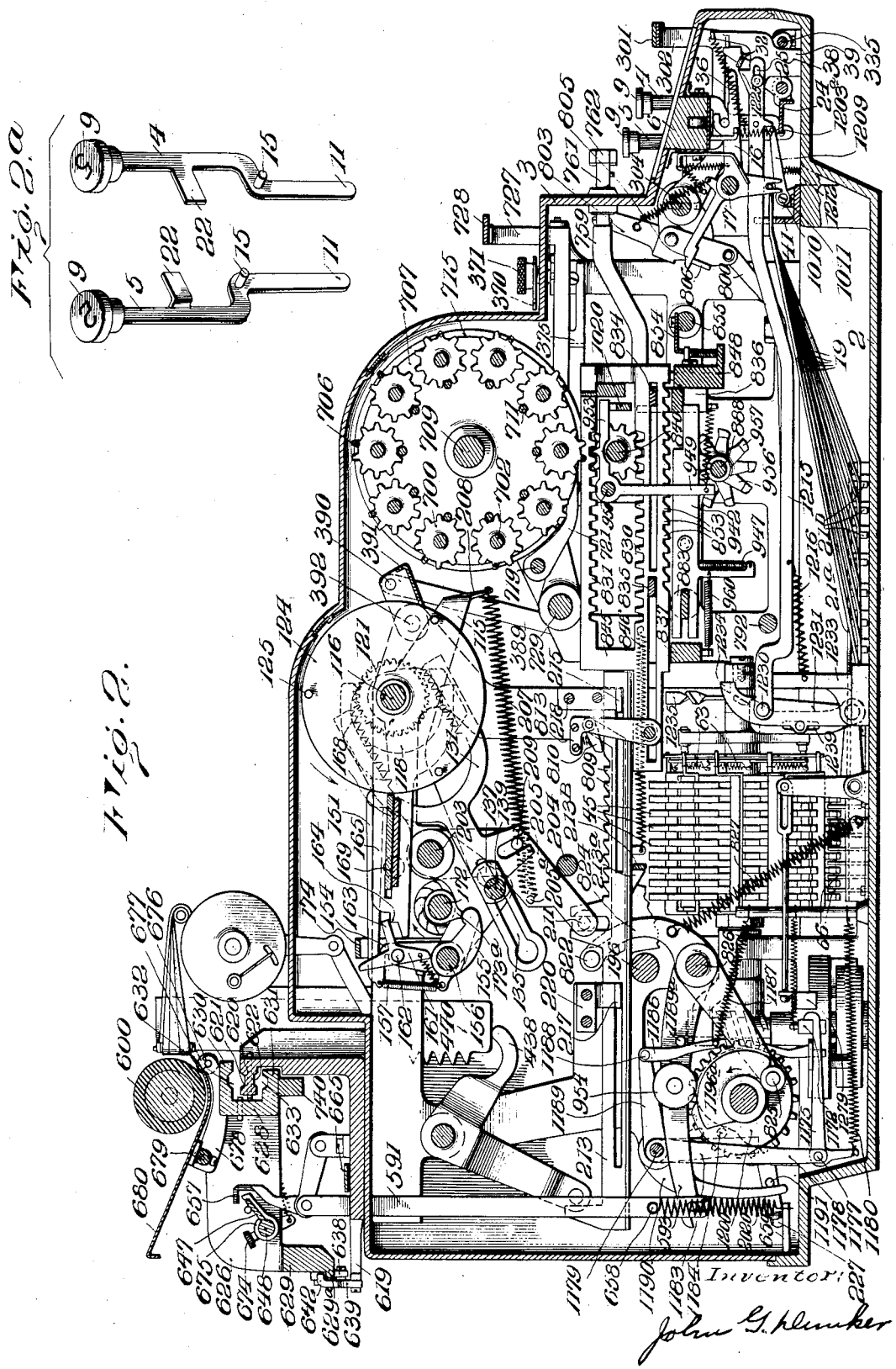
Figure 3:
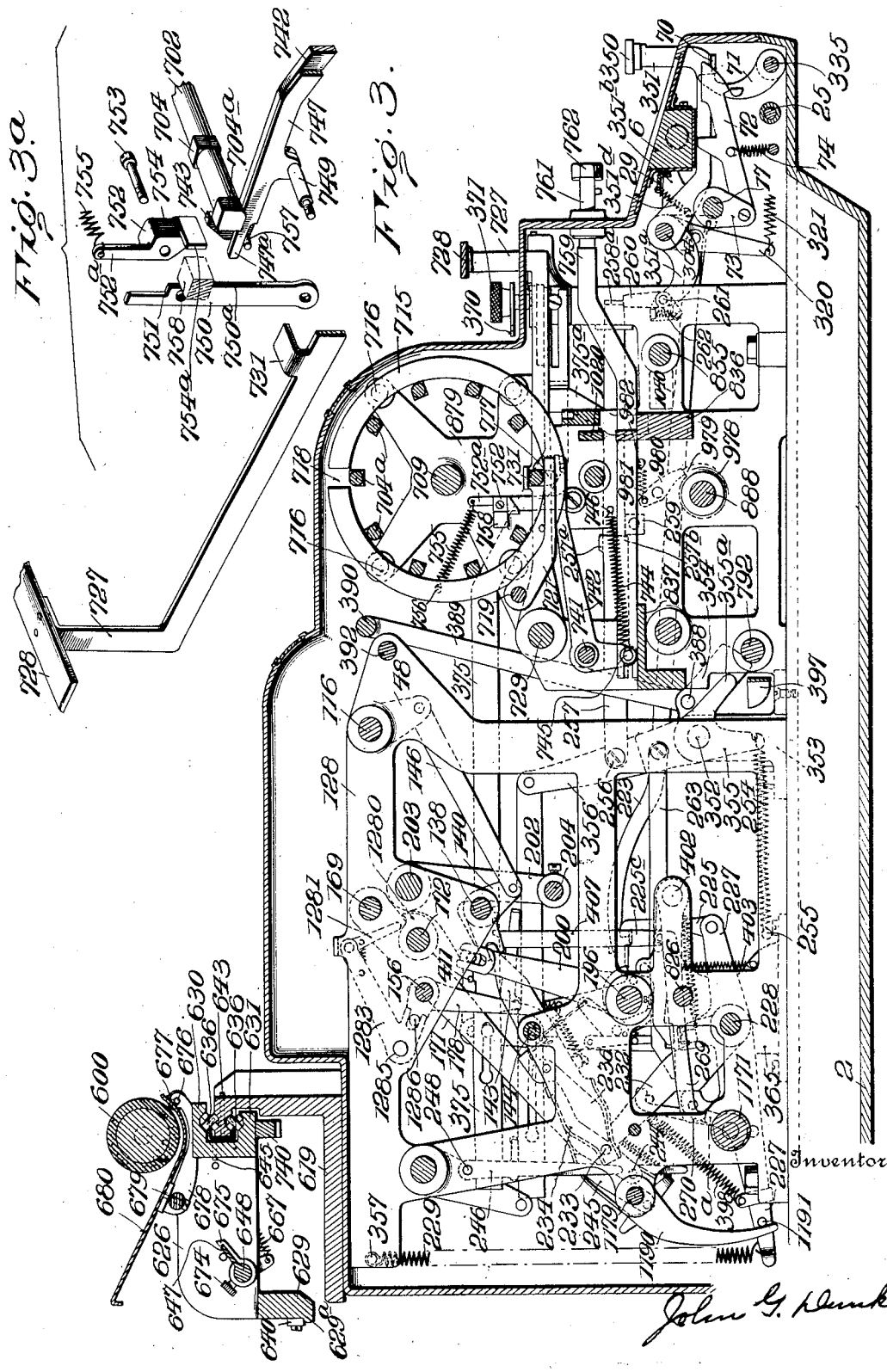
Figure 4:
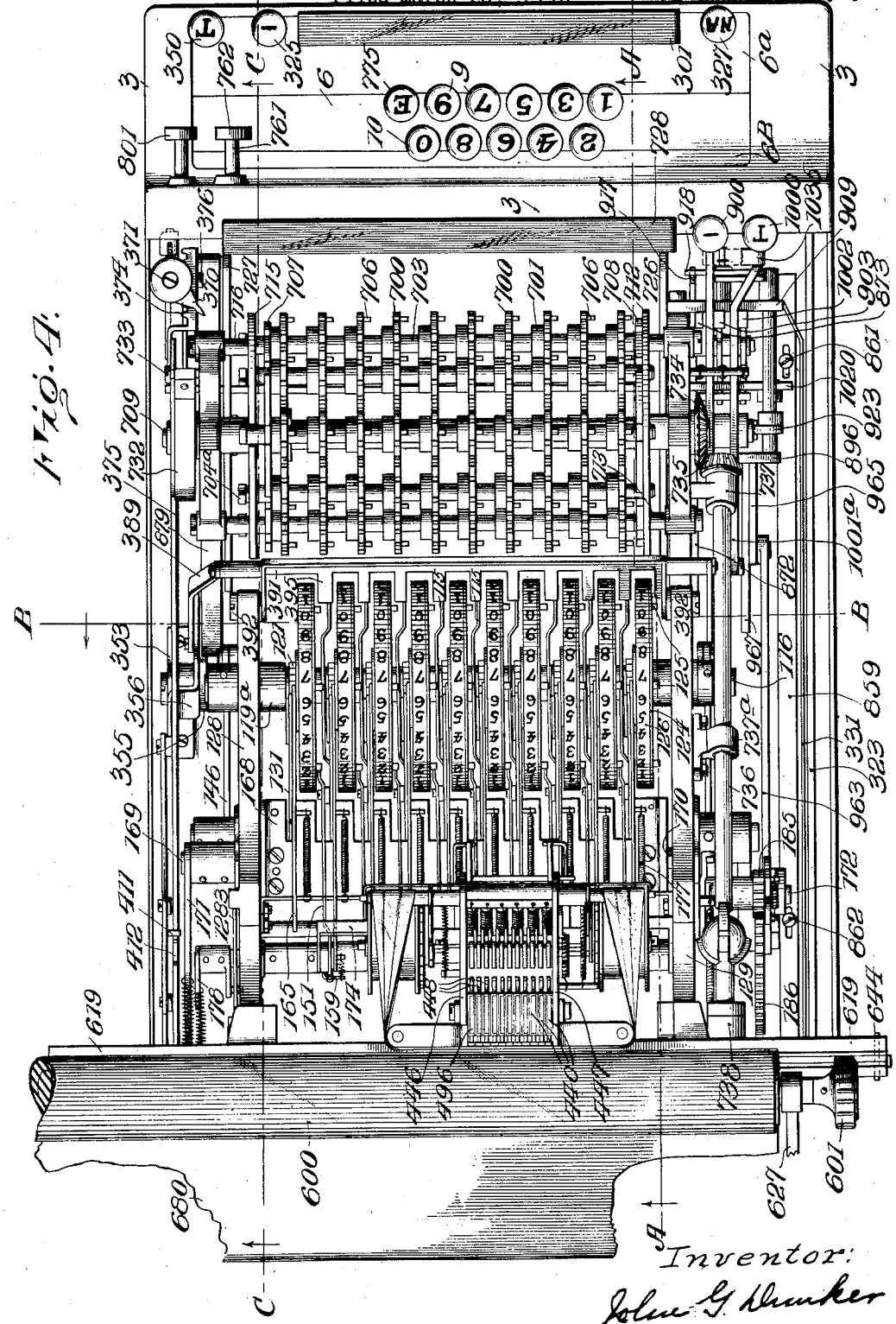
Figure 32:
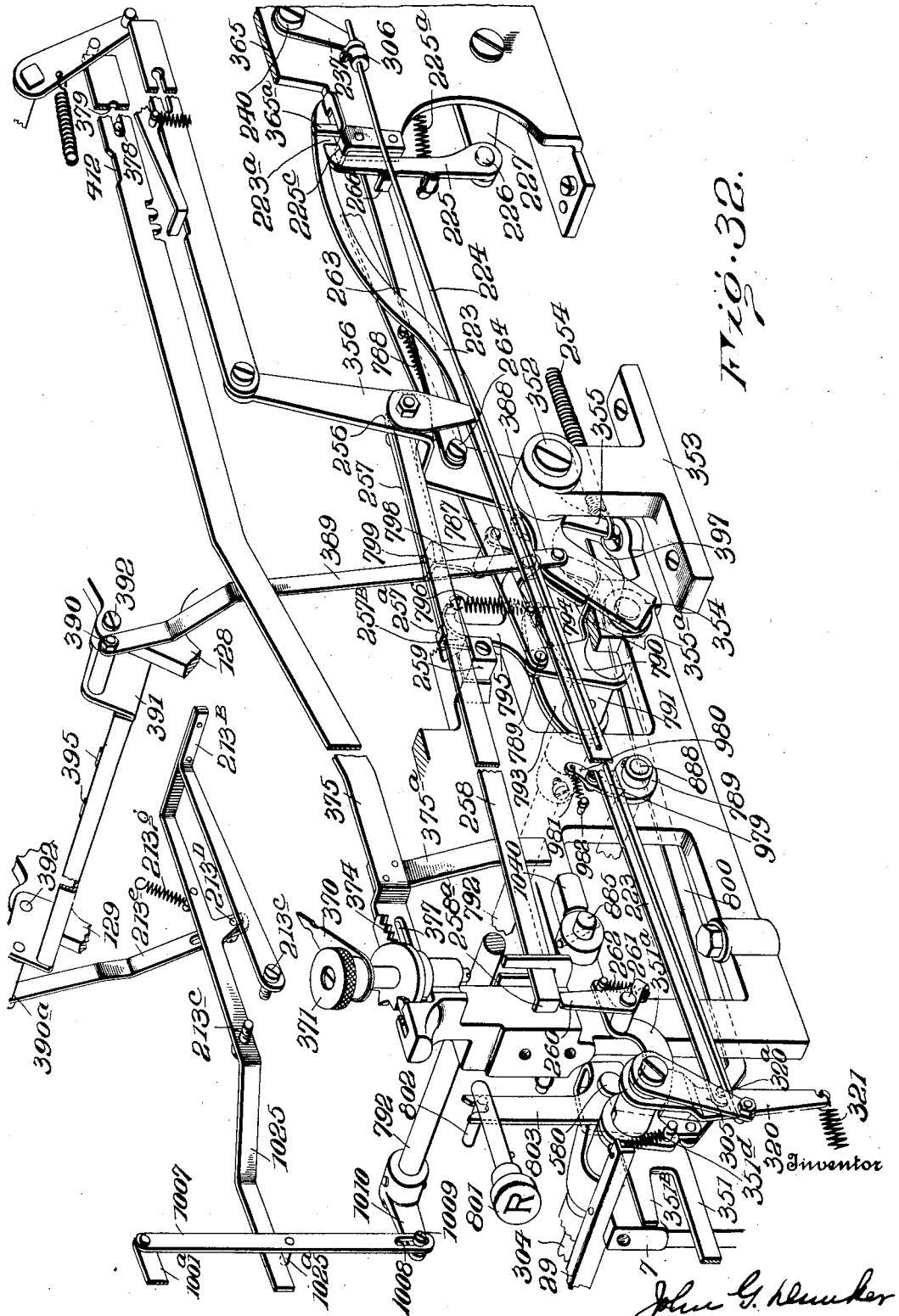

Fig. 1, Sheet 1, is a side elevation with the casing removed;

Fig. 2, Sheet 2, is a section on the line A—A, Fig. 4;

Fig. 2a, Sheet 2, is a perspective view of the numeral keys;

Fig. 3, Sheet 3, is a section on the line C—C, Fig. 4;

Fig. 3a, Sheet 3, is a detail perspective of the alining mechanism for the vertical accumulators;

Fig. 4, Sheet 4, is a plan view of the machine with machine casing removed;

Fig. 5, sheet 5, is a plan view of the base of the machine with certain parts mounted thereon;

Fig. 6, Sheet 6, is a sectional view on line 6—6, Fig. 7, through the key-board;

Fig. 7, Sheet 6, is a transverse sectional view through the key-board on line 7—7, Fig. 6;

Fig. 8, Sheet 7, is an enlarged sectional view through the key-board;

Fig. 8a, Sheet 6, is a perspective view of the locking means of the escapement of the stop cylinder;

Fig. 9, Sheet 8, is a plan view of the stop cylinder and associated mechanism;

Fig. 10, Sheet 9, is an end view of the stop cylinder, drop arms, main slides and printer levers;

Fig. 11, Sheet 9, is a transverse section through the stop cylinder;

Fig. 12, Sheet 9, is an end view of the erase mechanism of the stop cylinder;

Fig. 13, Sheet 10, is an end view of the means for positioning the stop cylinder bails;

Fig. 13a, Sheet 10, is a perspective of a stop cylinder bail;

Fig. 13b, Sheet 10, is a detail view of a stop cylinder bail rod;

Fig. 14, Sheet 10, is an end view of the stop cylinder escape mechanism;

Fig. 14a, Sheet 10, is a perspective of the means for locking the stop cylinder;

Fig. 15, Sheet 10, is the multiple lock plate of the stop cylinder bail rods;

Fig. 16, Sheet 11, is an elevation of one of the horizontal accumulator wheels and the means for rotating same when accumulating and carrying tens; and Fig. 17, Sheet 11, is a plan view of the same;

Fig. 16a, Sheet 11, is a perspective of the hub of an accumulator wheel;

Fig. 16c, Sheet 11, is a sectional view of a bail for restoring certain parts of the carrying-tens mechanism;

Figs. 18 to 27, inclusive, Sheet 11, are detail views illustrating cams constituting parts of the carrying-tens mechanism of the horizontal accumulator;

Fig. 28, Sheet 12, is a perspective of the mechanism for rotating the horizontal accumulator wheels;

Fig. 29, Sheet 13, is an elevation of the control mechanism for actuating the horizontal accumulator;

Fig. 29a, Sheet 13, is a detail view of the sub-total hook of the horizontal accumulator construction;

Fig. 30, Sheet 14, is a perspective view of the main slides and the means for alining same;

Fig. 31, Sheet 12, is a perspective of the lever controlling the means for rotating the horizontal accumulator wheels;

Fig. 31a, Sheet 12, is a detail view of a link constituting a part of the means for taking a total of the horizontal accumulator;

Fig. 32, Sheet 15, is a perspective view of the mechanism for taking a total of the horizontal accumulator;

Fig. 33, Sheet 16, is a perspective of the links constituting parts of the carrying-tens mechanism;

Fig. 34, Sheet 7, is a perspective of the mechanism actuated by the addition bar and the subtraction key for releasing the means that rotate the horizontal accumulator wheels;

Fig. 35, Sheet 7, is a side view of the subtraction key and associated mechanism;

Fig. 36, Sheet 17, is a detail view showing the automatic erase mechanism for the stop cylinder;

Figs. 36a and 36b, Sheet 17, are detail views of the totalizing indicator;

Fig. 37, Sheet 16, is a rear elevation of the machine;

Fig. 38, Sheet 17, is a perspective of a plate constituting a part of the paper-carriage;

Fig. 39, Sheet 1, is a perspective of the mechanism for actuating the platen;

Figs. 40 to 45, Sheet 18, inclusive, are detail views of the clutch of the machine;

Fig. 46, Sheet 19, is a perspective view of the alining mechanism of the vertical accumulators and the manual means for releasing the alined vertical accumulator;

Fig. 47, Sheet 20, is an end elevation, partly in section, showing two of the vertical accumulators and associated mechanism;

Fig. 47a, Sheet 20, is a detail view showing the position of the lower racks when the pinions are meshed with the upper racks;

Fig. 48, Sheet 21, is an elevation of the vertical accumulators, the actuating means for rotating same and the carrying-tens mechanism;

Fig. 49, Sheet 21, is a perspective of the means for elevating an engaged vertical accumulator from the actuating mechanism;

Figs. 50 and 51, Sheet 22, are perspective views of the double racks in a forward position having rotated one of the accumulator wheels to act upon the carrying-tens mechanism;

Figs. 52 and 53, Sheet 22, are details views of the cross plates and bars that position the double racks in the machine;

Fig. 54, Sheet 19, is a perspective view of the mechanism for alining and releasing the double racks when not in their normal position;

Fig. 55, Sheet 19, is a detail view of a rack detent and the bar supporting the rack detents;

Fig. 56, Sheet 23, is a perspective view of the means for controlling the actuation of the vertical accumulators;

Fig. 57, Sheet 8, is a detail elevation of certain parts controlling the actuation of the vertical accumulators;

Fig. 58, Sheet 14, is a detail view of the bar supporting the carry pawl and showing the position of said bar mounted on shaft;

Figs. 59 and 60, Sheet 23, are detail views of the vertical accumulator totalizing bar and the position of the arms constituting a part of the carrying-tens mechanism; and Fig. 61, Sheet 24, is an elevation showing the vertical accumulators with an alined vertical accumulator meshing with means for rotating the accumulator wheels and also showing a carrying pawl engaged with the carrying tens and alining teeth of a double rack.

1.—Digit, cipher and erase keys and connections, key-locking means

Illustrated particularly in Sheets 2, 4, 5, 6 and 7.

There are nine digit keys 9, and one cipher key 10, Fig. 4. There is an erase key 775, structurally similar to said other keys, but the function of which is more fully explained hereinafter (Section 7, of this specification). The stems 4 of the digit keys 1—3—5—7—9 and erase key work in notches or grooves in one side of a bearing bar 6, and stems 5 of the digit keys 2—4—6—8—0 work in similar notches in the other side of said bar, Figs. 6-7-8. The key stems are held in place by plates 6a and 6b having depending flanges bridging the grooves at opposite sides of the bar 6. These plates and the bar close an opening in the part 3 of the machine casing, Fig. 4. Bar 6 is supported at its opposite ends by brackets 7 and 8 extending upward from machine base 1 at the sides of the machine, Fig. 6.

In its underside, bar 6 has a longitudinal groove closed by a plate 14, Figs. 6 and 7. In this groove there is a series of cylindrical key-locking rollers 23, Figs. 6-7-8. Each groove in bar 6 for the key stems 4 and 5 is extended laterally for a portion of its length, into intersection with the groove containing the rollers, so as to accommodate a laterally extending lug 22 on each key stem 4 and 5, Figs. 2a-6-7-8. When a key 9, 10 or 775 is in its normal elevated position, the upper edge of its lug 22 contacts the upper wall of the space in which that lug is movable. When one key is depressed, the lug 22 thereof enters between two of the rollers 23 and so crowds together the rollers on opposite sides of the lug, that no other key lug 22 can enter between its corresponding rollers. All other keys except the one depressed are thereby locked against operation.

As clearly shown in Figs. 2a-7 and 8, the key-stems make a bend at about their middle, thus bringing the lower portions, or what may be called extensions 11 of the stems, into alignment, cooperating with a plate 24 fulcrumed on shaft 25, supported in brackets 7 and 8, Figs. 2-5-6-7 and 8. Stems 4 and 5 have a pin 15 projecting to the left, said pins are embraced by a fork of key levers 16, Figs. 2a-6-7-8, rotatable on shaft 17, supported in brackets 7 and 8. A plate 29 secured to brackets 7 and 8 spans the key levers 16 and is slotted at its lower edge to receive and separate levers 16 along shaft 17, Figs. 6-7 and 8. Each key lever 16 has a forked lower end 18. For the nine digits keys 9 these forks embrace the laterally bent forward ends of nine rods or links 19, Figs. 2-5-6-7-8. A plate 41 secured to base of machine is slotted at its upper edge to receive and separate the links 19 and a link 776 and to hold them in engagement with 18, Figs. 2-5-6-7-8. The laterally bent rear ends 20 of the links 19 are held in engagement with openings in corresponding stop slides 21, of which there are nine, by fingers 21d depending from plate 21a, Figs. 2-5. As will be apparent, depression of a digit key will, through the connection described, move rearward or reciprocate a corresponding slide 21.

The forked lower end of the lever 16 of the erase key 775 engages the laterally bent forward extremity of a rod or link 776, to be referred to hereafter in describing the erase key mechanism, Section 7 of this specification. The single cipher key requires no such connection as will be apparent from detailed description of the escapement for the stop cylinder. There is a bar for locking the keys when depressed, consisting of end plates 30 and 31, fulcrumed on shaft 25, Figs. 5-7-8, said plates being connected at their outer ends by a bar 32 that when free to move passes over the lowered end 36 of the key levers 16 and under the ends 36 that remain in their normal position and hereinafter more fully described. Springs 13 anchored to key levers 16 and to flange of plate 29 tend to retract stems 4 and 5 to their normal elevated position, Figs. 5-7.

2.—Stop cylinder and its escapement

Illustrated particularly in Sheets 2—5—8—9—10.

42 is the stop cylinder shaft or axle journaled in bearings in brackets 1233 and 44 rising from sub-base 2 of the machine, Figs. 9-10-11. Alternately strung upon a flat-sided or D-shaped part of shaft 42, see Fig. 11, are ten plates 47 and nine plates 48. Plates 47 being of greater diameter than 48, there is formed a series of nine annular grooves, intersected by ten rods 46, Fig. 13b. In each groove each rod passes through and pivots the inner end of a cylinder stop 45, there thus being nine stops pivoted on each of the ten rods and constituting ten rows of nine stops each, one row to each rod. A plate 51 also strung upon the flattened part of shaft 42, has hook-like projections forming slots 52, Fig. 15, which engage necks 53, Fig. 13b, at one end of all of the ten rods 46, thereby locking the latter against endwise movement. The plates 47, 48 and 51, are clamped together on shaft 42 between a collar 50 (dotted lines Fig. 13), and a lock nut 49, Fig. 9. Springs 54, seated in notches in plates 48, tend to normally hold each stop 45 in the position shown at the front of Fig. 11, with its tail 55 in contact with the periphery of plate 48. For each row of stops 45 there is a bail for locking any stop of the row in its set or active position, said bail including end plates 59 and 60 connected by plate 58, preferably integrally formed by bending a single piece of sheet metal, Figs. 9–11–13a. Each bail spans the collection of plates secured on shaft 42 and is pivoted on the projecting ends of the rods 46. One extremity of rod 46 beyond plate 51 extends into an opening 61 in end plate 59, and the other extremity of said rod, beyond the plate 47 extends into an opening 62 of end plate 60, Fig. 13a. Each bail is held to its normal position shown in Fig. 13 by a spring 63 connected between a pin 64 on the bail, and one arm of a spider-like disk 65 secured to collar 50, (dotted line Fig. 13). When a stop 45 is swung from its normal position against the tension of its spring 54, a tooth 57 on the stop bears against and moves along the face of plate 58 of the locking bail, swinging the latter against the tension of its spring 63. When the tooth 57 drops under the edge of the bail—(one of the stops being shown in such position at "X", Fig. 11), the bail temporarily locks the stop in this its active position. This swinging or movement of a stop in a row to its active position is effected upon rotation of the stop cylinder by means of upwardly extending tripping arms or projections 66 at the end of the slides 21 bent at right angles to the direction of movement of said slides when actuated by the keys, as heretofore described, Figs. 2–5–10. The slides 21 are held in place on the sub-base 2 of the machine and guided in their movement by the plate 21a having fingers 21b at its forward part and 21c at its rear edge which depend between the slides, Figs. 5–10. Normally the nine projections 66 stand out of the paths of the nine stops 45 in each row; or in other words, in such position that the stops 45 may pass between the projections 66, as shown in Fig. 2. But when a slide is moved by actuation of its digit key, its projection 66 is moved into the path of rotation of a corresponding stop 45 in the row of stops then next in advance of the row of projections 66. The next movement of the cylinder (in the direction of arrow, Fig. 10) brings said stop into engagement with said projection and the stop is moved to and locked in its active position described above.

The stop cylinder rotates step by step in the direction of the arrow, Fig. 10, under control of an escapement mechanism which will now be described and which is illustrated particularly in Sheets 2—5—6—7—8—10.

Pivoted on shaft 17 is an arm 1205, to the free end of which at 1204 is pivoted one end of a detent 1203. The lower end of this detent is provided with a notch 1203a which engages the rear edge of plate 24 in the normal position of the parts. The arm 1205 is subject to the tension of spring 1206 anchored at its upper edge to the flange of plate 29. A spring 34, connected to detent 1203 and to a bracket 39, normally holds said detent in engagement with bail 24. A second detent 1209 is pivoted at 1210 to a bracket 1211, fixed to plate 41, and carries a pin 1208 which is engaged by shoulder 1207 on detent 1203. A compression spring 1212, connected at one end to detent 1209 and at its other end to a pin on the base of the machine, tends to hold the free end of detent 1209 in engagement with a tooth 1213 on the lower edge of a link 1215, which latter extends rearward through an opening in the plate 41 to the escapement mechanism, hereinafter described in detail. A spring 1216, Figs. 2–5, connected to link 1215 and anchored to bracket 1233, supported on the sub-base of the machine, tends to move link 1215 rearward when it is released from the tooth of the detent 1209. From the construction thus far described, it will be seen that, upon depression of a key, its pin 15 acts upon its key lever 16 to carry the end 36 of the latter downward in the rear of the locking bar 32 and the lower end of the extension 11 of the key stem acts upon plate 24, swinging the latter downward against the tension of spring 1202. This downward movement of the plate 24 pulls detent 1203 and arm 1205 downward against the tension of spring 1206 until the shoulder 1207 swings detent 1209 downward to move its end clear of the tooth 1213 of the link 1215, whereupon the latter will move rearward under the power of its spring 1216. When the key has been fully actuated or depressed, the upper edge of the end 36 of the lever 16 will have passed below the locking bar 32 and the latter will swing over the key lever to lock the key in its depressed position. The locking bar 32 is swung forward to unlock the key automatically by return movement of the link 1215, a lug 1225 on the link 1215 on its return movement engaging the bar 32, thus swinging it clear of the ends 36 of key levers 16 to the normal position shown in Figs. 2 and 8. Upon the rearward movement of link 1215 bar 32 is moved above the end 36 by spring 12 anchored to 32 and pin on plate 14, Figs. 5 and 7.

Link 1215 is provided at its front end with a slot and stud connection. Stud 37 is secured to a bracket 39 extending upward from the base of machine, Figs. 2–8–8a, said stud passing through slot 38 of the link 1215. At its rear, link 1215 is pivotally connected at 1230 to an upright lever 1231, Figs. 2–5–9–14. Slot 38 is of just sufficient length to permit link 1215 such movement rearward when said link is disengaged from detent 1209 as to release the stop cylinder escapement and position a tooth 1234, on the lever 1231, in the path of blades 1235 carried by cylinder shaft 42; and to permit bar 32 to engage over the end 36 of an actuated key lever.

A pin 40, Figs. 2–8–8a, on the link 1215, engages detent 1203 when detent 1209 is disengaged from tooth 1213 as link 1215 moves rearwardly and thus disengages notch 1203a from plate 24. This permits detents 1203 and 1209 to be moved upwardly by springs 1206 and 1212 upon the return movement of link 1215 and thus lock link 1215 even though bail 24 does not return, as when it is held down by a prolonged depression of the key stems 4 and 5.

The connections from the rear end of link 1215, whereby the movements of the latter hereinbefore mentioned control rotation of the stop cylinder, will now be described. The upright lever 1231 to which the link 1215 is pivoted at 1230 is fulcrumed at 1232 to the bracket 1233, Figs. 2 and 14. At its upper end, lever 1231 has a segmentally arranged tooth 1234, which tooth in the normal position of the lever lies out of the path of the inclined ends of blades or arms 1235 of what has been designated an escapement spider 1236, which is fixed by its hub 1237 to the stop cylinder shaft 42, Figs. 9 and 14. 1240 is a stop lever having a bent upper end which normally stands in the path of and is engaged by one of the spider arms 1235, Figs. 9 and 14. Lever 1240 has a slot 1239, Fig. 2, engaged by a pin 1238 of the lever 1231, Figs. 5–9–14, and at its lower end is pivoted at 1242 to the forward end of a rock-arm 1241, fixed to a sleeve 1243 rotatable on a stud 1244 fixed to a bracket 1245 mounted on the sub-base 2 of the machine. The rock-arm 1246 projecting upward from the other end of sleeve 1243, carries a stud 1247 engaged by the forward end of a slotted link 1248, the rear end of which pivots in an opening in the end of the lever 1251, Figs. 5–9, pivoted at 1252 on the bracket 44, position of parts shown in Fig. 5. A forked end of lever 1251 engages a pin 1253, Figs. 5–14a, fixed to the wing 1163 of the grip dog 1160 pivoted at 1161 to the bracket 44. As hereinafter more fully described, in section 11 of this specification, the grip dog 1160 is adapted to grip the rim of a cupped wheel 1157 and, by holding the same against rotation hold out of action the clutch for rotating worm shaft 1155, from which motion is communicated to the stop cylinder shaft 42, as hereinafter explained. Spring 1166 connected to grip dog 1160 tends to swing the same on its pivot 1161 to a non-gripping position with relation to the rim of wheel 1157.

With the parts in their normal position shown in Figs. 2–5–9–14, with the link 1215 locked in its forward position against the tension of the spring 1216, the upper bent end of the lever 1240 lies in the path of and is contacted by one of the spider arms 1235; in this position, lever 1240 holds the arm 1241 downward and the arm 1246 forward, exerting a pull, through the link 1248, upon the lever 1251, thereby causing the latter to hold the grip dog 1160 in position, against the tension of its spring 1166, to grip and hold the wheel 1157 against rotation, and the clutch for rotating the stop cylinder, consequently, out of action. Upon the actuation of a key, the link 1215 moves rearward, carrying the tooth 1234 into position to be acted upon by the spider arms 1235 when the stop cylinder rotates. This rearward swinging of lever 1231, through the pin and slot connection 1238 and 1239, swings lever 1240 rearward, carrying its bent end out of the path of the spider arms. Thereupon, the spring 1166 will swing the grip dog 1160 to its inactive position, with corresponding movements of lever 1251, link 1248 and arms 1246 and 1241, and lever 1240, and the stop cylinder clutch will immediately become active to rotate said cylinder as hereinafter more fully explained. Upon this rotation of the stop cylinder, the spider arm 1235, acting upon the tooth 1234, will swing the lever 1231 forward, carrying with it the link 1215, which latter will be retained in its advanced position by engagement of tooth of detent 1209 with tooth 1213 on the link 1215. When by the action of the spider arms 1235 on the tooth 1234 the lever 1231 reaches its normal position shown in Figs. 2–14, the upper bent end of the lever 1240 will have been swung forward into the path of a spider arm 1235; said arm acting upon said lever 1240 will move the same downward from its slightly elevated position to its normal position, thereby actuating the connections to the grip dog 1160 to move the same against the tension of its spring 1166 into its gripping position with relation to the wheel 1157. The stop cylinder clutch will thus be thrown out of action with all parts restored to their normal positions.

*3.—Horizontal accumulator—Adding and subtracting movements of racks—Carrying tens mechanism—Control for determining operation for addition and subtraction*

Illustrated particularly in Sheets 1—2—3—4—9—11—12—13—14—15 and 16.

The machine illustrated has ten primary figure or accumulator wheels, each visible along the line "B—B" Fig. 4, through a transparent portion of a ground glass window in the machine casing (see also Fig. 2).

Referring particularly to Sheets 2 and 11, 115 are parallel plates or grids of the outline shown; there are nine of these, spaced apart to admit between adjacent grids a figure wheel and other parts. At their forward ends, grids 115 rest in notches 127a in the upturned edge of a cross beam 127, connected between side frames 128 and 129 of the machine, and at their rear ends they engage notches 130a, Fig. 16, in the lower edge of a cross beam 130 also connected between said side frames. Figure wheel shaft 116 passes loosely through these grids 115 and extends through bearing openings in side frames 128 and 129. A key-way 117, Figs. 16 and 17, runs the entire length of the figure wheel shaft 116. Ten eccentrics 118 on shaft 116 each have a lug 118a, Figs. 16 and 28, which fits into the key-way 117. Between each eccentric and the adjacent grid to the left is located a sleeve 119 loose on figure wheel shaft 116, and acting as a separator. Each sleeve 119 has a reduced left-hand end fitting into the opening in a grid 115, through which opening the shaft 116 passes. Sleeves 119 are thus fixed against rotation. At the right hand end of the shaft 116 in place of a sleeve an annular boss 119a projects inward about the shaft 116, Fig. 4. Surrounding sleeves 119, respectively, and of practically the same length, are ten hubs 120. Fig. 16a, Sheet 11, shows one hub 120 omitting parts mounted thereon. Each hub is mounted loosely on its sleeve to turn with its figure wheel as presently described. Each hub 120 has an opening with two flat sides and fits a similarly shaped opening of figure wheel gear 121. Fastened with said gears 121 on said hub, against shoulders 120a, Figs. 16 and 16a, Sheet 11, are the guide disks 122, the function of which will be hereinafter described. These guide disks 122 are also mounted on the hub 120 by means of a flat-sided opening. Against the oppositely disposed shoulder 123 of hub 120 is set what has been designated a primary figure wheel 124, being bound to hub 120 by a flat-sided formation, similar to the setting of the gears 121. Fixed on one side of each figure wheel 124, by means of three shouldered pins 125, is the figure wheel rim 126, said rims each having three sets of figures from 1 to 0, Fig. 17.

For each of the ten primary wheels there is an actuating rack 131 shown in Fig. 16 in its normal inactive position with reference to gear 121. Said racks at their forward ends are forked, and each arm of the fork has inwardly disposed teeth as shown. If the rack be lifted engaging the teeth of its lower arm with gear 121, and said rack be moved forward (to the right, Fig. 16), figure wheel 124 will be turned forward (the direction in which the digits on the figure wheels progress) to advance the figures thereof a corresponding number of spaces of units; i. e., a number will be added on the figure wheel. If on the contrary said rack be dropped so as to engage the teeth of its upper arm with the figure wheel gear 121, and the rack then moved forward, the figure wheel will be turned backward (the direction in which the digits on the figure wheels retrogress), i. e., a number will be subtracted.

Said upward and downward movement of all of the racks 131 is effected by the following means: Fixed to the side of the arms of each rack are guide plates 132 and 133, Figs. 28 and 16, contacting with the neighboring accentric 118, heretofore described. Therefore when figure wheel shaft 116 is rocked in its bearings, carrying with it eccentrics 118, the ten racks 131 will be raised or lowered by the eccentrics, according to the direction of rotation of the shaft. Means are also provided for raising and lowering the rear end of the racks. Crank shaft 134, Fig. 28, is notched at 134a on its upper side and at 134b on its lower side, forming reduced portions working in slots 135 cut in the rear ends of racks 131, Fig. 16 and 28. Shaft 134 is pivotally supported at its opposite ends to turn in crank arms 136 and 137 on the inner ends of pivot-studs 138 and 139, which extend through openings in the side frames of the machine. When shaft 134 is swung, it causes a rise or fall at the rear end of racks 131 equal to the rise or fall at their forward ends heretofore described. Shaft 134 is swung up or down by the following means: A bell-crank lever 140, Figs. 3–28, is fixed to stud 138 outside of side frame 128. A pin 142 of a lever 143 works in a slot 141 of lever 140. Lever 143 is pivoted at 144, Fig. 3, its operation will be hereinafter described. On pivot stud 139 outside of side frame 129 is secured a rock-arm 145, Figs. 1–28. To the lower ends of arm 145 and lever 140, respectively, are pivoted connecting links 146 and 147, Figs. 1–3–28. At their forward ends these links are connected with arms 148 and 149, respectively, attached rigidly to figure wheel shaft 116 outside of side frames 128 and 129. It will be seen that oscillation of shaft 116 acting (through eccentrics 118) to raise or lower the forward ends of racks 131, will simultaneously (acting through arms 148, 149, links 146, 147, etc.) raise or lower the rearward ends of said racks.

The mechanism for carrying tens from each figure wheel to the figure wheel of the next higher order or denomination is actuated by the pins 125, heretofore mentioned as securing to each figure wheel its rim 126, Fig. 16. The three pins of each wheel project from the side thereof, as shown in Fig. 17. Since there are ten figure wheels, there are nine sets of similar means for carrying tens, one set for each of the figure wheels beginning with that of the lowest denomination. A description of one set (shown in Figs. 16 and 17, sheet 11), will suffice. A bent lever 151 is pivoted to grid 115 by a pivot screw 152. The rounded V-shaped point 150 of lever 151 projects into the path of pins 125, whereby the lever will be swung on its fulcrum and its rear end raised by the pins passing said point upon rotation of the figure wheel in either direction.

At its rear end lever 151 has a shoulder 153 normally in engagement with lug 154 of a lever 155, pivoted on a shaft 156 common to all of said levers 155. Lever 151 at its rear end is pressed by a spring 157. Lever 155 is under tension of spring 158, both springs 157 and 158 being anchored to lug 159 at the end of grid 115. It will be evident that when carrying tens pins 125, moving in either direction, strike the point 150 and raise lever 151, shoulder 153 will release lever 155 and spring 158 will swing said lever rearward at its upper end. Spring 158 is fastened at one end to lug 160 of a lever 161, pivoted at 162 on lever 155. Lever 161 has a forwardly extending arm 163 resting normally (as shown in Fig. 16) on ledge 164 of a forked carrying-rack 165, hereinafter described. Upon the release of lever 155 at its upper end, as heretofore described, lever 161 swings with lever 155 and its arm 163 will drop from said ledge 164 to a position behind the rear end of the carrying-rack, whereby upon the return movement of said levers 155 and 161, carrying-rack 165 will be moved toward the front of the machine. The limit of throw of said lever 161 by spring 158 is the lug 166 of lever 155, Fig. 16.

Carrying-rack 165 in its general outline resembles rack 131. On the inner edge of each arm of its forward forked end are three teeth. When the lower set of teeth are in engagement with the teeth of figure wheel gear 121, and said carrying rack is moved forward the distance of one unit's space, the figure wheel will be rotated forward to add one on the wheel. When the upper teeth of said carrying-rack are in engagement with the figure wheel gear, the figure wheel will be rotated backward one unit's space to subtract one on the wheel. It will be understood that the carrying-rack of each figure wheel is tripped by pins 125 of the figure wheel of the next lower denomination when the latter wheel passes from 9 to 0 for addition, or from 0 to 9 for subtraction. There is also one of these racks and its operating and controlling mechanism for the figure wheel of lowest denomination, but for this wheel said rack performs no carrying function, and its other functions are hereinafter described.

The said carrying-racks 165 are guided at their rear ends in notches 167, Fig. 17, of cross beam 130, heretofore described. At its forward end each rack 165 is guided on one side by the adjacent flat face of rack 131, and on the other side by the guide disk 122, (see Fig. 17). Carrying-racks 165 are slidably supported upon the plate 168, notched at its forward edge, as shown in Fig. 4, to make room for the racks 131, and pivoted by pivot studs 169 and 170, Fig. 4, in the side frames 128 and 129 of the machine. The two inwardly disposed sets of carrying teeth are moved into and out of engagement with the figure wheel gears by the rocking of plate 168 on its pivots by rockarm 171, Figs. 3-4-29, actuated as hereinafter described.

The means for imparting the forward movement (toward the right in Fig. 16) to the carrying-rack 165, will now be described. A retracting spring 177 (see also Fig. 17) connected to cross-beam 130 at 179 and to a pin 177a on carrying-rack 165 normally holds the latter retracted with the end wall of its slot against the forward edge of plate 168. When all of the parts are in their normal starting positions shown in Fig. 16, the lower rounded end of lever 155 bears against what may be designated the dropping off point 173a of a cam 173 fixed to a cam shaft 172 extending across the machine and projecting through bearings in the side frames 128 and 129. If in this position, lever 151 were actuated to disengage its shoulder 153 from in front of the upper end of lever 155, the latter could not make its initial rearward movement hereinbefore described. But by means hereinafter described shaft 172 is given an initial rotation in the direction of the arrow, Fig. 16, sufficient to carry the point 173a of the cam past the end of lever 155. This movement is effected before the rack 131 rotates the figure wheel and hence before any one of the pins 125 can trip lever 151. Hence there is no movement of levers 155 at the time points 173a of the cams pass from contact therewith. Following its initial movement above mentioned, shaft 172 is not further rotated until the mechanism (including racks 131) has operated the figure wheels, or such of them as must be operated for the particular computation to be performed. Assume that the particular figure wheel shown in Fig. 16 has been thus moved and one of its pins 125 has actuated lever 151. Lever 155 is thereby released and arm 163 of lever 161 drops behind the ledge of the carrying-rack adjacent thereto. The plate 168 is now turned on its pivots 169 and 170 to throw the upper or lower teeth of the carrying-rack into mesh with the gear 121. This gear 121 does not belong to the figure wheel shown in Fig. 16, but to the next higher figure wheel. Following this, further rotation of the cam shaft (by means hereinafter described and during the time racks 131 are making their return movement) causes the cam surface of the cam 173 to swing the upper end of lever 155 forward, thus imparting, through the arm 163 forward movement to the carrying-rack 165 to rotate its figure wheel one unit's space. This swinging of lever 155 enables lever 151 to again engage its shoulder 153 with lug 154. Shaft 172 continues to rotate until finally it stops with cam 173 in the position shown in Fig. 16. The arm 163 continues to hold the carrying-rack 165 forward against the tension of its spring 177, with one set of teeth in mesh with gear 121, until the teeth of rack 131 are moved into engagement with said gear for the next operation of the figure wheels. Corresponding sets of teeth of each of the nine other carrying-racks 165 also thus remain normally in locking engagement with their corresponding gears during this period, whether or not said carrying-racks have acted to move the figure wheels an additional space. The operation is so timed that at the beginning of each turning of the figure wheels, or any of them, the teeth of racks 131 move into engagement with gears 121 before the teeth of racks 165 become disengaged therefrom by the turning of plate 168 on its pivots. It follows that the teeth of one or the other set of racks are always in engagement with the gears 121, thereby preventing idle, overthrow or other false movements of the figure wheels.

Recurring now to the release of those racks 165 which have been operated to actuate their figure wheels and which stand held in their forward position by arms 163, Fig. 16, upon the ensuing operation of the figure wheels after the teeth of racks 165 have been moved clear of gears 121, but before racks 131 have moved longitudinally to turn the figure wheels, and simultaneously with the initial turning of shaft 172 to carry the points 173a of the cams from under levers 155, a trip bar 174 is swung to the left, Fig. 16, and strikes the upper ends of levers 161, lifting arms 163, or such of them as are active, from their locking position, permitting springs 177 to restore all racks 165 to the position shown in Fig. 16.

Trip bar 174 has at its ends downwardly bent arms 175 and 176, fixed to shaft 156, Figs. 2-4-16. 178 is a rock-arm on the end of said shaft, outside of the right hand side frame of the machine, Fig. 29. A spring 178x, Fig. 29, connected to arm 178 and a stud 424 on the machine-frame, normally holds trip-bar 174 in the position shown in Fig. 16c, with its arms 175 and 176 contacting the edges of the bent ends of cross beam 130. The end 232x, Fig. 29, of a control lever 232, hereinafter described, strikes the lower end of arm 178 at the proper time, to swing trip-bar 174 rearward, as described above.

There are nine cams 173, one for each lever 155, at proper intervals along shaft 172. The points 173a of all of these cams are in line, but the distance of the cam-surfaces from the point 173a increases in successive cams beginning at the right hand end of the shaft. Fig. 18 shows the cam of the first carrying mechanism between the first or units wheel and the second or tens wheel; Fig. 19 shows the cam for the second carrying mechanism between the tens and the hundreds wheel, and so on through the ninth cam of Fig. 26. As will be apparent, the rise of the cam surface begins at a greater distance from the point 173a in Fig. 19 than in Fig. 18, and so on through Fig. 26. It follows that the cams are timed to act upon their levers 155 successively, the importance of which will be understood. For example, assume that the first nine figure wheels are set to represent 999,999,999, and that one is to be added. The turning of the first wheel one space by its rack 131 would cause one of the pins 125 of that wheel to trip lever 151 of the first carrying mechanism and release its lever 155. Thus the parts stand until shaft 172 rotates to bring the cams 173 into action. The first cam, Fig. 18, will actuate its carrying mechanism to rotate the tens wheel one space—thereby carrying a pin 125 of the tens wheel from 9 to 0 and actuating lever 151 of the second carrying mechanism to release its lever 155—before the second cam, Fig. 19, comes into action, and so on. Now, if the second cam acted at the same time as the first, lever 155 would not have been released in time to be actuated by said cam to operate the second carrying-rack, and the one carried to the second wheel would not in turn be carried to the third wheel, and so on. Hence, the importance of shaping the cams to act successively and not simultaneously.

The means, hereinbefore mentioned, for imparting an initial rotation to cam shaft 172 will now be described. A notched disk 1280, Fig. 29, is secured to the right hand end of said shaft 172 outside of side frame 128, and is adapted to be acted upon by a plunger 1281 to give the shaft its initial rotation. Said plunger is pivoted at 1282 to a lever 1283, fulcrumed at 1285 and having a notch engaged by a pin 1286 on an arm 178a at the upper end of arm 178. A spring 1284 holds the plunger 1281 in contact with disk 1280. The swinging of arm 178 to the left, Fig. 29, for the purpose of swinging the trip bar 174, Fig. 16, has been hereinbefore described. This same movement of arm 178 actuates lever 1283 and plunger 1281 to impart the initial rotation to shaft 172 for the purpose of carying the points 173a of the cams 173 from under the levers 155.

The means for completing the rotation of the cam shaft 172 (following its initial movement)—during which the cams act successively upon their levers 155, as heretofore explained—to the position shown in Fig. 16, will now be described. An arm 180 is fixed to the extreme left hand end of shaft 172, outside of frame 129, Figs. 1 and 37. A pawl 182 is pivoted to said arm at 181 and held in contact with a disk 184 by a spring 183. Said disk is loose on shaft 172 adjacent to arm 180 and has a single ratchet tooth 184a. A gear wheel 185 secured to disk 184 meshes with the teeth of a segmental rack 186 at the upper end of an arm 187 pivoted at 188 on a bracket-arm 189 secured to side frame 129. The swinging of arm 187 and its rack is effected by a pin 191 working in a slot 190 of said arm, said pin being carried by an arm of a lever 192 secured to the end of a shaft 203, Fig. 1, and more fully described hereinafter. A pin 193, also fixed to said arm of lever 192, works in the slot 194 of the upper forked end of a lever 195, Figs. 1 and 37, fastened to and fulcrumed by the projecting end of shaft 196 which extends across the machine, being journaled in bearings in the side frames. A roller 197 on the lower end of lever 195 is held in contact with a cam 1194 (referred to again hereinafter) which acts to swing said lever in one direction against the tension of a spring 198, connected between pins 195a and 199, which swings the lever in the other direction. The consequent swinging of lever 192 also swings segmental rack 186.

The initial rotation of shaft 172, in the direction of the arrow, Fig. 16, moves the pawl 182 in the same direction away from tooth 184a. As rack 186 swings to the right, it turns the gear wheel 185 and disk 184 until tooth 184a passes the pawl 182. Upon the reverse movement of these parts, the tooth engages the pawl and completes the rotation of shaft 172 for the purpose explained.

The means for reciprocating racks 131 for the purpose of turning the figure wheels will now be explained. A lever 200, Figs. 3 and 29, is fixed on the projecting end of the shaft 196 opposite from that to which lever 195 is fixed. Working in a fork or slot of the upper end of said lever is a pin 201 fixed to a lever 202, corresponding to the previously described lever 192 on the other side of the machine. Lever 202 is fixed to one end of shaft 203, and lever 192 to the other end thereof, the shaft being journaled in bearings of side frames 128 and 129 and passing loosely through and helping support grids 115, hereinbefore described. A rod 204 connects levers 192 and 202 at their outer ends, Figs. 1–2–3 and 29. The frame thus formed swings with its shaft 203 as a pivot. In its normal position, rod 204 contacts main-slide levers 205, Fig. 2, loosely pivoted on shaft 203. Levers 205, of which there are ten, are fixed to hubs which hold the levers properly spaced along shaft 203 and between grids 115.

Springs 207, Fig. 2, attached to lugs 205a of levers 205 and anchored to lugs 208 of grids 115, tend to swing the lower ends of levers 205 forward. A pin 209 on each lever 205 works in a notch 210 of a corresponding rack 131 and reciprocates the latter. A stud 211 at the lower end of each lever 205 engages a slot 212 in a corresponding main slide 213, see also Fig. 30, Sheet 14, whereby the latter are also reciprocated. There are ten slides 213, Fig. 30, supported at their forward ends by a cross bar 215 extending between the side frames and passing through slots 214; another cross bar 217 passing through slots 216 supports the slides at their rear ends. At their forward and rearward ends, slides 213 work in guide slots in plates 218 and 220, Fig. 2.

Said plates extend between the side frames and are connected thereto, and support cross bars 215 and 217.

Each of the slides 213, except that corresponding to the figure wheel of highest denomination, has a depending or drop-arm 222, see Fig. 10; these arms vary in length and shape for the purpose of bringing the ends thereof into different positions corresponding to the positions of the rows of cylinder stops 45. Thus, if the cylinder stops be set to represent 945, the five stop in the row (the next to the right of projections 66, Fig. 10) standing in units position will have been swung on its pivot to stand in line with, and in the path of movement of, the end of the first drop-arm 222 (at the right of Fig. 10) which is on the slide 213 for the units figure wheel; the four stop of the row standing in tens position will stand in the path of the second drop-arm 222, and the nine stop of the row in hundreds position will stand in the path of the third drop-arm. Since the tenth figure wheel is provided in the machine illustrated for the purpose of carrying thereto tens from the ninth wheel, no provision is made for actuating the slide 213 of the tenth wheel according to a setting of the stops 45. Hence, said slide has no drop-arm 222, as before stated, although it does have a corresponding lug 213a, Fig. 10, the function of which is explained later.

Normally, the rod 204, the levers 205, slides 213 and their drop-arms 222 stand in the position shown in Fig. 2, with the springs 207 under tension. As to those rows of stops 45 in which no one of the nine stops has been set to represent one of the digits 1 to 9, the ends 59 of the bails 58 stand in the path of the drop-arms 222, it being remembered that the setting of a stop in a row swings the bail for that row to one side to lock the stop in its set position. This movement of the bail also clears the path for a drop-arm to move forward until arrested by the set-stop. There is normally a slight clearance between the drop-arms 222 and the ends 59 of the bails 58 to avoid frictional contact and interference with rotation of the stop cylinder. If, for example, the number 500 has been set up on the stop cylinder, the bails 58 of the rows of stops standing in the units and tens positions will stand in the path of the drop-arms corresponding to the units and tens figure wheels, while the fifth stop 45 in the hundreds row will stand in the path of the drop-arm corresponding to the hundreds figure wheel. It follows that when the rod 204 is swung forward (through the action of lever 195, spring 198 and cam 1194, as hereinbefore described), the spring 207 actuating the hundreds slide 213 will advance said slide a distance equal to five spaces until stopped by contact of its drop-arm 222 with said set fifth stop 45. The hundreds figure wheel will then turn five spaces, i. e., from 0 to 5. All other slides 213 will advance slightly, until their drop-arms contact the ends of bails 58, but this movement will not be sufficient to turn their figure wheels.

As heretofore described, the racks 131 and 165 engage the figure wheel gears, and turn the figure wheels, on their forward reciprocation; when the lower teeth of the racks of either set engage the gears, the figure wheels are rotated forward (in the direction of the arrow, Fig. 16) for addition, and when the upper teeth of said racks engage said gears the figure wheels are rotated in the opposite direction, or rearward, for subtraction. The eccentrics 118 and the crank shaft 134, whereby the racks 131 may be raised or lowered, as hereinbefore described, normally stand in an intermediate position, Figs. 2 and 16, so that neither set of teeth on said racks are in engagement with the figure wheel gears 121. The connections—including a lever 143, a pin 142 on the forward end thereof working in a slot 141 of a bell-crank lever 140, etc. Fig. 28—Sheet 12—for swinging the eccentrics 118 and shaft 134 upward or downward, have also been described. It follows that if the forward end of lever 143 swings downward, the lower teeth of the racks 131 will engage the figure wheel gears for addition, while if the forward end of said lever swings upward the upper teeth of said racks will engage said gears for subtraction. The swinging of the lever 143 is determined by the following means: 234, Figs. 3-28-29, is a cam switch secured to the rear end of lever 143, and formed of a plate having flanges along opposite edges; a switch member 236 is pivoted at the forward end of 234. In the normal position of the parts, an inwardly projecting stud 233 on the control lever 232 engages the neck of said groove, Fig. 28—Sheet 12. If, with the switch member 236 standing in the position shown in Figs. 3-28-29, the stud moves forward, it will be switched into the upper cam groove and swing lever 143 on its pivot 144 to raise its forward end upward for subtraction. If the position of switch member 236 be changed to direct stud 233 into the lower cam groove, the forward end of lever 143 will be lowered for addition. The switch member 236 is fixed to its pivot stud 235 which passes through lever 143 and carries a switch lever 241, Fig. 28, spring 241a tends to constantly hold these parts in the position shown in Figs. 28-29. 301 is the addition bar located at the front of the key-board, Fig. 4, the mechanism of which will be fully described hereinafter. For the present, it suffices to say that when this bar is actuated or depressed by the operator, a bar 223, Fig. 32, Sheet 15, moves forward and a rod 224, Figs. 28-29-32, moves rearward. A tooth 223a on the bar 223 trips a detent 225 against the tension of its spring 225a. Detent 225 is pivoted at 226 to a lever 227 fixed on a short shaft 228 journaled in bearings in a bracket 365 rising from the base at the right hand side of the machine and in side frame 128, Figs. 3-29-31-32. The rear end of bar 223 has a wing embracing post 365a of the bracket 365 to hold it upon a ledge 225c of the bracket 365, Figs. 29-32. This tripping of detent 225 disengages its tooth from said ledge, and a spring 229, connected between a stud 357 on side frame 128 and rear of lever 227, swings the latter, the lug 231 on lever 227 contacting the rear edge of control lever 232 at the same time swings 233 forward to act upon the cam switch 234 as before described.

The rearward movement of rod 224 by depression of the addition bar 301 actuates a lever 237 secured to a short shaft 240 journaled in the bracket 365 and oscillates an arm 238 secured to the opposite end of shaft 240, Fig. 28. Arm 238 and a connecting link 239 secured at 241b to the lever 241, thus actuates the switch member 236 to guide the stud 233 into the lower cam groove and swings the lever 143 downward for addition.

It is appropriate at this point, before proceeding with the description of the operation resulting from depression of the substraction key, to explain how the lever 227, the detent 225, and the lever 232, are restored to their positions illustrated in Figs. 3-29, with the detent in engagement with its ledge 225c. Lever 227 fixed to shaft 228 extends through a bearing in side frame 128, Fig. 31, and at its inner end has an arm 97 carrying a roller 1195a, for cooperation with a cam 1195 on the main cam shaft 1171, dotted lines Fig. 29. When the lever 227 oscillates, the arm 97 swings upward until roller 1195a contacts cam 1195, and thus limits and determines the movement of the lever 227 as well as the other parts which receive their movement from said lever.

The operation of the mechanism is so timed that after the racks 131 make their forward movement, but before they make their return movement, the cam 1195 acts through the connections just described to swing lever 227 back to its normal position shown in Fig. 29. A spring 398 Figs. 29-31, connected between pin 1191 on a lever 206 and a lug on lever 232, acts to hold the latter against the lug 231 of the lever 227, so that ordinarily the two levers move as one. But in one of the totalizing operations to be explained hereinafter, this spring permits the lever 232 to be retained in its forward position while the lever 227 is returned to its normal position. In returning to its normal position, the lever 227 carries with it the detent 225, the tooth of which becomes again engaged with the ledge 225c.

When the subtraction key 325, Fig. 4, is depressed, the bar 223 is moved forward, through connections explained later, to trip the mechanism; but rod 224 is not moved rearward and the switch member 236 remains in the position shown in Figs. 28 and 29, to guide stud 233 into the upper cam-groove for subtraction.

Normally, that is after the figure wheels have been operated to add or subtract a number thereon, one set of teeth on the carrying-racks 165 stand in engagement with the gears 121, Fig. 16, and so remain until the mechanism is again set into operation, and the teeth of the racks 131 engage with the gears. If the last operation has been one of addition, the lower teeth of the racks 165 stand in engagement with the gears; if one of subtraction, the upper teeth of said racks stand in engagement with the gears. When the racks 131, or any of them, are moving forward to rotate the figure wheels, the racks 165 stand in an intermediate or neutral position with both of their sets of teeth clear of gears 121. As before explained, plate 168 oscillates on its pivot studs 169 and 170 to move the teeth of racks 165 into and out of engagement with gears 121. A rock-arm 171 on pivot stud 169, Fig. 29, being actuated for this purpose by means which will now be described. A cam switch 243 (generally similar to cam switch 234) is fixed to the lower end of arm 171, (see also Fig. 33) and has a switch member 245 fixed on pivot stud 245a and extending forward to the neck or junction of the upper and lower cam-grooves. An outwardly projecting stud 244 on the lever 232 travels in one or the other of these grooves. As shown in dotted lines, Fig. 29, this stud stands in the lower groove, holding the end of arm 171 up, and the plate 168 in such position as to engage the upper teeth of racks 165 with gears 121, as shown in Fig. 16. This position of the parts indicates that the preceding operation was one of subtraction. When the lever 232 swings forward on the next operation of the mechanism, stud 244 travels in the lower groove, but does not move the rock-arm 171 until it travels up the bend of the grooves into the neck thereof and there lowers the arm to shift racks 165 to their intermediate position with both sets of teeth out of engagement with the gears. In the meantime, the stud 233 has moved either the lower or upper teeth of racks 131 into engagement with the gears, according to whether the operation is addition or subtraction. If the operation is addition the switch member 236 will be swung upward from the position shown in Fig. 28, and the stud 233 travels upward in the lower cam groove to the end thereof (engaging the lower teeth of racks 131 with the gears), while stud 244 travels upward in the lower cam groove of cam switch 243. Now as the assumed operation is one of addition, the stud 244 must, on its return travel in its upper cam groove and thereby swing arm 171 downward to move the lower teeth of racks 165 into engagement with gears 121. The switch member 245 must therefore be shifted, from its position shown in Fig. 29, to guide stud 244 on its return journey, by means which will now be described.

A switch lever 251 is fixed on stud 245a and a spring 251a, between lug of said lever and a lug on arm 171, tends to hold switch member 245 in the subtraction position shown in Fig. 29. A link 246 and a link 247 pivoted to stud 248 on side frame 128 depend so that their lower ends contact with the cam switch 234 and switch lever lug 251b, respectively, Figs. 28–29–33. Lug 246a overlaps the link 247 and a spring 249 anchored thereto and to lug 247a tends to align links 246 and 247 in neutral position as shown in Figs. 29–33. An extension 247b of link 247 depends in the path of a lug 251b on lever 251, Figs. 29–33. Extension 246b of link 246 depends in the path of the cam switch 234, Figs. 28–33. In the normal position of the cam switch 234 (that of subtraction) shown in Fig. 29, the links 246 and 247 merely depend freely between 234 and 251b, and thus by the tension of the spring 251a the switch member 245, Fig. 29, is thrown upward so that on the return of the stud 244 on the lever 232 the arm 171 will be thrown upward to engage the upper teeth of the racks 165 heretofore described in the operation of subtraction.

In the operation of addition the switch member 236 is swung upward and stud 233, as described, with the forward movement of the lever 232 forces the rear of cam switch 234 upward and the lever 143 downward. As the rear of 234 swings upward it engages extension 246b and links 246 and 247 are separated when extension 247b contacts with lug 251b. Spring 249 is of sufficient strength to overcome the tension of spring 251a and thus extension 247b forced against lug 251b of the lever 251 connected to switch member 245 moves the latter when stud 244 of the lever 232 has reached the neck of the cam switch 234. On the return of stud 244 it takes the upper cam groove and forces the arm 171 downward and the lower teeth of racks 165 in mesh with figure wheel gears 121 as heretofore described in the operation of addition.

It will be understood from the foregoing detailed description that the racks 131 are adapted in their forward movement to turn the figure wheels in one direction for subtraction and in the opposite direction for addition, and the carrying-tens racks 165 adapted upon their forward movement to turn the figure wheels in one direction for addition, or in the opposite direction to perform direct subtraction. These racks also serve the important function of engaging the figure wheel gears before racks 131 are disengaged and of always remaining so engaged while said racks are out of engagement; the carrying-racks thus also serve as aligners for the figure wheels.

The so-called cam-switches, one fixed to a lever which controls the engagement of the racks 131 with the figure wheels, the other fixed to an arm which controls the engagement of carrying-tens racks 165 with said figure wheels, and the movable switch members of these switches by their position determine whether the upper or lower teeth of the racks 131 and 165 are to be active. By the provision of the switches and cooperating parts, the racks 131 are engaged with the figure wheels and the racks 165 disengaged therefrom before any longitudinal movement of racks 131 begins.

As shown by the detailed description, the principal functions of either adding or subtracting are performed on the forward movement of the racks 131. Provision is made for carrying of tens and for erasing numbers set up on the stop cylinder during backward or return movement of the racks 131. There is thus presented a combination of movements which may be carried out more rapidly and is different from those in common use wherein the racks perform their principal function of addition or subtraction on their return movement.

The parts of the mechanism described under the present heading belong to what may be termed the side-frame section of the machine, being supported principally from said frames 128 and 129 by means of shafts, beams, pivots, etc.

4.—Addition bar and subtracting key for horizontal accumulator, and non-accumulating key and locking means for same Illustrated particularly in Sheets 1—4—5—6—7—15.

The addition bar 301 of the keyboard has been previously mentioned. It is supported by arms 302, 303 at its opposite ends, which arms extend downward through slots in plate 6a and Figs. 4–5, and at their rearward end are fixed to a shaft 304, Figs. 5–8, which is journaled in bearings in brackets 7 and 8 mounted on the base of the machine. The right hand end of shaft 304 extends beyond bracket 7 and has secured thereto a depending arm 305, Figs. 5–32. The hereinbefore mentioned rod 224 is secured to arm 305 and carries a collar 306 by which said rod is adjusted to coact with lever 237. It will be remembered that rearward movement of rod 224 swings the switch member 236 of cam switch 234 upward to effect movement of the lower teeth of racks 131 into engagement with the figure wheel gears for addition. A spring 302b anchored to a pin on arm 302 and flange of plate 29, Fig. 8, similar to spring 329 shown in Fig. 1, actuating the non-accumulating lever 328 for the same purpose, returns the addition bar 301 to its normal raised position.

Depression of addition bar 301 swings arm 302 downward; it strikes a pin 308 fixed to a lever 309, Figs. 5–34, loosely fulcrumed on shaft 17 journaled in brackets 7 and 8. A spring 309b connected to lever 309 and anchored to flange of plate 29 normally holds lever 309 raised. A depending link 310 is pivoted to lever 309 at 309a, Fig. 35. Notch 310a of said link engages a lug 311 of a detent 312 pivoted at 313 to a rock-arm 314 fixed on shaft 17. A pin 315 on detent 312 overlaps a lug 316 of another detent 317, Fig. 34, similar in shape to 312, and pivoted to bracket 7 at 317a. A spring 312b, connected between a lug on detent 312 and a pin 314a on rock-arm 314, holds said detent in the position shown in Fig. 35 on extension 312c contacting pin 314b. A spring 300 for detent 317, connected to a pin 317b on bracket 7, Fig. 34, holds detent 317 in contact with a pin 317c, on said bracket. The function of detent 317 will be explained later in describing the action of the non-accumulating key. In this, the normal positions of detents 312 and 317, the hooks at their forward ends engage a lug 318a of an arm 318 which is fixed to the inner end of a collar 319 free to turn on shaft 304, Figs. 5–35. Said collar passes through a bearing opening in bracket 7, its outer end has a projection 67 that engages with a slot in a collar 68, Fig. 5, to collar 68 is secured an arm 320 and to which bar 223, heretofore mentioned, is pivoted at 320a, Fig. 32.

From the above explanation of parts, it will be seen that upon depression of the addition bar 301—which is actuated only for addition—its arm 302 will strike pin 308 of lever 309, rocking same downward, against the tension of its spring 309b. Link 310 will also move downward; its lower end bears against lug 311 of detent 312 and carries the later downward against the tension of its spring 312b. The pin 315 of detent 312 overlaps lug 316 of detent 317 and carries the latter downward, against the tension of its spring. When both detents 312 and 317 are thus disengaged from lug 318a, a spring 321 anchored to arm 320 and to pin in base of machine impels arm 320 and bar 223 toward the front of the machine, such movement serving, as heretofore explained, to dislodge detent 225 from engagement with ledge 225c, which is followed by a forward movement of lever 232, its stud 233 traveling in the lower groove of cam switch 234, and thereby resulting in engagement of the lower teeth of the racks 131 and carrying-racks 165 with the figure wheel gears for the process of addition. The forward movement of lever 232 just mentioned results in throwing into action the clutch mechanism through which the main cam shaft 1171 is rotated, as explained in section 11 of this specification.

Detents 312 and 317 are restored to engagement with lug 318a by the following means: Shaft 17 has at its left hand end, Figs. 1–5, an arm 322 to which the forward end of a link 323 is pivoted; said link at its rear end is pivoted to a screw stud 324 eccentrically positioned on the end face of the main cam shaft 1171. It follows that link 323 is given one reciprocation during each revolution of said cam shaft, thereby oscillating shaft 17, to swing its arm 314 and the detent 312 forward and then backward again to the position shown in Figs. 34–35. By said forward movement, the hook of detent 312 is engaged with lug 318a to return arm 318 to its normal position by said backward movement. When arm 318 reaches its normal position, the hook of spring-actuated detent 317 also engages lug 318a. This return movement of arm 318 moves the bar 223 backward and by gravity its tooth 223a drops into engagement with detent 225.

Having thus described the operation of certain parts of the mechanism upon depression of the addition bar—connections for also throwing motor-driven parts of the machine into operation at the same time will be explained hereinafter—similar description will now be given with reference to the subtraction key 325, the position of which in the key-board is clearly shown in Fig. 4. This key is mounted on a lever 326 which extends downward through a slot in plate 6a, Fig. 35, and at its rear end carries a hub free to turn on shaft 304. A spring 326b anchored to a pin on lever 326 and to flange of plate 29, Fig. 35, similar to spring 329 shown in Fig. 1, actuating the non-accumulating lever 328 for the same purpose, returns the subtraction key to its raised normal position.

When the subtraction key is depressed, its lever 326 swings downward on shaft 304, and contacts the end 308a of pin 308 on lever 309, Fig. 34. Lever 309 thus moved downward actuates the parts in the same manner as upon depression of the addition bar just described, resulting in forward swing of lever 232 and the throwing into action of clutch mechanism for driving the main cam shaft 1171. It will be remembered that arms 302 and 303 of the addition bar are fixed to and rotate shaft 304, moving the rod 224 rearward to swing switch member 236 up and guide stud 233 in the lower groove for addition; but that lever 326 of the subtraction key, as just stated, turns on shaft 304 without rotating it. It follows that upon depression of the subtraction key, switch member 236 remains lowered to guide stud 233 in the upper groove, thereby effecting engagement of the upper teeth of racks 131 and 165 with the figure wheel gears for subtraction. As shown later (in section 5 of this specification), this also takes place in the two operations of the machine effected by the totalizing key.

327 is a key which has been designated the "non-accumulating" key; its position on the key-board is clearly shown in Fig. 4. Generally stated, its function is to cause the machine to operate to print a number set up on the stops of the stop cylinder without action upon the accumulator wheels. Said key 327 is mounted on a lever 328, which extends downward through a slot in the key-board plate 6a, Fig. 1, and pivots loosely on shaft 304. A spring 329 anchored to a pin on lever 328 and to flange of plate 29, Fig. 1, tends to hold 328 and its key elevated. An arm 330 is secured to lever 328 by a collar connection and receives the forward end of a rod 331 at 331a. The swinging of lever 328 on shaft 304 by depression of key 327 against the tension of spring 329 moves bar 331 rearward causing it to act upon the clutch mechanism through which the main cam shaft 1171 of the machine is given one revolution, as explained in section 11 of this specification. Incidental to this revolution of the cam shaft, link 323, Fig. 1, is reciprocated, as previously described, rotating shaft 17, thereby swinging arm 314 and detent 312 forward, Fig. 35. It is here that detent 317, pivoted at 317a to bracket 7, Fig. 34, as before described, performs its function; by its engagement with lug 318a it prevents arm 318 from swinging forward with said forward movement of detent 312, and consequently spring 321, Fig. 5, from moving bar 223 to effect a forward movement of lever 232. Since this lever 232 does not move when the machine is set into operation by depression of the key 327, its stud 233 remains standing in the neck of the groove of the cam switch 234, from which it follows that the racks 131 remain in their neutral position with both sets of their teeth clear of the figure wheel gears.

To print a number set up on the stops of the stop cylinder, the slides or some of them must move forward until their drop-arms 222, Fig. 10, contact the set stops. Through connections heretofore described, the racks 131 corresponding to the slides which move will reciprocate longitudinally. But being held in a neutral position clear of the gears, they will not rotate the figure wheels.

Since in this operation of the machine, the lever 232 does not move, its stud 244 will remain standing in the rear end of one of the grooves of cam switch 243, thus leaving one or the other of the sets of teeth on racks 165 in engagement with the gears to hold the figure wheels locked and aligned.

As hereinbefore described, there is a lug on the stem of each of the nine digit keys 9, cipher key 10, and the erase key 775 adapted upon depression of its key to enter between two of a number of rollers 23 and so crowd together the rollers on opposite sides of the lowered lug that no other key having a similar lug cooperating with said rollers can be depressed at the same time. Similar provision is made with reference to addition bar 301, subtraction key 325 and non-accumulating key 327 whereby no two of the same can be simultaneously depressed and no one of them depressed at the same time any one of the keys 9, 10 and 775 is depressed. A lug 349, Fig. 1, on lever 328 of key 327 extends forward into a slot in the rear side of bar 6, (designated 349a, Fig. 6), said figure showing key lever 328 depressed and lug 349 forcing the rollers to the right. The arm 302 of addition bar 301, and the lever 326 of subtraction key 325 have similar lugs 302a and 326a respectively, also projecting into slots in bar 6 and adapted to cooperate with rollers 23, Fig. 6.

Means are also provided for temporarily locking in their depressed position the keys 325 and 327, also the addition bar 301 until the operation of the machine corresponding to said key or bar has been completed. For the subtraction key 325, there is a lug 332 on lever 326 adapted to cooperate with a detent 334, Fig. 35, fixed at its lower end on a shaft 335 journaled in brackets 7 and 8. Upon depression of the key, lug 332 swings the upper end of detent 334 rearward against the tension of a spring 366 connected to a pin on a similar detent 342 and pin 366b in bracket 8, Fig. 1, until the shoulder on the detent snaps over said lug in position to lock the key down against the tension of its spring 326b.

The detent 334 is actuated to release the subtraction key, at the proper time, by the following means: A pivot stud 339, Fig. 35, on detent 334 passes through a slot in the forward end of a link 338 pivoted at its rear end to link 310. A spring 310c connected between lever 309 and link 310 tends to swing the latter forward. The forward movement of detent 312, for the purpose of engaging lug 318a to return arm 318 to the position shown in Fig. 35, has been described. In said forward movement, the lug 311 of detent 312 is dislodged from notch 310a of link 310, and spring 312b raises the working end of 312 until lug 311 passes in front of the edge of link 310. When in this relative position, the detent 312 makes its rearward movement, it will swing link 310 rearward and through link 338 swing detent 334 out of engagement with lug 332 to release the subtraction key. Shaft 335, to which detent 334 is fixed, also rotates, for a purpose described later.

For locking down the addition bar 301, there is a lug 341 (similar to 332) on arm 302 and a second detent 340 (similar to detent 334) fixed to shaft 335, Fig. 7. The detent 340 is withdrawn to release the addition bar by the same means just described for withdrawing detent 334. It has been shown heretofore that detent 312 will move forward and backward following a depression of the addition bar, the same as in the case of the subtraction key. Through the connections explained, shaft 335 will be rotated as just mentioned. This will swing rearward the upper end of detent 340 fixed to said shaft.

For locking down the non-accumulating key 327, there is a third detent 342, Fig. 1, similar to 334 and 340, fixed to the left hand end of shaft 335, and cooperating with a lug 343 (similar to 332 and 341) on lever 328. A pawl 345 is pivoted to a short shaft 69, Figs. 1–5–6, and is spring actuated by a spring 345a. Shaft 69 is secured to arm 322 previously mentioned. Normally, a flange 345b of said pawl bears against lug 343, as shown in Figs. 1–5, with the inclined end 346 of the pawl clear of a pin 347 projecting from the side of detent 342. Upon depression of key 327, detent 342 engages lug 343 and thus locks the key. Thereupon, when link 323 moves forward, as hereinbefore described, the inclined end 346 of pawl 345 contacts pin 347, lifting it until its tooth 348 drops in front of pin 347. Link 323 and with it arm 322 then move backward swinging detent 342 clear of lug 343, permitting spring 329 to elevate key 327 to its normal position. At the same time, lug 343 acts upon flange 345b, to lift tooth 348 of pawl 345 out of engagement with pin 347, whereupon spring 366 swings detent 342 forward, and the parts stand in the position shown in Fig. 1.

The parts described under the present heading belong mostly to the key-board section of the machine, and particular mention is made of the following: Depression of addition bar 301 effects a setting of parts and throws the main cam shaft into action (in a manner explained later) to throw the machine into operation to rotate the figure wheels in one direction to add thereon a number set up on the cylinder stops; whereas, depression of the subtraction key 325 will effect a different setting of parts and cause the main cam shaft to actuate the machine to rotate the figure wheels in the opposite direction for subtraction. Depression of the non-accumulating key 327 will cause the main shaft to actuate the machine to print a number set up on the cylinder stops without action upon or corresponding change in the position of the accumulator wheels. Numbers thus printed may be used to indicate dates, the private numbering of bank checks (the money values of which are being printed and totalized) and the like, which do not enter into the computation and must not, therefore, be registered on the figure wheels.

*5.—Totalizing key of the horizontal accumulator*

Illustrated particularly in Sheets 1—2—3—4—6—9—12—13—15 and 17.

The totalizing key 350, Fig. 4, has a lever 351, Figs. 3-32, rotatable on shaft 304 and when depressed actuates the mechanism to take a total or sub-total of the horizontal accumulator. 351 has mechanical connections similar to the addition bar 301, subtraction key 325 and the non-accumulating key 327 to lock when depressed till the machine makes a complete operation; and to place the rollers 23 so that no other key or the addition bar 301 can be depressed, and, also to release the clutch of the machine. A lever 356, Figs. 3-32 and 36, is secured to a short shaft 352 journaled in a bracket 353 mounted on the base 1 of the machine. Secured to 356 is an arm 355, the function of which is hereinafter described. A spring 254 anchored to arm 355 and to a pin 255 in side frame 128 is of sufficient strength to actuate the lever 356 when released by the depression of the totalizing key 350. Pivoted at 256 is a link 257 and a link 258. Link 257 has a lug 257a that overlaps 258 to permit upward movement of 257 with 258, Figs. 3-32. Tooth 257b engages a block 259 secured to side frame 879 and thus prevents forward movement of 356 from the tension of spring 254, Figs. 3-47. Bent end 258a of the link 258 projects to the left over a tappet 260 pivoted at 261 to the extension 351a of the lever 351. A spring 262 anchored to tappet 260 and to rear end of 351a tends to place said tappet in the position shown in Figs. 3 and 32.

A link 263 pivoted at 264 to, and, free to move with lever 356 performs the function of releasing the mechanical means to engage the clutch of the machine and to actuate the means to return the figure wheels to zero. Pin 265, Fig. 31a, on link 263 moves in the path of a lug 266 of the detent 225, Fig. 32. Thus following the parts described, the depression of the totalizing key 350, the lever 351 forces the tappet 260 against the bent end 258a, disengages the tooth 257b from the block 259 by the lug 257a overlapping the link 258. The tension of spring 254 causes a swinging forward movement of the lever 356 and link 263, the pin 265 forced against the lug 266 of the detent 225 dislodges 225 from the ledge 225c of the bracket 365 (normal position shown in Fig. 29). The forward movement of the lever 356 is limited by an extension 354 resting on the machine base.

Locking the totalizing key 350 when depressed will now be explained. A lug 70, Fig. 3, on the lever 351 (similar to lugs on 326, 302 and 328) is contacted by a detent 71 secured to shaft 335 (as are detents 334, 340 and 342 heretofore described). A pawl 72 similar to pawl 345 is pivoted to arm 73 secured to shaft 17, Figs. 3-6, and is spring actuated by spring 74, in a like manner releases the detent 71 as does the pawl 345 disengage the detent 342 when the shaft 17 is oscillated by the action of link 323. Lever 351 has a lug 351b, (similar to lugs 326a, 302a and 328a) that enters at the rear of bar 6 in slot 351c, Fig. 6, to spread the rollers 23 when 351 is depressed.

There is no actuation of the rod 224 to swing the switch member 236 upward, hence it remains in its lowered position, Figs. 28-29, and guides the stud 233 in its upper cam groove, corresponding to subtraction. It follows that, the stud 233 acting in the upper groove engages the upper teeth of the racks 131 with their figure wheel gears 121 upon the forward movement of said racks, thereby turning said figure wheels backwards in said forward movement, as in subtraction.

The present machine is constructed to perform that of clearing (returning to zero) the horizontal accumulator and of taking a sub-total (returning the figure wheels to the normal position of the amount accumulated in the horizontal accumulator after the figure wheels have been rotated in their backward movement to zero) by setting a so-called totalizing indicator in advance of the depression of the totalizing key 350. This indicator shown in Figs. 4—32—36—36a and 36b, includes a pointer 370 adapted to be set to marks conveniently inscribed on the case of the machine.

These marks and the operations with which they are identified are as follows:

Single star (*) "total" operation.
Double star (**) "sub-total" operation.
The indicator 370 takes a third position which will hereinafter be described, in connection with the vertical accumulators.

Pointer 370, Fig. 36, sheet 17, is fixed to a vertical shaft 372, which also carries above the pointer a milled knob 371 which the operator grips to rotate the shaft and pointer to the desired mark. Shaft 372 is mounted in a bearing 372d, Fig. 36a, of side frame 879. A gear 373 fixed to shaft 372 meshes with a rack 374 on a longitudinally movable bar 375, supported at its front end by a screw stud 376, screwed into the inner side of frame 879, Fig. 36, and passing through a slot 377 of the bar 375, and at its rear end by a stud 378 working in a slot 379 of the bar and fixed to bracket 365. The functioning of bar 375 when set to different positions by pinion 373 and the rack 374 upon rotation of shaft 372, will be later explained in describing the two operations above mentioned.

For the two totalizing operations named, means are provided to, first, stop the figure wheels 124, or such of them as are rotated, in a zero position, and, second, to swing bails 58 from their normal positions in the paths of drop-arms 222, Fig. 10, out of the paths of said arms to give the arms unobstructed movement while the figure wheels are being turned to a zero position. The means for accomplishing the first of these results is as follows:

To the extension 354 at 388 is pivoted a link 389, the upper end being pivoted to the end of frame 391 at 390, Figs. 3-32 and 36. This frame 391 spans the entire set of figure wheels 124, Fig. 4, and is hinged by studs 392 to side frames 128 and 129. The frame includes a plate cut to form rearwardly extending fingers 395, Figs. 4-32, one finger to each wheel adapted to cooperate with pins 125 thereon, the function of which in carrying tens has already been explained. Upon the forward swing of the lever 356 the extension 354 acts to pull link 389 downward, thus rocking the frame 391 and moving fingers 395 into the paths of said pins 125.

The swinging aside of bails 58 to clear the paths for drop-arms 222 is accomplished simultaneously with the above described setting of the fingers 395 by the arm 355 heretofore mentioned as being secured to lever 356. 355a of said arm, Figs. 3-32 and 36, moves to actuate the erasing mechanism, and is more fully explained in Section 7 of this specification describing the erase mechanism. This erasing mechanism is thus actuated and swings aside the bails 58. There are nine drop-arms 222 corresponding to the nine figure wheels of lower denomination. As already explained, the tenth figure wheel of the highest denomination is provided for the purpose of carrying tens thereto from the ninth wheel, but it has its corresponding rack 131, slide 213 and lever 205. On said slide 213 there is a lug 213a, Figs. 2-10, normally contacting a detent 213b pivoted at 213c to side frame 128, Figs. 1-32. A stud 213d on said detent works in a slot at the lower end of a link 213e pivoted at its upper end at 390a to the frame 391, Figs. 1 and 32. A spring 213g tends to lift lever 213b to the position shown in Figs. 1 and 10. When said frame 391 is rocked downward, detent 213b is lowered out of the path of the lug 213a, permitting the slide 213 to move forward in returning the tenth figure wheel to zero. It will be recalled that just prior to a forward movement of racks 131, the lever 232 swings forward and its stud 233 acts either in the upper grooves of cam-switch 234 to shift the upper teeth of racks 131 into mesh with the gears 121, or, in the lower grooves to shift the lower rack teeth into mesh with the gears. It has also been heretofore explained that just prior to the backward movement of racks 131, lever 232 swings backward to disengage said racks and gears for the return movement of the racks. To leave the racks and gears in mesh during the return movement of the racks, the backward movement of lever 232 is delayed until after the racks have made their return movement, in order to prevent lug 233 from shifting racks 131 into neutral position. A lug 399 on the lever 232, Figs. 29 and 31, is adapted to be engaged by a hook 400 of a lever 401 pivoted at 402 to the side frame 129, Figs. 29 and 29a. A spring 403 tends to hold lever 401 to cooperate with lug 399 on lever 232. A stud 405 on the lever 401 normally stands in the lower end of a slot 406 of a link 407 pivoted at its upper end by a stud 408 to the end of a lever 409 fulcrumed at 410 to bracket 365. A pin 411 on the lever 409 bears, by pressure from spring 403, against the edge of bar 375 at the point where it is provided with a depression 412. When the position of the bar 375 is such that pin 411 rests upon the elevation, the lever 401 cannot drop from the position shown in Fig. 29, and the lever 232 will swing backward with lever 227. But when pin 411 stands above the depression 412, spring 403 will swing the lever 401 moving its hook 400 downward into position to engage the lug 399 upon forward movement thereof, and hold lever 232 forward against the tension of spring 398, while lever 227 makes its return movement followed by return movement of rack 131 in mesh with the figure wheels gears. With the revolution of the main cam shaft 1171 the hook 400 on the lever 401 is disengaged from the lug 399, whereupon the spring 398 will swing lever 232 rearward to contact with lug 231.

For assistance in understanding the two totalizing operations of the horizontal accumulator, the action of the racks 131 in having their teeth "in" or "out" of engagement with their gears to rotate the figure wheels in the forward or backward movement of the racks will be briefly contrasted for all the operations of the machine.

*Addition.*—Lower teeth of racks in on forward movement, out on backward movement, rotating the figure wheels forward, direction of arrow, Fig. 2, and leaving them in advanced position.

*Subtraction.*—Upper teeth of racks in on forward movement, out on backward movement, rotating the figure wheels backward and leaving them in this position.

*Non-accumulation.*—Both upper and lower teeth of racks out in both forward and backward movement; figure wheels not rotated.

*Totalizing operations.*—Total—Upper teeth in forward, out backward, rotating figure wheels backward to zero position and leaving them in such position.

Sub-total—Upper teeth in forward, in backward, rotating figure wheels first forward to zero and then backward to their original position.

Total, "A"—In this operation, well known in calculating machines, all of the figure wheels of an accumulator are returned to their zero position. With the pointer 370 of the indicator standing at the single star (*), which is the normal position, the bar 375 stands in the position shown in Fig. 29, with pin 411 on the elevation of bar 375. In this position the totalizing key 350 is depressed and temporarily locked, and actuates the lever 356 as previously explained. This forward movement of lever 356 moves link 389 downward and swings the fingers 395 into the paths of pins 125 of the figure wheels. 355a of the arm 355 secured to lever 356 moving in the path of a lug 397, Figs. 3–32–36, actuates the erasing mechanism to set aside the bails 58, and clears the paths for the drop arms 222, as previously mentioned, and more fully described in section 7 of this specification.

It has been previously explained that on the forward movement of lever 356 the detent 225 is dislodged from the ledge 225c of the bracket 365, whereupon the levers 227 and 232 are oscillated. The lever 232 to actuate the means to engage the upper teeth of racks 131 with gears 121. The lever 227 to actuate the means to release the clutch of the machine. Detent 213b is also lowered from in front of lug 213a of the slide 213 of the tenth figure wheel, as heretofore described. Rotation of the cam 1194, Fig. 1, permits spring 198 to swing lever 195, moving rod 204 forward. Springs 207, Fig. 2, move levers 205 forward to follow, as far as they can, the rod 204. Each lever 205 carries forward its slide 213 connected thereto by stud 211, and its rack 131 connected thereto by pin 209. The upper teeth of the racks 131 being in mesh with the gear of its figure wheel, the latter is rotated rearwardly until one of its pins 125 contacts the corresponding finger 395, thereby stopping movement of the rack, lever 205 and slide 213 againts the pull of spring 207. The rod 204 continues its forward movement to make a full stroke. If a figure wheel stands to indicate "9", it must rotate backward nine spaces to bring one of its pins 125 into contact with its finger 395 and its lever 205 will follow rod 204 for approximately the full forward stroke of the latter.

If a figure wheel already stands at zero, practically no rotation (only a slight movement to take up a clearance permitting the finger 395 to move under the pin) will be required to contact one of its pins 125 with its finger 395 and there will be practically no forward movement of lever 205 and the parts thereby.

Cam 1195 now comes into action upon roller 1195a, dotted lines Fig. 29, and swings levers 227 and 232 back to their positions shown in Figs. 3–29, in the manner previously explained, the stud 233 cooperating with the switch 234 to move the racks 131 to a neutral position with both sets of teeth out of mesh with the gears. Cam 1194, Fig. 1, now comes into action to swing the rod 204 backward and it picks up and carries with it all levers 205 which have advanced incident to the movement of their figure wheels in returning to zero. All slides 213 and racks 131 (now out of engagement with their gears) are also returned to their normal positions.

The return of the lever 356 is accomplished by the link 263 with hook end 267, Figs. 29–31a, engaging with a stud 268 on the lever 227, Fig. 31. When the lever 356 is returned by the means described the tooth 257b of the link 257 will engage with the block 259 on side frame 879.

Lug "a" on the cam 1197, Fig. 29, secured to cam shaft 1171 acts to disengage the link 263 from stud 268 when the lever 356 is positioned to lock against forward movement. A link 269 pivoted at 402, with the lever 401, Fig. 29, extends rearward and has a rounded end 270 positioned in the path of the lug a of cam 1197. A pin 271 on the link 269, Fig. 29, acts upon the link 263 and the lever 401 as the lug "a" elevates the link 269, thus raising the link 263 and positioning the hook 267 clear of the stud 268. The link 263 has a stud 272 that engages with a detent 273, Figs. 29–31a, pivoted to bracket 365, to hold link 263 elevated. The link 263 can only be lowered to engage with stud 268 when the lever 356 is released and swings forward. A spring 274 anchored to detent 273 and to a pin on bracket 365 imparts tension to said detent. Said detent is held neutral by contacting pin 273a on bracket 365, Fig. 29.

As the lever 356 swings rearward the link 389 moves upward and fingers 395 swing forward out of the paths of pins 125; and the lug 397 being no longer held down by the arm 355a swings upward, with the result that bails 58 of the stop cylinder swing back to their normal positions.

As shown later in describing the printing mechanism, in this total operation the number appearing on the figure wheels before they are returned to zero will be printed.

Sub-total "B"—This term is used to designate an operation wherein the accumulating wheels are rotated backward to unison for the purpose of actuating the printing mechanism to print the number on the wheels, and the wheels then turned forward to their original position, leaving the number thereon as a basis for further computation. For example, suppose the wheels stand to indicate the number 46,784 as the result of a series of additions. By the sub-total operation this number is printed and is also left on the figure wheels. The machine may then be operated to add other numbers to it or subtract them from it.

For this operation 370 is turned to the double star (**), thereby shifting the bar 375 forward so that stud 411 can drop in depression 412; the totalizing key 350 is now depressed, and the machine operates in the manner described for "total", except for the following differences: When lever 232 swings forward, its lug 399 is engaged by lever 401, which holds lever 232 forward when lever 227 returns and while the racks 131 are making their rearward movement. The upper teeth of the racks are thus left in engagement with the figure wheel gears during the return of rearward movement of said racks, thereby turning the figure wheels forward (to the position from which they started) to indicate the number originally displayed.

When lug "a" on the cam 1197 acts upon link 269 as in "total" the pin 271 passing under link 263 and lever 401 disengages the lever 401 from lug 399 of the lever 232, whereupon the spring 398 pulls lever 232 back to contact with lug 231. As the lever 232 swings rearwards a pin 232b strikes hook end 206a of the lever 206 pivoted at 206b to lever 227, which acts as a cushion when lever 232 contacts with lug 231.

A pin 275 carried by the lever 401, Figs. 29-29a, projects over the link 263, thus when the link 263 is elevated and engaged with detent 273, as described, the hook 400 is held clear of lug 399 until the link 263 is disengaged from the detent 273 as the lever 356 swings forward. Otherwise should the indicator 370 be positioned at the double star (**) the lever 401 by tension of spring 403 and pin 411 being at the depression 412 on the bar 375, would engage lug 399 of the lever 232 at each forward movement of the lever 232 in operations of addition and subtraction. Thus, in problems of computing where several sub-totals are required it is not necessary to return 370 to the single star after each sub-total operation.

The totalizing key 350 is held in its normal elevated position by spring 351d, anchored to pin on lever 351 and to flange of plate 29, Fig. 3.

6.—Printing mechanism

Illustrated particularly in Sheets 1—2—3—4—9—16 and 17.

The printing mechanism, the ribbon shifting means to automatically position the tri-color ribbon to record on the paper the operation, i. e., purple for non-accumulative record, black for addition, red for subtraction, and the ribbon feeding and reversing mechansm is fully described in the McCaskey German Patent Number 266,890.

Only such illustration as will describe a means to perform the operation of printing will be mentioned in this application, and refer to the above patent for a full description.

The printing construction comprises, in part, ten numeral type bars 440, and a special type bar 496, Figs. 4 and 37. The type bars 440 and 496 are mounted within a frame including side plates 446 and 447 secured to paper carriage base 619. Each of the type bars 440 has five type plungers 448. Each plunger has two numerals—first, 0 and 1; second, 2 and 3; third, 4 and 5; fourth, 6 and 7; fifth, 8 and 9. The special type bar 496 at the right, Fig. 4, has similar plungers, first, dash (—), subtraction, and star (*), for clearing total of horzontal accumulator; second, double star (**) for sub-total of horizontal accumulator.

The type bars 440 are elevated by bellcrank levers 438, Figs. 2–10 and 37, on the forward movement of slides 213 by the connections clearly shown in these figures.

The special type bar 496 is elevated when the totalizing key 350 is depressed. The paper carriage base 619 extends across the rear of the machine and is supported by and screwed to the side frames 128 and 129, Figs. 4 and 37. The base 619 has a track 620 having grooves 621 and 622 cut lengthwise, Fig. 2. The frame of the paper carriage consists principally of end plates 626 and 627, Fig. 37, and cross bars 628 and 629. The cross bar 628 has an upper bar 630 and a lower bar 631, Figs. 1-2-3. The upper bar 630 has a groove 632 cut lengthwise. The lower bar 631 has a similar groove 633, Fig. 2. The cross bar 628 is mounted at the rear of track 620, the said track between the bars 630 and 631. A plate 635, Fig. 38, has four rollers 636, Figs. 1-3, at each end rotatable between fingers 637 of said plate. The rollers 636 run in the grooves of track 620 and the grooves of the bars 630 and 631 as shown in Figs. 1-3.

The cross bar 629 rests upon a roller 638, Figs. 2–37. The roller 638 is pivoted to a bracket 639 secured to base 619, Figs. 2–37. The paper carriage is thus movable from right to left, or, vice versa, upon the track 620, and the roller 638. Blocks 640 and 641, Fig. 37, secured to cross bar 629 limit the longitudinal movement of the paper carriage by abutting the extension 642 of the bracket 639, Figs. 2–37. The extension 642 is bent forward over a ledge 629a of the cross bar 629, Figs. 2–37, to prevent the paper carriage from being elevated at the rear.

Figs. 1–3, pins 643 and 644 in the track 620 and pins 645 and 646 in the cross bar 628 prevent the plate 635, having the rollers 636, such movement as would permit the rollers to pass the ends of the track 620, or, the ends of the cross bar 628.

Between the plates 626 and 627 is rotatable the platen 600 at the ends of which are secured the knobs 601, Figs. 4–37. By the means described the platen can be moved from right to left, or vice versa, to come in line with the type bars 440 and 496.

The means to actuate the platen 600 vertically, simultaneously with the operation of the machine will now be explained. Between the plates 626 and 627 is a bail 647 secured to a shaft 648 rotatable in said plates, Figs. 2–37. To the right end of shaft 648 is secured an arm 649. To arm 649 is pivoted a pawl 650, Fig. 37. To the right end of platen 600 is secured a gear wheel 651, Fig. 37. Pawl 650 is elevated into the teeth of wheel 651 by the tension of a spring. The bail 647 is oscillated by the following means: A link 654 pivoted at 655, Figs. 1–39, Sheet 1, to a bar 591 has at its upper end a flange 657 that when the link 654 is lowered engages with the bail 647. When the bail 647 swings downward the pawl 650 will engage a tooth of the wheel 651 and rotate the platen 600 by the means described. The bail is elevated by the tension of a spring 667 anchored to a pin 669 in end plate 626 and to arm 649, Fig. 37.

The bar 591 embraces a stud on a lever 593 rotatable on shaft 826, Fig. 2. The lever 593 has a roller 954 rotating upon the periphery of a cam 1200, shown in dotted lines Fig. 2, secured to the cam shaft 1171. A spring 2020 anchored to a pin 658 on bar 591 and to a pin 659 in the base of machine, Figs. 1–2, tends to engage the roller 954 upon the periphery of cam 1200. Cam 1200 is so cut to permit the lever 593 to swing downward as the cam 1200 rotates. The spring 2020 will lower the bar 591 with the lever 593 at the proper time of the machine operation. This period is after the type bars 440 have been aligned to the amount set up in the stop cylinder and the printing mechanism has been actuated to record the amount on the paper as is illustrated in the patent referred to.

Means to position the link 654 so that the flange 657 will not engage the bail 647 as is necessary in certain operations, such as cross footing, will now be explained. A spring 660 anchored to the extension 654a of the link 654 and to a pin 661 in base 619, Fig. 39, Sheet 1, tends to engage the said extension with the point 662 of the platen actuator 665, Figs. 1–37 and 39. Actuator 665 is pivoted to the base 619 at 664. When the end 666 of the actuator 665, Fig. 39, is moved rearward the point 662 will move forward, swing the link 654 rearward by the tension of spring 660, so that the flange 657 will engage the bail 647. When the end 666 is moved forward the point 662 will swing the link 654 forward and the flange 657 will clear the bail 647, when said flange lowers. The actuator 665 is held in these two positions by a stud 668, secured to said actuator, engaging with holes 670 and 671 in base 619, Fig. 39. The flange 657 is positioned clear of the bail 647 when it is desired to print the amounts crosswise the platen 600 and not vertically. When amounts are being printed horizontally means are provided to feed the platen 600 vertically at a given position of the platen. Movable along the shaft 648 and the bail 647 is a lip 675, Figs. 2–3–37. When the lip 675 is positioned under the flange 657 of the link 654 the said flange will engage said lip and oscillate the bail 647. Lip 675 is secured to shaft 648, when positioned, by a thumbscrew 674, Figs. 2–3–37. A paper table 680 is secured to a shaft 679 rotatable in plates 626 and 627, Figs. 2–3–4–37. Along the shaft 679 are mounted arms 678, Figs. 3–37. Pressure rolls 677 are rotatable in slots 676, Fig. 3, of the arms 678 and are spring pressed by springs 681, Fig. 37.

To the left end of shaft 679 is secured a lug 682, Fig. 1. A lever 683 pivoted at 684 to end plate 627, Fig. 1, is shaped so that when pressed forward will raise lug 682, oscillating the shaft 679. Thus swinging the paper table 680 and arms 678, disengaging the pressure rolls 677 from the platen, to align the paper.

7.—Erase key and mechanism

Illustrated particularly in Sheets 5—6—9.

The function of the erase key is to erase a number set up on the stops of the stop-cylinder without operation of the registering mechanism of the machine; or in other words, stops set to active position by actuation of the digit keys may, by actuation of the erase key, be restored to their inactive position without throwing the main part of the mechanism into operation. The erase key may be actuated when for any reason the operator wishes to erase a number from the stops—for example, in the case of error made in actuating the digit keys. 775 is the eraser key, and has a stem 4 with a lug 22 for cooperating with the key locking rollers 23; an extension 11 of the stem for cooperating with plate 24, and a pin 15 on the stem engaging a fork of a lever 16 fulcrumed on shaft 17, and actuates as do the numeral keys, described in Section 1, to release the mechanism to rotate the stop cylinder. The stem 4 of the erase-key extends downward through a groove in the front side of bar 6. The fork at the lower end of lever 16 engages a right angle bend at the forward end of a rod 776; said rod works in an opening through plate 41, Figs. 5–6, and extends rearward to the lever 777 pivoted to the machine base at 778 and having at its other end a camming lug 779.

Fig. 12, Sheet 9, 780 is what may be designated the eraser-spider having radiating arms 781; it has a hub loosely rotatable on stop cylinder shaft 42. Arms 781 normally stand to contact with pins 64 of bails 58, as shown in Fig. 10, except as to those bails which have been swung aside by setting of stops in their rows; this position is determined by a spring 780a holding two of the arms 781 in contact with pins 780c on the cylinder end plate. Spring 780a connects one of said pins with a pin 780b on the hub of 780, Fig. 12.

Upon depression of the erase-key, lever 777 is swung rearward, Figs. 5–12, carrying its lug 779 into the path of arms 781 of spider 780; also the extension 11 of the key stem contacts and actuates plate 24, heretofore described, actuating the stop cylinder escapement, and locks the key in its depressed position until it is subsequently restored to its normal position, all as described in Section 1 of this specification with reference to the digit and cipher keys. The actuation of the escapement permits the stop-cylinder to rotate in the direction of the arrow, Fig. 10. The lug 779, now standing in the path of arms 781, is contacted by one of said arms, momentarily stopping spider 780 from rotating with the cylinder, and pins 64 of the bails 58 act against the momentarily fixed arms 781 to swing said bails from their positions shown in Fig. 10, as the stop cylinder continues to rotate, releasing all stops previously set, the latter being immediately returned to their normal inactive positions by their springs 54. It may be noted that the erasing spider 780 is only detained in its revolution momentarily since the lever 777 upon which the camming lug 779 is mounted, through its power as a spring, creates enough resistance to the progress of the erasing spider to overcome the power of all of the cylinder rock bail springs 63, heretofore described. This action occupies the time only of the first part of one-tenth of a revolution, and the cylinder rock bails, through their spring 63, are restored to their normal position.

8.—Means for automatically restoring cylinder stops after actuation of the mechanism therefrom and for swinging cylinder bails aside to clear paths for drop arms 222 of the slides 213 in totalizing operations Illustrated particularly in Sheets 5—7—9—15 and 17.

In the preceding section, erase key mechanism for restoring cylinder stops to their inactive position before registration of the number or actuation of the mechanism therefrom has been described. Means will now be described for effecting automatically the restoration of stops to their inactive positions after the registration of the number therefrom on the figure wheels when the machine operates in response to actuation of the addition-bar 301, the subtraction key 325, and the totalizing key 350, and after operation of the mechanism from said set stops (without action upon the figure wheels) in response to actuation of the non-accumulating key. The set stops are released for this purpose after the slides 213 and their corresponding racks 131 have made their forward movement (the slides being stopped in their forward movement by their arms contacting set stops) and while the slides and racks are making their return movement.

A lever 783 is pivoted to the inner side of the side frame 128 of the machine by a screw stud 782, Fig. 36, Sheet 17.

A roller 784 at the lower end of lever 783 cooperates with a cam 1198 on the main cam shaft 1171, and a link 787 pivoted to the lever at 786 extends forward and is pivoted at 789 to an arm 790 fixed to a collar 791 secured to a shaft 792. A spring 788, anchored at one end to a pin projecting inwardly from the side frame 128 and at its other end to a pin on the link 787, tends to pull said link and the lever 783 forward and holding the roller 784 against the surface of cam 1198 which rotates in the direction of the arrow, Fig. 36. The shaft 792, which will be mentioned later in the description of the mechanism identified with the vertical accumulators, extends across the machine, being journaled at its ends in bearings in side frames 878 and 879. At its inner end, the collar 791, Fig. 32, has an arm 793 having at its outer end a lug 794, extending under the lower edge of an arm 795, extending parallel to the arm 793 and mounted loosely to turn on the shaft 792. A spring 796 connected between arms 793 and 795 tends to hold the latter against the lug 794 of the former. Spider actuating arm 798, Fig. 12, is pivoted at 797 to the arm 795 and at its upper end bent to form a lug 799, which in the normal position of the parts stands just clear of the arms 781 of the spider 780, as shown in Fig. 12. A link 800, Fig. 8, extends from the lower end of a lever 803 to the arm 798, as shown in Fig. 32, to position the parts.

From the construction thus explained, it will be seen that rotation of the cam 1198 and its cam shaft from the normal position shown in Fig. 36, will cause said cam to swing the lever 783 rearward, and through the connections explained, the arms 793 and 795 downward; the arm 798 in moving downward with the arm 795 will carry its lug 799 to contact with one of the spider arms 781. Continued downward movement of the arm 798 will rotate the spider 780, causing its arms to act upon pins 64 and swing the bails 58 against the tension of their springs 63 in position to release all set stops which will immediately assume their inactive positions by reason of their springs 54. The operation of the mechanism is so timed that this release of the set stops takes place while the slides 213 and corresponding racks 131 are making their return movements. When the cam 1198 has made its complete rotation, the lever 783 is swung back to its normal position shown in Fig. 36, by the spring 788 and the arm 798 is thereby restored to its normal position clear of the spider 780. Thereupon, the spider being released to rotate on its shaft, the springs 63 immediately swing the bails 58 to their normal positions in the paths of the drop arms.

As described above, the spring 796 yieldingly connects the arms 795 and 793; said spring is stronger than the combined power of the ten springs 63, which tend to hold bails 58 in their normal positions, so that in the operation above described the downward movement of arm 793 pulls the arm 795 downward to effect the swinging of said bails against the tension of their springs in the manner described. Spring 796 is, however, adapted to yield to compensate for any slight variation in the position of the cylinder at the time the erasing takes place.

It will be remembered that in the totalizing operations, it is necessary to swing aside the cylinder bails 58 to clear paths for the drop arms on the slides 213 before said slides begin their forward movement. Arm 355 secured to lever 356, heretofore mentioned, in the forward movement of lever 356, has rounded end 355a moving in the path of lug 397, Figs. 32–36. As clearly shown in Fig. 32 said lug is a part of arm 790 secured to the collar 791. Hence, when said lug 397 is moved downward, it rotates shaft 792 which, through the connections and in the manner described above, actuates the spider 780, causing its arms 781 to swing aside the bails 58, which are held in this position until the lever 356 returns to its normal position. Collar 791 to which arm 790 is secured is fixed to shaft 792 for reasons hereinafter explained, in connection with the vertical accumulators.

9.—Repeat key and operation of machine for repeating amounts set up in the stop cylinder Illustrated particularly in Sheets 2—4—5—6—7—15.

In performing the operation of repetition of entries, provision is made for preventing the automatic restoring of the set stops 45 to their inactive position after the number has been accumulated. This is accomplished by what is designated the repeat key, Figs. 4–32; this key 801 has a stem which works through a bearing in the vertical wall of the part 3 of the machine casing and carries at its inner end a pin 802 engaging the forked upper end of lever 803, Figs. 8–32, rotatable on a shaft 580, mounted in bracket 7. The end of lever 803, depending below shaft 580, connects with link 800 heretofore mentioned. A spring 804, connected between the lever 803 and a lug on a detent 805, tends to hold the parts in their normal position shown in Fig. 8 with the repeat key out and the end of the detent 805 bearing against a lug 806. Detent 805 is mounted to turn on the shaft 17, heretofore described, and has an extension 807 depending into the path of the pin 808 of a repeat-key lever 16 before described, Figs. 2–5–6–8.

When the repeat key 801 is pushed in, extension 803b of lever 803 swings forward and the detent 805 drops into locking engagement with lug 806; link 800 is pulled forward, swinging spider-actuating arm 798 forward on its pivot 797 to such position that in its subsequent downward movement in the operation of its mechanism it will move clear of the spider 780 and will, therefore, not engage one of the arms 781 and hence will not actuate said spider to release set stops in the manner previously described. As is thus apparent, the repeat key merely sets certain parts which control the subsequent operation of the mechanism; the actuation of the repeat key does not of itself throw any of the mechanism into operation, as in the case, for example, with the subtraction and other keys. The repeat key is locked in its depressed position by engagement of the detent 805 with the lug 806. It is released by actuation of the erase key 775, which moves lever 16 rearward, causing the pin 808 of said lever to act against extension 807 and swing the detent 805 upward clear of the lug 806, whereupon the spring 804 swings the lever 803 forward, moving the repeat key outward to its normal position and also moving the other parts to their normal positions shown in Fig. 8. Thus, for example, if the depressed position of the repeat key has been used to prevent the erasing of an entry which has been used, and the repeating operation is completed, the actuation of the eraser key will erase that entry from the stop cylinder and simultaneously restore the repeat key.

10—Aligner mechanism for main slides 213

Illustrated particularly in Sheets 2—14—17.

Along their upper edges, the slides 213 are provided with teeth 809, Fig. 30; for cooperating with these teeth there are pawls 810, one for each slide, pivoted on a rod 811 supported by a plate 812. Plate 812 is fastened, by screws, to rock arms 813 and 814, said arms being pivoted at their lower ends by screw studs 815 to the inner faces of the side frames 128 and 129, respectively. The rock arms 813 and 814, connected by the plate 812, constitute a rock frame carrying the pawls 810. Each pawl has an actuating spring 810a connected between its upper end and underside of plate 812. Fig. 36, 819 is a link pivoted at its forward end at 817 on the rod 811 and at its rear end pivoted at 821 to the upper end of an arm 823 having a hub by which it is fixed on the rock shaft 826. Fig. 30, 820 is a second link similar to 819, also pivotally connected at its forward end at the point 818 to the rod 811 and at its rear end pivotally connected at 822 to an arm 824, similar to 823, having a hub by which it is fixed to the shaft 826. An arm 824a, depending from the hub as an extension of arm 824, carries at its lower end a roller 825 cooperating with a cam 1196 of the main cam shaft 1171. Shaft 826 is rotatably supported at its opposite ends in bearings in the side frames 128 and 129, as shown in Fig. 30. A spring 827 connected to the arm 824 and anchored at its other end to the base of the machine, Fig. 2, tends to hold the roller 825 in contact with the cam 1196, and acts to swing both arms 823 and 824 forward with corresponding movement of parts connected thereto, when the cam roller drops to the lower portion of the cam surface.

The parts normally stand at rest in the position shown in Fig. 2, each pawl 810 just clear of the upper edge of its slide 213 in advance of the teeth 809. When the machine is thrown into operation, roller 825 travels the concentric part 1196a of cam 1196, Fig. 30, simultaneously with the forward movement of slides 213. When the main racks 131 have reached their forward position, roller 825, traveling on the rise 1196b of the cam 1196, actuates the connections described to move pawls 810 into engagement with teeth 809 and impart to slides 213 a slight movement sufficient to align them. Slides 213 are held in this position while the roller travels the concentric part 1196c of the cam, during which time racks 131 are shifted from engagement with the figure wheels and racks 165 are shifted into engagement therewith. The slight rearward aligning movement thus imparted to the slides 213 is just sufficient to give a slight clearance between the drop arms 222 and the cylinder stops, by which their forward movement was arrested. With the set stops thus relieved of pressure, they may be and are restored to their inactive positions before or while the slides 213 make their return movement, the mechanism hereinbefore described for effecting automatic restoration of the set stops being so timed in its operation. A saving of time is thus effected from what would be required in case it were necessary to fully return the slides 213 before restoring the set stops to their inactive position, and by the construction described the erasing or restoring of the set stops is effected by the time the main cam shaft completes one revolution.

The action of pawls 810 at the time the slides are forward also serves to accurately align the slides at this time, and through the connections from the slides to the racks 131, also accurately aligns the latter, which in turn assist in accurately aligning the teeth of the gears of the figure wheels. Hence. when at this time (as in the operation of the machine in addition and subtraction) the racks 131 move out of engagement and the racks 165 into engagement with the gears of the figure wheels, the teeth of the gears stand in position to be accurately and properly engaged by the teeth of racks 165 with minimum friction and wear.

The pawls 810 perform the third function of preventing the drop arms 222 on slides 213 that have been held back by bails 58 from going forward when said bails are swung by the automatic erase mechanism previously described.

11.—Driving connections to main cam shaft 1171 and stop cylinder shaft 42

Illustrated particularly in Sheets 1—2—3—5—8—10—13—14—16 and 18.

Power for driving the machine is received from a motor shaft 1141, the upper end of which is shown in Figs. 41–42, Sheet 18. This shaft is driven preferably by an electric motor controlled by a switch conveniently located; these parts are not shown in the drawings. When the switch is closed, the motor will continuously rotate the shaft 1141. A hub 1143 fixed to the shaft 1141 by a pin 1142 and slot connection, is rotatable in a bearing through the subbase 2 of the machine. A sprocket wheel 1145, and a cup-like wheel 1144 are both fixed to the upper end of hub 1143. The wheel 1144 constitutes a part of the clutch mechanism for driving the main cam shaft 1171. A short shaft 1148 is also rotatable in a bearing opening through the subbase 2 and has fixed to its upper end a sprocket wheel 1147 and a cup-like wheel 1149. A sprocket belt 1146 connects sprocket wheels 1145 and 1147, driving the latter from the former, the direction of rotation of these wheels and hence of the wheels 1144 and 1149 being indicated by the arrows in Fig. 43. The wheel 1149 constitutes a part of clutch mechanism for driving the stop cylinder shaft 42.

The bracket 44, Figs. 5–9, which supports the rear end of the stop cylinder shaft 42, has been heretofore mentioned. This bracket has two arms 44a and 44b, Fig. 37, supporting a vertical worm shaft 1155a, Fig. 5, its lower end terminating just above and in line with the shaft 1141, Fig. 41. The worm of shaft 1155a meshes with worm gear 1170, Figs. 9–37, fixed to the main cam shaft 1171 to rotate said shaft. Similar arms of the bracket 44 support a second worm shaft 1155, and at its lower end terminating just above and in line with the shaft 1148. Said worm shaft meshes with a worm gear 1169 fixed on the rear end of stop cylinder shaft 42 for rotating the latter, Figs. 9–37. A cup-like wheel or disk 1157a is movable on the shaft 1155a near its lower end, and a similar part 1157 is movable on the shaft 1155 near its lower end. Interposed between the cup-like wheels 1144 and 1157a are parts which constitute with said wheels a clutch for driving the shaft 1155a; and a description thereof will apply to similar parts interposed between the wheels 1149 and 1157 and constituting with the latter a clutch for driving the shaft 1155. Three clutch dogs 1150, Figs. 40–45, Sheet 18, have slots 1151 in their under edges adapted to fit over the rim of the wheel 1144, as clearly illustrated in Figs. 37–41, Sheets 16–18; said dogs also have a horizontal slot 1153 which fits over the edge of a plate 1152 fixed to a spider 1154, which in turn is fixed to the shaft 1155a. The rounded inner ends of the dogs 1150 are seated in recesses in the spider 1154 so shaped as to permit the dogs to swing in one direction from their normal position, but not in the opposite direction; the dogs are also free to make such slight radial movement in their recesses as may be required in their operation. Springs 1156 are anchored at one end to the plate 1152 and at their other ends connected to the dogs 1150, respectively. The drive cup 1144 rotates in the direction of the arrows, Figs. 40–43. The normal action of springs 1156 is to cause the edges of the slots 1151 of the dogs 1150 to engage and grip the rim of the drive cup 1144 to cause the dogs and, through them the shaft 1155a to be rotated with the drive cup. The dogs 1150 are normally held out of gripping engagement with the rim of cup 1144 (this position of the dogs being indicated in full lines in Fig. 41) by means of the wheel 1157a, heretofore referred to and which is mounted to turn on shaft 1155a. Three notches in the edge of said wheel engage lugs 1159 of the dogs 1150, respectively. By arresting rotation of the wheel 1157a while the dogs 1150 are in gripping engagement with the rim 1144, the outer ends of the dogs will be moved from their gripping positions to their non-gripping positions, thereby throwing the clutch out of action and discontinuing rotation of the shaft 1155a with the drive cup 1144 and its shaft. When the wheel 1157a is again released, the springs 1156 will immediately swing the clutch dogs 1150 (incidentally slightly rotating the wheel 1157a) into gripping engagement with the rim of wheel 1144 to render the clutch active; as is obvious, so long as the dogs remain in this gripping position, the cup 1144 will impart rotation to the shaft 1155a.

The means for releasing and stopping the wheel 1157 to throw the stop cylinder drive clutch into and out of action at the proper time will now be described. A grip dog 1160, Fig. 5, (detail view Fig. 14a) is pivoted to the bracket 44, the pivot passing through two wings 1163 and 1164 of the dog and the part of the bracket embraced by said wings. A notch 1165 of the dog fits over the rim of wheel 1157. A spring 1166 (hereinbefore mentioned in describing the stop-cylinder escapement, Section 2), anchored to a pin on the subbase 2, Fig. 5, tends to swing dog 1160 from its normal gripping and stopping position to its releasing position with relation to wheel 1157.

The means for releasing and stopping the wheel 1157a to throw cam shaft drive clutch into and out of action at the proper times will now be described. Figs. 2–5, 1172 is a grip dog pivoted at 1173 to one of the arms of bracket 44. A spring 1174 connected to said dog and anchored to a post 1181 on the subbase 2 of the machine, tends to swing said dog to its non-gripping position with relation to the wheel 1157a, from which it follows, as shown later, that the clutch becomes active and rotates the shaft 1155a, and through its worm screw and the worm gear 1170, rotates the main cam shaft. The grip dog 1172 has a notch similar to 1165 which engages the rim of the wheel 1157a. A pawl 1175 pivoted at 1177 to the lower end of a rock arm 1178, extends forward to engage the outer end of grip dog 1172, as most clearly shown in Fig. 2, Sheet 2. Normally, the tooth of said pawl holds the grip dog 1172 in its gripping position against the tension of spring 1174. 1180 is a spring for actuating the pawl, anchored at one end to the post 1181, before mentioned. Rock arm 1178 is fixed to a collar 1182 rotatably mounted on shaft 1179, Fig. 37, the latter being supported in bearings in the side frames 128 and 129 of the machine. An arm 1183, dotted lines Fig. 2, fixed to and depending from the collar 1182, depends in a position to be acted upon by a pin 1184 projecting from the side of the worm gear 1170, Figs. 2–9. In the normal position of the parts shown in Fig. 2, the pin 1184 has swung the arm 1183 rearward, thereby holding the rock arm 1178 also rearward with the pawl 1175 engaging the grip dog 1172 and holding it in its gripping position against the tension of its spring 1174, as before explained.

To throw into operation the clutch mechanism which rotates the main cam shaft, means are provided for moving pawl 1175 from its normal position shown in Fig. 2 for the purpose of releasing the grip dog 1172. As will be shown, the means for thus moving pawl 1175 to its inactive position are under control of the addition bar 301, the subtraction key 325, the non-accumulating key 327, and the totalizing key 350, for it will be remembered that the actuation of any one of these keys or the addition bar has been described as throwing the main cam shaft into action. Lug 1185, Fig. 5, on the pawl 1175 is engaged by the shouldered lower end of a link 1186 pivoted at its upper end at 1188 to the outer end of a rock arm 1189 having a hub by which it is fixed to the shaft 1179, Figs. 2–30. A spring 1187 connected to the link 1186 and anchored to the post 1181 tends to hold the lower end of said link in engagement with the lug 1185, the position of the link under influence of the spring being limited by stud 1189a of the lever 593. Sheets 3—13, 1190 is a rock arm depending from the end of shaft 1179 at the right hand side of the machine, into working proximity to the pin 1191 fixed to the rear end of lever 227 heretofore described. It is recalled that, as hereinbefore described, the actuation of the addition-bar 301, of the subtraction key 325, or of the totalizing key 350, results in oscillating the lever 227 on its shaft 228 under the actuating power of its spring 229. This movement of lever 227 causes its pin 1191 to act upon rock arm 1190 and swing the same rearwardly, thereby rocking the shaft 1179 and with it the arm 1189, moving the link 1186 downward and disengaging pawl 1175 from the grip dog 1172, with the result that the clutch dogs 1150 are immediately thrown into action, causing the shaft 1155a to be rotated from the corresponding drive cup 1144, said shaft in turn driving the main cam shaft. When in the rotation of the cam shaft the pin 1184 on the worm gear 1170, moves away from the arm 1183, the spring 1180 moves the pawl 1175 forward, at the same time swinging the arms 1178 and 1183 forward, slightly rotating the collar 1182 to which said arms are fixed, until said pawl again engages its tooth in front of the grip dog 1172, which latter is at this time in its non-gripping position, to which it is held by its spring 1174. At the end of one revolution of the cam shaft and the worm gear 1170 (this rotation being in the direction of the arrow, Fig. 2) the pin 1184 is again brought into action upon the arm 1183, thereby acting upon the parts to pull the pawl 1175 rearward to its normal position illustrated in Fig. 2, thereby swinging the dog 1172 to its gripping position in relation to the wheel 1157a, which results in throwing the clutch out of action.

In the description of the mechanism of the non-accumulating key, section five of this specification, reference was made to the rearward movement of the rod 331 as acting upon the clutch mechanism to throw the main cam shaft into operation. As shown in Sheets 1—16, a slot at the rear end of rod 331 engages a short shaft secured to arm 1192 fixed to the end of shaft 1179 at the left-hand side of the machine. It is, therefore, apparent that upon rearward movement of the rod 331, it acts to swing the arm 1192 rearward against the tension of its spring 1193, thereby rocking the shaft 1179 and through connections already explained swinging the pawl 1175 downward to release the grip dog 1172, with the result that the clutch mechanism to the main cam shaft 1171 becomes active and rotates said shaft.

An interlocking connection is provided which prevents the operation of the two clutches simultaneously. The lever 1251, heretofore described, pivoted at 1252 to the bracket 44, Fig. 5, has at one end a lug 1279, Fig. 2, for cooperating with the grip dog 1172 of the clutch mechanism for driving the cam shaft, and at its other end is forked to engage pin 1253 on the wing 1163 of the grip dog 1160 of the stop cylinder drive clutch mechanism. When the grip dog 1160 is moved by its spring 1166 to its inactive position, which results in throwing the stop cylinder clutch into action, the movement of grip dog 1160 through the connection described, swings lever 1251 to contact lug 1279 with grip dog 1172.

The spring 1174 for swinging and holding the grip dog 1172 in its inactive position is stronger than the spring 1166, actuating the grip dog 1160, and tends to swing the grip dog 1160 to its active position, arresting the rotation of the stop cylinder, should the grip dog 1172 be released to engage the cam shaft clutch mechanism. When the grip dog 1172 is returned to its normal active position by the rotation of the cam shaft 1171 the spring 1166 immediately swings grip dog 1160 to its inactive position and the stop cylinder rotates to complete its movement.

12.—Vertical accumulators

Illustrated particularly in Sheets 1—2—3—4—8—16—17—19—20 and 21.

The machine as heretofore described is substantially that shown in the McCaskey German patent, and the present invention is illustrated and described as being applied to the machine of that patent. It will, however, be understood from the description that is to follow that this invention might be applied to and used in connection with machines of other types.

The particular construction and operation of the present improvement and its relation to and co-action with the machine heretofore described will be fully understood from the following description.

A shaft 709 is rotatably mounted in side frames 878 and 879. The rotation is effected by means of a helical spring 732 one end of which is secured to said shaft and the other to side frame 879. On said shaft is mounted a pair of plates 707 and 708, said plates being preferably pinned to said shaft and constituting a reel for the accumulators. Each of these plates is provided with a plurality of slots 710, and ten of said slots are shown. A shaft 702 is mounted in each pair of slots and a plurality of accumulating wheels 700 is carried by each shaft. As here shown, ten wheels are mounted on each shaft to constitute an accumulator, and each wheel is provided with ten teeth and a figure ring (Fig. 46) adjacent said teeth. Each of these accumulating wheels 700 is provided with a boss 701, and said wheels are separated or spaced by sleeves 703. A collar 703a on the left-hand end of shaft 702 (Fig. 47) is pinned to said shaft to prevent endwise movement of wheels 700 and also endwise movement of shafts 702. A rod 711 is associated with each pair of slots 710 and is mounted in the end plates 707 and 708 in position to engage between two of the teeth of each of the accumulator wheels, so that said wheels are normally held against rotation on their shafts 702 and in alinement. Each of the accumulator wheels 700 is provided with a pin 706 which is used in the operation of carrying tens and in totalizing, as will be hereinafter more fully described.

The ends of each shaft 702 project beyond the plates 707 and 708 and are engaged by rings 712 and 715, the former being secured to side frame 878 at four points 713, and the latter to frame 879 at four points 716. These rings act to hold the several shafts in position in the bottom of slots 710 and in engagement with the aligner rods 711. Ring 715 is interrupted or broken away at its top at 718 (Fig. 3) in order to permit of the introduction of the various shafts into their respective slots, it being understood that the accumulator reel is rotated step by step so that each pair of slots will come successively in alinement with the opening 718 to permit the introduction of the shafts 702.

Shaft 709 is continuously connected to the paper-carriage, in order that the paper-carriage shall assume a definite position with respect to the rotation of the accumulator reel. As here shown, these connections consist of a bevel gear 734 mounted on the end of shaft 709 and meshing with a bevel pinion 735 carried by one end of a shaft 736 mounted in brackets 737 and 737a on the machine frames (Fig. 1). The other end of said shaft carries a pinion 739 which meshes with rack 740 connected to the paper-carriage. The gearing or other connections between the reel and the paper-carriage may be such that the latter will effect one complete rotation while the carriage is moving from right to left, thus dividing the platen into ten printing columns, if ten accumulators are mounted on the reel, or any other relation may be had; that is to say, more than one revolution or less than one revolution of the reel may correspond to the full movement of the paper-carriage.

Means are provided for bringing the rows of accumulator wheels successively into engagement with the actuating mechanism; and it is here pointed out that, when the wheels of any accumulator are engaged with their actuating mechanism, said wheels are free to rotate while the reel as a whole is locked against rotation, whereas, when the reel as a whole is free to rotate, the wheels 700 of each accumulator are engaged with their respective aligner rod and said wheels 700 are locked against independent rotation on their shafts 702. The means for actuating or rotating the wheels of any desired row of accumulator wheels 700 comprise a compound rack having two sets of teeth 830 and 831 (Fig. 48), each of said racks having associated therewith a pair of pinions 841 and 841a, (Fig. 47). Each pair of pinions rotates as a unit and is preferably formed from one piece of metal. The teeth on wheels 700 are caused to engage with the teeth of pinions 841, while the teeth 830 and 831 of the compound rack are adapted for engagement with the pinion 841a, as will be hereinafter more fully described.

Ring 712 is provided at its bottom with a depression 714 (Fig. 48) and the ring 715 is provided with a depression 717 (Fig. 3), and, when it is desired to engage the teeth of a row of wheels 700 with pinions 841, the shaft 702 supporting said row of wheels is lowered into said depressions in order to effect this engagement. Though a shaft 702 is positioned above said depressions 714 and 717, it is normally held out of engagement with the same by arms 720 and 721 secured to a shaft 719 rotatable in side frames of the machine. Arm 720 is provided with a rearward extension 722, to which is secured one end of a spring 723, the other end of said spring being anchored to the frame of the machine at 724, Fig. 48. This spring normally holds extremities 720a and 721a of said arms in the position shown in Fig. 49, with the arm 721 contacting lug or pin 725 on ring 715. When a shaft 702 is resting on arms 720 and 721 above depressions 714 and 717 and it is desired to engage wheels 700 with pinions 841, means are applied to said shaft to lower the same, thus swinging the arms 720 and 721 downward.

The means herein disclosed for effecting the lowering of shaft 702 comprises ears 730 and 731 carried by arms 726 and 727, respectively, secured to a shaft 729, Fig. 46. A bar 728—the addition bar of the vertical accumulators—connects arms 726 and 727 at their free ends. When this addition bar is depressed, the ears 730 and 731 engage the ends of shaft 702 and force the same into depressions 714 and 717, thus meshing the teeth of wheels 700 with the teeth of pinions 841, and at the same time the teeth of wheels 700 on the shaft thus depressed are removed from engagement with their aligner rod 711. The parts are now in position to have a number accumulated on the wheels 700 when the racks having teeth 830 and 831 are moved forward.

Means are provided for stopping any desired shaft 702 in position to be lowered into depressions 714 and 717, and to lock the parts so that the shaft will remain so lowered in said depressions until the operation is completed.

The right-hand end of each shaft 702 is provided with two square lugs 704 and 704a (Fig. 3a). The lug 704 engages slot 710 of plate 707 and prevents the shaft 702 from turning. The lug 704a is adapted to engage a stop 743 mounted on the free end of a lever 742 pivoted at 741 (Fig. 3). The engaging face of this stop 743 is arranged in line with depression 717 so that, when the lug 704a engages the same, the shaft 702 is immediately over depressions 714 and 717. When the shaft is lowered into said depressions, the stop 743 is depressed below the inner surface of the ring 715 and the lever 742 is then locked in this position. In order to effect the locking of the lever 742 in its position, a companion lever 747 is also pivoted on stud 741 and lowered by depression of shaft 702. The free end of said lever 747 is provided with an extremity 747a that rests on a pin 757 projecting laterally from the lever 742. The lever 747 is also provided with a transverse stud 749 on which one end of a link 750 is pivoted. This link is provided with a step at 751 near its upper end, and said step is adapted to engage a square lug 758, carried by the machine frame (Fig. 3), when the lever 747 is depressed in conjunction with lever 742, this engagement being effected through the medium of a spring 755.

A yielding block 752 is pivoted to the upper end of link 750 at 753 and this block is provided with a lateral extension 754a that projects transversely across the link 750 at 750a. One end of spring 755 is connected to the upper end of this block and the other end of said spring is anchored to a pin 756 on ring 715. It will be observed that, when the parts are in the depressed position, reverse movement of the reel can be readily effected, without injury to the parts, in view of the yielding mounting of said block 752, which block will swing on its pivot 753 when the lower end thereof is engaged by the ends of shafts 702 as the latter engage the same in the reverse rotation of the accumulator reel.

After an amount has been accumulated on the wheels 700 of an accumulator, and after the shaft 702 has been elevated, the reel will rotate forwardly one-tenth of a revolution to bring the next row of wheels into position to be engaged with the actuating means, and the shaft 702 of said next row will engage the block 752 and disengage the step 751 of link 750 from the lug 758; whereupon the parts are released and are carried back to the position shown in Fig. 3 under the influence of a spring 744 and the spring 755. It is pointed out that a second manual means for removing stop 743 from the path of shafts 702 is provided. This means consists of what is termed a "release" key 762 (Fig. 3) having a stem 761 contacting a link 759 which is supported by a cross bar 836. The rear end of link 759 is slotted at 760 (Fig. 46) to engage a pin 745 carried by extension 742a of lever 742. It will thus be seen that, when key 762 is pressed inwardly, lever 742 will be rotated on its pivot 741, thus removing the stop 743 from the path of shafts 702. If the key 762 is pressed and not released, the reel will continue to rotate until the paper-carriage has moved to the extreme left. Thus the key 762 can be held until a desired number of accumulator shafts 702 have passed over depressions 714 and 717. It will be appreciated that when the paper-carriage is moved toward the right, the reel will be rotated reversely, and a cut-away portion on the squares 704a will engage the incline of the stop 743 of the lever 742, thus rocking the same downwardly out of the way.

The means for locking the accumulator shaft in depressions 714 and 717, and for automatically releasing the same so that it may be removed from said depressions, will now be described. Referring particularly to Figs. 46, 49, and 57, 872 indicates an arm secured to shaft 729, said arm 872 being provided with a laterally extending lug 873. A detent 875 is mounted on a shaft 876 and is provided with a rearward extension 880 underlying a pin 890 carried by a lever 882 pinned to shaft 883. The detent 875 is held in the position shown in Fig. 57 by spring 877, and the lever 882 is subject to the tension of spring 886. Lever 882 is provided with a lug 884 that normally rides the unbroken surface of a cam disk 885 secured to a shaft 888 and rotating in the direction of the arrow, Fig. 57. This cam disk is provided with a cut-out portion 887. When the addition bar 728 is depressed, and consequently the arm 872, the lug 873 will be engaged by the detent 875 to hold the ears 730 and 731 in their lowermost position and to lock the shaft 702 in this position. After the operation of accumulation and the operation of carrying tens have been effected, the disk 885 will have rotated to bring the depression 887 under the lug 884, at which time the lever 882 will be rocked downwardly by spring 886, thereupon engaging pin 890 with the rear extension 880 of the detent 875 and accordingly swinging the nose of the latter out of engagement with the lug 873. Thereupon the arms 720 and 721, under the influence of spring 723, will elevate the shaft 702 and the arms 726 and 727, connected to addition bar 728. Spring 891 (Fig. 57) anchored at 892 to the side frame 878 and connected to arm 872 tends to maintain said arm in its elevated position shown in Fig. 57.

*13.—Actuating means to rotate the vertical accumulators when accumulating amounts*

Illustrated particularly in Sheets 1—2—3 4—8—14—17—19—20—21—22—23 and 24.

As heretofore noted, the accumulator wheels 700 are rotated by engagement with the teeth of pinions 841, each of which has secured thereto a second pinion 841a. Each pinion 841a is adapted to mesh either with the teeth of racks 830 or 831. These racks are connected by a front member 871 and by a rear member 845 and are supported at their front ends by a cross bar 836 provided with slots 838 (Fig. 52), in which slots said racks move. The cross bar 836 is secured to side frames of the machine and carries a plate 834 that passes transversely through a slot 832 in the front portion of said rack. The rear end of each rack is supported by a cross bar 837 (Fig. 53) secured to the side frames of the machine, said bar being provided with slots 839 in which the rear ends of said racks move. The rear end of each rack is provided with a slot 833 through which passes a plate 835 secured to the cross bar 837. The racks are moved in any desired manner to the desired degree, and, as here shown, are actuated by slides 213 heretofore described. Connection between said slides and said racks may be in any suitable manner, though it is preferred simply to abut the rear member 845 of the racks against the forward ends of slides 213, springs 846 secured to said racks and slides holding the same in this engagement. The upper racks 831 move in slots 870 in a cross-bar 869 (Fig. 36); and the front member 871, which connects racks 830 and 831, abuts said cross-bar 869 so as to properly position said racks with respect to pinions 841a, so that said pinions may pass readily from one rack to the other.

The upper rack 831 is slightly offset with respect to the rack 830, as clearly shown in Figs. 47a, 50 and 51. Accordingly, when the teeth of pinions 841a are in mesh with rack 831, they are out of mesh with racks 830, and vice versa. This is an extremely important matter, inasmuch as the pinions are rotated in one direction by one of the racks for addition, and in the other direction by the other racks for subtraction. As here shown, the upper rack 831 is for subtraction and the lower rack 830 for addition, though this arrangement may be altered. With this construction, the operations of addition and subtraction can be effected on the movement of the racks in the same direction, and as here shown this operating movement is the forward movement of the racks.

Appropriate means are provided for shifting the pinions 841a into engagement with either the racks 830 or 831, and it is here noted that, before said pinions 841a are disengaged from either of the racks, they have commenced to engage the other racks, so that said pinions are prevented from rotating except in response to the movement of the racks. Normally the teeth of each pinion 841a mesh with the addition rack 830, but upon depression of the subtraction key each pinion is shifted into engagement with subtraction rack 831. The teeth of each pinion 841a are chamfered to assist in passing freely from one rack to the other.

Referring particularly to Fig. 47, it will be observed that the pinions 841 and 841a are mounted on a shaft 840 carried in frames 878 and 879, to which is keyed a collar 843 that engages the inner face of side frame 878. A second collar 844 is pinned to said shaft and limits the movements of said shaft to the right, as shown in Fig. 47. Collars or spacers 842 are carried by said shaft 840 between each pair of pinions 841 and 841a, which pinions, it is noted, are free to rotate on said shaft 840.

The left-hand end of the shaft 840 is provided with a groove 924 which is engaged by a cam 923 pinned to shaft 921 (Fig. 56). This shaft is mounted in brackets 896 and 909 secured to the side frame 878, and the forward end of said shaft is provided with a segment 920 which meshes with a rack on a vertically movable member 908. This member is provided with a slot 912 through which projects studs 910a and 911a, and said member 908 is normally spring-pressed upward by a spring 915, one end of which is secured to stud 910a and the other end to a stud 914. When the subtraction key 900 is depressed, shaft 921 is rotated by the means described, and shaft 840 is displaced longitudinally toward the right (Fig. 47), and pinions 841a are disengaged from addition racks 830 and engaged with the subtraction racks 831. The subtraction key 900 is provided with a lever 901 pivoted to shaft 902, and said lever 901 overlies the member 908.

Referring to Figs. 56 and 57, it will be noted that the forward end of arm 872 is provided with an offset projection 917 and that the vertically movable member 908 is provided with a projecting end 918 that engages over the projection 917. Accordingly, when the subtraction key 900 is depressed, the arm 872, and with it the arms 726 and 727 of the addition bar 728, will also be depressed, thus forcing the desired shaft 702 into the depressions 714 and 717, as previously described.

When the subtraction key 900 has been depressed, it is also locked in its lowermost position as is the addition bar heretofore described. Referring to Fig. 56, 904 is a detent mounted on shaft 876 (on which shaft detent 875 is also mounted), and said detent is adapted to engage a lug 903 carried by the subtraction lever, when the subtraction lever has been depressed. The detent 904 is provided with a rearward extension 906 and also underlies the pin 890 (Fig. 57), heretofore described. Upon the lowering of the pin 890, the detent 904 will be swung on its pivot and the subtraction key 900 released.

The shaft 840 is normally spring-pressed toward the left (Fig. 47) by means of a spring 893 secured at one end to a pin 894 on shaft 840 and at its other end to a pin 895 on bracket 896. Means are also preferably provided for locking the shaft 840 when it has been shifted to its subtraction position. As here shown, said shaft is provided with a notch 925 (Fig. 47) which is adapted to be moved into alinement with a vertically reciprocating member 926 provided with a slot 929 engaging studs 927 and 928 on the machine frame (Fig. 57). This bar is normally spring-pressed upward by spring 930, one end of which is secured to said bar and the other end to a pin 931. Normally the member 926 engages the unbroken under surface of the shaft 840, but, when the shaft has been shifted so that the notch 925 is immediately above said member, the latter enters the notch 925 and holds shaft 840 in its shifted position against the tension of spring 893. The member 926 is provided with a vertical extension 926a that underlies arm 872, so that, when the arm 872 is depressed into engagement with extension 926a, the latter will be depressed and member 926 removed from notch 925. It is obvious that the arm 872 will depress the member 926 at each depression of said arm. The member 926 elevates as the arm 872 elevates, the shaft 840 being held during this period by cam 923.

It is noted that the shaft 702 is not elevated from depressions 714 and 717 until the amount is accumulated on the accumulator wheels and the carrying-tens mechanism has completed its function. Any racks that have moved forward are held in that position by detents 850 (Fig. 48), hereinafter more fully described, until the shaft 702 is elevated, and are then released and returned to their normal position by springs 846.

14.—Carrying-tens mechanism of the vertical accumulators

Illustrated particularly in Sheets 1—3—8—14—15—19—20—21—23 and 24.

Means are provided whereby the operation of carrying tens is effected by a short supplementary movement of the racks in the same direction in which they are moved to effect the operations of both addition and subtraction. As here shown, nine sets of carrying-tens mechanism are illustrated, one for each of the racks 830 and 831 above the units rack. Each of the racks 830 is provided with a third set of teeth 853 on their lower edge, and means are provided for engaging these teeth at the proper time to move the racks forward a distance of one tooth for the carrying of tens.

Referring particularly to Figs. 48, 51 and 58, 883 is a shaft on which are mounted nine slides 942. As shown in Fig. 58, shaft 883 is slotted on its upper and lower surfaces at 940 and 941, and the bifurcated end 943 of each slide 942 engages each pair of slots. Each of these slides is normally spring-pressed rearwardly (Fig. 48) by a spring 960 engaging a pin 961 on the cross-bar 837 and an extension 948 on the slide. Pivoted to each slide at 944 is a carrying pawl 945 provided with a tooth 946 for engaging the rack teeth 853, and with a laterally projecting lug 952 which is engaged by a tooth 951 on an arm 949 of a bell-crank pivoted on a shaft 950. The other arm 953 of said bell-crank is provided with an elevation 954 which projects in the path of carrying pins 706 on the wheels 700. One face of this elevation is straight and the other face is curved. To the rear end of each carrying pawl 945 is secured one end of a spring 947, the other end of which is secured to extension 948 on slide 942. This spring tends to force the tooth 946 upwardly into engagement with rack teeth 853 as soon as the bell-crank 949—953 is swung to disengage tooth 951 from lug 952. This disengagement takes place when the carrying pin 706 engages the elevation 954 and at once the tooth 946 is engaged with a rack tooth 853. The bell-crank lever is held in the position shown in Fig. 48, with the elevation 954 in the path of carrying pin 706, by springs 955, one end of each spring being secured to the lower end of arm 949 and the other end to a pin on cross-bar 836.

Arranged below carrying pawls 945, and mounted in the side frames of the machine, is the shaft 888 on which is mounted a plurality of arms 956, each of which is provided with a lateral extension 957. Nine of these arms are provided, one for each of the carrying pawls 945, and said arms are placed circumferentially around the shaft 888 and at about an angle of 33 degrees apart, so that the carrying-tens mechanism for the wheels shall be successively operated; that is to say, for the tens wheel first, the hundreds wheel second, and so on. Each carrying pawl 945 is provided with a second lateral projection 958 which, during the normal operation of the machine, will not be engaged by the offset part 957 of arms 956 (Fig. 47). That is to say, if no carrying of tens is to be effected, 957 will pass over the projection 958 without engaging therewith. If, however, carrying is to be effected, 958 of the pawl 945 that has been elevated will lie in the path of rotation of 957, and the latter will thereupon engage the same and move the pawl, thereby imparting to the rack a further supplementary movement corresponding to the distance of one tooth.

On each slide 942 immediately under the rear of carrying pawl 945 is a limiting pin 977 with which the rear end of pawl 945 engages to limit the upper movement of its front end. It will be recalled that the lever 882 is rocked downwardly under the tension of spring 886 when lug 884 enters depression 887 in cam 885 (Fig. 57), and that this operation takes place at or near the end of the rotation of shaft 888. In view of the fact that slides 942 are mounted to participate in the rocking of shaft 883, said slides and the pawls carried thereby will rock downwardly, the extent of this downward movement being sufficient to move lugs 952 on pawls 945 beneath the teeth 951 on bell-crank arm 949. As soon as the parts reach this position, springs 955 will move the arms 949 to the right (Fig. 48), thereby engaging the teeth 951 with lugs 952. As the lug 884 again engages the unbroken surface of cam 885, the shaft 883 will be rotated in a reverse direction and the parts returned to the normal position shown in Fig. 48.

It is also desirable that the parts, including the racks and pinions, should move a predetermined distance and be held in that position; and desirable that pinions 841 should be held in proper position with respect to wheels 700 in order that the latter, when they are elevated from depressions 714 and 717, should engage their aligner rods 711 in the proper positions. Accordingly, an alining and holding mechanism is provided which performs its functions more particularly when the accumulating wheels are being rotated and the carrying of tens effected. These means consist of a plurality of detents 850 slidable in slots 849 in a plate 848 (Fig. 55) secured to cross-bar 836. Each detent is provided with a forward projection 851 that extends through slots 849a in the front of said plate, and the spring 852 for each detent tends to elevate the same. Arranged above said projections 851, and normally in engagement therewith, is the free extremity of a bail 854 secured to a shaft 855 mounted in side frames of the machine. To one end of said shaft is pinned a downwardly projecting arm 856 to which is secured one end of a spring 867, the other end of which is secured to a pin 868 on the machine frame. This arm 856 engages a pin 857 carried by an upwardly projecting arm 858 mounted on a bar 859 provided with slots 863 and 864 through which extend screw studs 861 and 862, respectively, so that said bar may have a slight reciprocating movement. The rear end of this bar is adapted to be engaged by the cam 860 mounted on main cam shaft 1171. When the unbroken part of cam 860 engages the end of bar 859, the bail 854 is maintained in engagement with projections 851, and the detents 850 are held in the position shown in Fig. 54. On the other hand, when the cut-away portion of cam 860 permits the bar 859 to move to the left (Fig. 54), the shaft 855 is rocked, bail 854 is removed from the projections 851, and the detents 850 are promptly elevated by their springs 852 into engagement with teeth 853 on the racks. This engagement takes place at the end of the accumulating movement. Immediately thereafter, certain of the racks are moved forward by the mechanism for effecting the carrying of tens, as heretofore described, and such racks as are moved forward will act to displace their corresponding detents 850 so that the latter will engage the next succeeding tooth 853 of the rack or racks so moved.

Upon the completion of the rotation of cam shaft 1171, the unbroken face of the cam 860 will again engage the end of bar 859, moving the same to the right and rocking bail 854 into engagement with projections 851—thus depressing detents 850 to the position shown in Fig. 54 and releasing the racks, which, under the influence of their springs 846, will be returned to their normal position.

The shaft 888 (see Figs. 1 and 56), on which is mounted the arms 956, is provided on the left-hand extremity with a gear 971 having a disk 972 integral therewith, said disk and gear being loosely mounted on said shaft. An arm 973 is secured to the shaft 888 and rotates therewith. This arm has a pawl 974 pivoted thereto, and a spring 975 holds said pawl in engagement with the face of the disk 972. This disk is provided with a depression or tooth against which said pawl is adapted to engage, so that the shaft 888 will be rotated upon the return movement of the rack 965. It will be noted, however, that, by reason of the mounting of the gear and disk above referred to, no rotation of the shaft 888 will be effected on the initial or rearward movement of the rack. The rack 965 is connected by a link 962 to an extension 187a of the arm 187 that rotates shaft 172, heretofore described, and is mounted on a bracket 966 by rack studs engaging a slot 968 in bar 967 of said bracket.

It is pointed out that the slides 213 and their associated racks move forward during the first half of the revolution of cam shaft 1171, and during this time bar 859 engages the unbroken surface of cam 860, and the detents 850 are depressed. During the last half of the rotation of said cam shaft, carrying of tens is effected for both the horizontal and vertical accumulators, this operation for the vertical accumulators being effected by a short supplementary movement of the racks in the same forward direction as for addition and subtraction.

*15.—Totalizing key for the vertical accumulators for operating of total and subtotals*

Illustrated particularly in Sheets 1—3—4—8—15—19—21 and 23.

In order to perform the operation of bringing the accumulating wheels 700 back to zero, and for taking a sub-total of any amount accumulated on any row of the wheels 700, a so-called totalizing key 1000 is provided. This key has a lever 1001 which is pivoted on shaft 902 and is provided with a rearward extension 1001a connected to a downwardly projecting link 1007, Fig. 56, the lower end of which link is slotted at 1008 and is engaged by a pin 1009 carried on the free end of an arm 1010 pinned to shaft 792. It will be recalled that the mechanism for swinging the stop cylinder bails or erase mechanism is operated from this shaft 792, and it will be recalled that, in the operations of total and sub-total of the horizontal accumulator, it is first necessary to swing aside the bails 58 in order that the drop arms 222 on the slides 213 may be able to go forward unobstructed. Accordingly, the first effect of the depression of the totalizing key 1000 is to rotate shaft 792 and swing aside bails 58. The detent 213b (Fig. 56), pivoted at 213c to the frame of the machine, heretofore described for totalizing in the horizontal accumulator, is provided with an extension that projects forwardly over a pin 1025a secured to link 1007. It will be recalled that this detent 213b normally holds inactive the tenth slide 213, and, when said detent is rocked, this slide will be released in order that it may go forward with the other slides in a totalizing operation. It will be understood from the connections described that this detent will be so released when the link 1007 is elevated by the depression of the totalizing key 1000.

In clearing the totalizer, or when it is desired to secure sub-totals, it will be appreciated that the arms 953 (Fig. 48), which carry the elevations 954, must be prevented from moving downwardly when engaged by pins 706, as, in the operation of total and sub-total, the elevations 954 must act as stops. This is effected by providing a totalizing bar 1020 (Figs. 56 and 59) which will prevent the arms 953 from swinging downwardly when engaged by the pins 706. Said bar is provided with slots 1023 which are normally arranged in line with arms 953. When the bar 1020 is moved to the right (Fig. 59), the arms 953 will be over a solid portion of the bar so that they cannot be depressed. This bar 1020 is provided on its left-hand extremity (Fig. 56) with a rack 1017 which meshes with a segment 1016 pinned to a shaft 1015 mounted in brackets on the side frame of the machine. A segment 1014 is pinned to the front end of said shaft 1015 and meshes with a rack 1013 on a vertically reciprocating bar 1012 provided with a slot so that it is slidable over studs 910a and 911a, heretofore described, with respect to reciprocating member 908. This bar 1012 is normally held in an elevated position by means of spring 1030, one end of which is secured to stud 910a and the other end to pin 1031. The totalizing key lever 1001 bears on the top of said bar 1012 and acts to depress the same against the tension of said spring 1030, thus rocking shaft 1015 and displacing longitudinally the bar 1020 to bring the solid portion thereof under the end of arms 953.

The totalizing lever 1001 is provided with a laterally projecting lug that engages over the lever 901 of the subtraction key 900, so that depression of the totalizing key will act to maintain the pinions 841a in mesh with the subtraction racks 831—it being noted that, in a totalizing operation, the amount on the figure wheels must be subtracted to bring the wheels back to zero, or, in other words, the wheels rotated in a direction the reverse of that for addition.

Means are provided for locking the totalizing lever in its depressed condition, said means consisting of a lug 1002 on the totalizing lever 1001 (similar to lugs 903 and 873 heretofore described). A detent 1003 (Fig. 1), pivoted on shaft 876, is provided with a spring 1006 that normally holds said detent in position shown in Fig. 1. When the totalizing lever 1001 is depressed, the tooth 1004 of the detent 1003 engages lug 1002 that holds the totalizing lever depressed. Said detent 1003 is provided with a downwardly extending projection 1005a that is adapted to be engaged to release the totalizing lever 1001. As here shown, the means for effecting this tripping or unlocking is carried on the rack 965 which rotates shaft 888, said means consisting of a tappet 1026 (Fig. 56) normally pressed upwardly by spring 1028, one end of which is connected to a pin 1029, the other end to the arm 1026a of the tappet 1026. A pin 1027 limits the upward movement of said tappet under the influence of said spring. As the rack 965 moves rearward, the tappet engages the projection 1005a and, in view of its yielding mounting, passes the same. Upon the return movement of the rack 965, the tappet 1026 engages projection 1005a and causes the detent to rock on the shaft 876, thereby releasing the totalizing lever 1001.

In the operation of taking a sub-total, it is only necessary that the detents 850 be held in their normal position to prevent them from engaging the rack teeth 853. Accordingly, a lug 1040 (Figs. 32 and 54) is secured to the end of shaft 855 on which bail 854 is mounted, and when the indicator 370 is moved to the sub-total position for the vertical accumulators, a downwardly extending arm 375a, secured to bar 375 heretofore described, will be moved into position immediately above said lug 1040, and will prevent the shaft 855 from rotating. A depression of the totalizing key 1000 actuates the same means as for taking a total.

*16.—Operations and actuation of the vertical accumulators, and operations of the same in combination with the horizontal accumulator*

As heretofore described, the racks rotating the accumulator wheels 700 of a vertical accumulator, are moved forward by the main slides 213. The forward movement of the racks will add the amount to or subtract the amount from any vertical accumulator. The forward movement of the racks will return the accumulator wheels 700 of any vertical accumulator to zero in a totalizing operation.

When it is desired to add an amount set up in the machine to a vertical accumulator only, the manual operations necessary are to aline the desired vertical accumulator. This is effected when, by pressing the key 762, the desired column on the paper-carriage is opposite the printing mechanism. Then depress the addition bar 728 and the non-accumulating key 327. The depression of the non-accumulating key 327 will actuate the means to engage the clutch of the machine as heretofore described. The slides 213 with drop arms 222 will go forward to contact with the set up stops 45 and the bails 58 of the rows where no stops are set. The forward movement of slides 213 will move the racks forward and, by the means described, the amount will be introduced in the alined vertical accumulator. The amount accumulated will be printed in the given position along the platen as described.

To subtract an amount from a vertical accumulator, the operation is the same, excepting that the subtraction key 900 and the non-accumulating key 327 are depressed.

To take a total of a vertical accumulator, aline the accumulator, depress the totalizing key 1000 and the non-accumulating key 327.

To take a sub-total, aline the accumulator, depress the totalizing key 1000, and move the indicator 370 to the third position before depressing the non-accumulating key 327.

To add an amount set up in the machine to a vertical accumulator and simultaneously to the horizontal accumulator, aline the vertical accumulator, depress the addition bar 728 and the addition bar 301. The addition bar 301 will actuate the clutch of the machine, as heretofore described.

To subtract an amount set up in the machine from a vertical accumulator and simultaneously from the horizontal accumulator, aline the vertical accumulator, depress the subtraction key 900 and the subtraction key 325. The latter will actuate the clutch.

To add an amount set up in the machine to a vertical accumulator and simultaneously subtract it from the horizontal accumulator, aline the vertical accumulator, depress the addition bar 728 and the subtraction key 325.

To subtract an amount set up in the machine from a vertical accumulator and simultaneously add it to the horizontal accumulator, aline the vertical accumulator, depress the subtraction key 900 and the addition bar 301.

To simultaneously add the total of the horizontal accumulator to a vertical accumulator, aline the vertical accumulator, depress the addition bar 728 and the totalizing key 350.

To simultaneously add the sub-total of the horizontal accumulator to a vertical accumulator, aline the vertical accumulator, turn the indicator 370 to the second position, (the double star) depress the addition bar 728 and the totalizing key 350.

To simultaneously subtract the total of the horizontal accumulator from a vertical accumulator, aline the vertical accumulator, depress the subtraction key 900 and the totalizing key 350.

To simultaneously subtract the sub-total of the horizontal accumulator from a vertical accumulator, aline the vertical accumulator, turn the indicator 370 to the second position (double star), depress the subtraction key 900 and the totalizing key 350.

To simultaneously add the total of a vertical accumulator to the horizontal accumulator, aline the vertical accumulator, depress the totalizing key 1000 and the addition bar 301.

To simultaneosly add the sub-total of a vertical accumulator to the horizontal accumulator, aline the vertical accumulator, turn the indicator 370 to the third position, depress the totalizing key 1000 and the addition bar 301.

To simultaneously subtract the total of a vertical accumulator from the horizontal accumulator, aline the vertical accumulator, depress the totalizing key 1000 and the subtraction key 325.

To simultaneously subtract the sub-total of a vertical accumulator from the horizontal accumulator, aline the vertical accumulator, turn the indicator 370 to the third position, depress the totalizing key 1000 and the subtraction key 325.

The mechanism for accumulating by adding the total or the sub-total of the horizontal accumulator to a vertical accumulator, or subtracting the same therefrom; or adding the total or sub-total of a vertical accumulator to the horizontal accumulator, or subtracting the same therefrom, is the same as shown in the illustrations and heretofore described. No other means than those described are required.

It has been explained that the actuation of the manual operating devices of the vertical accumulators do not engage the clutch of the machine. The machine is thus adaptable to all operating conditions and the operator need not put forth any effort to simultaneously depress the manual operating devices when computing simultaneously in the two computing constructions. The clutch is operated only by keys 325, 327 and 350 and addition bar 301 (Fig. 4).

Amounts set up in the machine and simultaneously computed in the horizontal accumulator and one of the vertical accumulators will give two corresponding totals, an indisputable mechanical proof. If amounts are computed in several of the vertical accumulators and these amounts are simultaneously computed in the horizontal accumulator, the horizontal accumulator will produce the grand total. As the vertical accumulators are totalized, the totalizations may be simultaneously computed, by transfer, in the horizontal accumulator, and, if the mechanical functions have been correct, the grand total of the vertical accumulators will correspond with the previous grand total of the horizontal accumulator. It is pointed out that the amounts and the totals, excepting the second grand total, are only printed once. Thus horizontal and vertical computing can be done simultaneously with the printing of the entry or amount on the paper.

It is noted that the horizontal accumulator can also be actuated independently for addition and subtraction. To add an amount set up in the machine to the horizontal accumulator, depress the addition bar 301. To subtract an amount set up in the machine from the horizontal accumulator, depress the subtraction key 325. The horizontal accumulator is thus adaptable for one column calculations or what is termed straight listing.

If it is desired to accumulate eleven vertical calculations and obtain a grand total: Accumulate the first column in the horizontal accumulator, the second column in the next alined vertical accumulator, and so on. When taking the vertical totals, take a subtotal of the horizontal accumulator and then add the totals of the following columns to the horizontal total.

While one embodiment of the inventive idea has been shown and described in detail, it will be understood that the invention is not so limited, but that the inventive idea is susceptible of various mechanical expressions within the limits of the appended claims.

In the specification and claims, the words "simultaneous" and "simultaneously", are intended to include actions or operations occurring at the same time where any part of the cycles overlap regardless of whether the cycles are initiated or concluded at the same time, or extend concurrently through their entire duration.

What is claimed is:—

1. In a machine of the class described, the combination of a registering gear wheel, a rotatable gear wheel of the design set forth and movable laterally in respect to said registering gear wheel, racks positioned on opposite sides thereof and united for concurrent reciprocation, means for keeping said second gear wheel and either rack engaged during movement of the latter in both directions, and means to engage the registering gear wheel with the rotatable gear wheel during the movement of the rack in one direction.

2. In a machine of the class described, the combination of a registering gear wheel, a rotatable gear wheel of the design set forth and movable laterally in respect to said registering gear wheel, racks positioned on opposite sides thereof and united for concurrent reciprocation, means for keeping said second gear wheel and either rack engaged during movement of the latter in both directions, means to engage the registering gear wheel with the rotatable gear wheel during the movement of the rack in one direction, and means for preserving engagement between the gear wheels during movement of the racks in both directions.

3. In a computing machine, a plurality of accumulator wheels, a rack for each wheel provided with two rows of teeth one row being offset from the other, a gear for each rack adapted to mesh with its corresponding wheel, a second gear formed integrally with the first and adapted to mesh with the two rows of teeth one row at a time, and means for shifting said gears laterally to move the second gear out of mesh with one row of teeth and into mesh with the other whereby addition and subtraction may be effected by movement of the racks in the same direction.

4. In a computing machine, a shaft, a pair of slotted plates mounted thereon, a shaft mounted in each pair of slots and rotatable about said first-mentioned shaft as a center, a plurality of accumulator wheels on each shaft, and a pair of stationary rings disposed adjacent said slotted plates and holding said shafts in place in said slots.

5. In a computing machine, a shaft, a pair of slotted plates mounted thereon, a shaft mounted in each pair of slots and rotatable about said first-mentioned shaft as a center, a plurality of accumulator wheels on each shaft, and a pair of stationary rings disposed adjacent said slotted plates and holding said shafts in place in said slots, one of said rings being interrupted to permit said shafts being introduced into said slots.

6. In a computing machine, a rotatable shaft, a plurality of rows of accumulator wheels, a shaft on which each row of accumulator wheels is mounted rotating about said first-mentioned shaft as a center, a pair of rings each provided with a depression into which any of said accumulator wheel shafts may be introduced, and means for rotating the wheels on the shaft occupying said depressions.

7. In a computing machine, a rotatable shaft, a plurality of accumulators rotating about said shaft as a center, a pair of rings having depressions to receive an accumulator, and means normally preventing the accumulators engaging in said depressions.

8. In a computing machine, a rotatable motor shaft, a plurality of accumulators rotating about said shaft as a center, an accumulator aligner, a pair of rings having depressions to receive the aligned accumulator and means normally preventing the accumulators engaging in said depressions.

9. In a computing machine, a rotatable motor shaft, a plurality of accumulators rotating therewith, a pair of rings provided with slots, means to align any accumulator with said slots, and means to manually depress an aligned accumulator into said slots, freeing the accumulator wheels from their aligning means and engaging said wheels with the means to rotate the same.

10. In a computing machine, a rotating shaft, a plurality of rows of accumuator wheels rotating therewith, a shaft on which each row is mounted, actuating means for said accumulator wheels, means engaging any desired shaft to position any desired row above the actuating means, means for moving said shaft to engage its wheels with said actuating means and simultaneously locking said positioning means in an inactive position, and means for releasing said positioning means when said shaft is elevated.

11. In a computing machine, a plurality of accumulators mounted to rotate as a group, a spring adapted to turn the group of accumulators in one direction, an aligner or positioning pawl to arrest the rotation of said accumulators, manual means for engaging the accumulator wheels with the means for rotating them, and means automatically displacing and locking the aligner when the accumulator wheels are so engaged to permit rotation of the plurality of accumulators when the engaged accumulator is released from the actuating means.

12. The combination of two computing constructions, one construction comprising a single accumulator and the other construction comprising a plurality of accumulators, a subtracting member for the single accumulator and a totalizing member for, and common to all, of the plurality of accumulators, means controlled by said subtracting member and totalizing member, when actuated, to take a total of any one of the plurality of accumulators and to subtract the amount simultaneously from the single accumulator, and an addition member for the single accumulator, and connections whereby individual entries may be added directly to the single accumulator after the subtracting member and totalizing member have been actuated without clearing the single accumulator.

13. The combination of two computing constructions, one construction comprising a single accumulator and the other construction comprising a plurality of accumulators, a subtracting member for, and common to all, of the plurality of accumulators and a totalizing member for the single accumulator, means controlled by said subtracting member and totalizing member, when actuated, to take a total of the single accumulator and to subtract the amount simultaneously from any one of the plurality of accumulators.

14. The combination of two computing constructions, one construction comprising a single accumulator and the other construction comprising a plurality of accumulators, a totalizing indicator common to both computing constructions, a totalizing member for the single accumulator, a subtracting member for, and common to all, of the plurality of accumulators, and means controlled by said indicator, totalizing member and subtracting member, when said totalizing member and subtracting member are actuated, to take a sub-total of the single accumulator and to subtract the amount simultaneously from any one of the plurality of accumulators.

15. The combination of two computing constructions, one construction comprising a single accumulator, the other construction comprising a plurality of accumulators, a totalizing indicator common to both computing constructions, a totalizing member for and common to all of the plurality of accumulators, a subtracting member for the single accumulator, and means controlled by said indicator, totalizing member and subtracting member, when said totalizing member and subtracting member are actuated, to take a sub-total of one of the plurality of accumulators and to subtract the amount simultaneously from the single accumulator.

16. In a calculating machine, the combination of a plurality of rows of stops, a rack for each row associated with an accumulator wheel, said rack having three sets of teeth, means for engaging one set for addition and a second set for subtraction, and means for engaging the third set for the carrying of tens.

17. In a calculating machine, the combination of a plurality of rows of stops, a rack for each row associated with an accumulator wheel, said rack having three sets of teeth, means for engaging one set for addition and a second set for subtraction, and means for engaging the third set for the carrying of tens in addition and subtraction by a further supplementary movement of the racks in the same direction that they were moved for accumulating.

18. In a calculating machine, the combination of a plurality of rows of stops, a rack for each row associated with an accumulator wheel, said rack having three sets of teeth, means for engaging one set for addition and a second set for subtraction, and means for engaging the third set for the carrying of tens and for aligning said racks.

19. In a computing machine, two independent computing constructions, separate racks for operating the same which are adapted for relative or joint movement, slides to which said racks are connected, means for determining the movement of said slides, and means for releasing said slides to rotate simultaneously wheels in both computing constructions for effecting addition in one construction and subtraction in the other while said racks and slides are moving in one direction.

20. In a computing machine, the combination of a plurality of rows of stops, a series of slides one for each row of stops, a single accumulator, racks for the same actuated from said slides, a plurality of separate accumulators, racks for the same also actuated from said slides and simultaneously with the first-mentioned racks, and means for releasing said slides to rotate simultaneously wheels on the single accumulator and wheels on one of said plurality of accumulators for effecting addition and subtraction while said slides are moving in one direction.

21. In a computing machine, the combination of a plurality of accumulator wheels, a series of racks for the same, means for moving said racks in one direction for addition and subtraction, means for locking said racks against movement in the opposite direction after accumulation is effected, means for imparting a further supplementary movement to the racks for the carrying-tens operation, said locking means again engaging the racks at this time, and means for releasing said locking means to permit movement of said racks in the opposite direction.

22. In a computing machine, the combination of a plurality of accumulator wheels, a series of racks for the same, means for moving said racks in one direction for addition and subtraction, means for locking said racks against movement in the opposite direction after accumulation is effected, means for imparting a further supplementary movement to the racks for the carrying-tens operation, said locking means again engaging the racks at this time, means for releasing said locking means to permit movement of said racks in the opposite direction, and means to restore all displaced parts of the carrying-tens mechanism during one operation of the machine.

23. In a computing machine, the combination of a plurality of accumulators, a series of racks, a rack pinion for each rack, a transfer or carrying-tens mechanism cooperating with the racks, an adding member, a subtracting member, a totalizing member, and a totalizing indicator common to all the accumulators, and common means for actuating the accumulators for a complete operation of addition, subtraction or totalization on the forward movement of said racks, and a sub-total on the forward and rearward movement of the racks.

24. The combination of two computing constructions, one construction comprising a single accumulator, the other construction comprising a plurality of accumulators, an adding member, a subtracting member and a totalizing member for the single accumulator, an adding member, a subtracting member and a totalizing member for and common to all the plurality of accumulators, a totalizing indicator common to both computing constructions, a printing mechanism common to both computing constructions, and means controlled by said devices for simultaneously computing in both constructions and actuating the printing mechanism to record the entry or amount and also to compute separately in either computing construction and simultaneously actuate the printing mechanism to record the amount or entry so computed.

25. In a computing machine having a plurality of accumulators, the combination of a series of racks having two sets of teeth, a rack pinion for each rack, means to engage said pinions with either set of teeth, means for limiting the movement of the racks and the rotation of the rack pinions, a third series of teeth on each rack, a series of movable slides, one for each rack above the unit rack, and transfer pawls mounted on and movable with said slides to coact with said third set of teeth, and means for moving said slides and transfer pawls when said pawls are engaged with said third set of teeth to move the racks and rotate the rack pinions one additional unit in a carrying-tens operation.

26. In a computing machine, the combination of a plurality of accumulators, a series of double racks, a rack pinion for each double rack, means to engage said pinions with either set of racks to determine the operation of addition or subtraction, a series of slides, transfer pawls mounted on said slides to coact with and move successively the double racks to effect the transfer of tens after the double racks have moved to the accumulation position, and means to restore all displaced transfer pawls when the accumulator wheels are disengaged from their actuating means.

27. In a computing machine, the combination of a plurality of independent, self-contained combined adding and subtracting accumulators, each accumulator having a series of accumulator wheels, actuators adapted to rotate the accumulator wheels of two accumulators simultaneously for addition or subtraction, means to totalize either one of the accumulators and means to subtract the amount of said totalization from the other accumulator by the action of totalizing.

28. In a computing machine, the combination of a plurality of accumulators, each accumulator having a series of accumulator wheels, actuators movable in the same direction for rotating the accumulator wheels of two accumulators simultaneously, for additive, subtractive, or sub-total transfer operations, means to sub-totalize either one of the accumulators by movement of the actuators under the control of said accumulator, and means to subtract the amount of said sub-totalization from the other accumulator by a zeroizing operation.

29. In a computing machine, the combination of a plurality of independent, self-contained combined adding and subtracting accumulators, each adapted for direct subtraction by reverse movement of the accumulator wheels and means for actuating two accumulators simultaneously to totalize either one of the accumulators and subtract said totalization by transfer from the other accumulator.

30. In a computing machine, the combination of a plurality of accumulators, and means for actuating two accumulators simultaneously to sub-totalize either one of the accumulators and subtract said sub-totalization by transfer from the other accumulator.

31. In a computing machine, two independent computing constructions, an addition member, subtraction member and totalizing member for each construction, and a single set of means for starting the machine to perform the desired function.

32. In a computing machine, two independent computing constructions, an addition member, subtraction member and totalizing member for each construction, a clutch, and operative connections between said clutch and only one of said addition, subtraction and totalizing members.

33. In a computing machine, two independent computing constructions, an addition member, subtraction member and totalizing member for each construction, a single set of means for starting the machine to perform the desired function, printing mechanism, and a single non-accumulating key for operating the same.

34. In a computing machine, two independent computing constructions, an addition member, subtraction member and totalizing member for each construction, a clutch, operative connections between said clutch and only one of said addition, subtraction and totalizing members, printing mechanism, and a single non-accumulating key for operating the same.

35. In a computing machine, the combination of a plurality of computing constructions, accumulators for the computing constructions, a key board, an entry setting-up mechanism common to the plurality of computing constructions, a printing mechanism, a laterally moving paper carriage, means to operate either of the computing constructions for addition and the carrying of tens, means to simultaneously operate the other computing construction for subtraction and the borrowing of tens, means to actuate the printing mechanism to record the entry added and subtracted, totalizing means for each accumulator, and means under control of said totalizing means to actuate the printing mechanism to record the totals of the accumulators.

36. In a computing machine, the combination of a plurality of computing constructions, accumulators for the computing constructions, a key board, a setting-up mechanism common to the plurality of computing constructions, a printing mechanism, a laterally moving paper carriage, totalizing members for the computing constructions, means to operate either computing construction to move the accumulator wheels of the cooperating accumulator to zero, means to actuate the printing mechanism to record the amount, and means to simultaneously operate the other computing construction for subtraction and the borrowing of tens of the amount of the totalization recorded.

37. In a computing machine, the combination of a plurality of computing constructions, accumulators for the computing constructions, a key board, a setting-up mechanism common to the plurality of computing constructions, a printing mechanism, a laterally moving paper carriage, sub-totalizing members for the computing constructions, means to operate either computing construction to move the accumulator wheels of the cooperating accumulator to zero and return to the normal position, means to actuate the printing mechanism to record the amount, and means to simultaneously operate the other computing construction for subtraction and the borrowing of tens of the amount of the sub-totalization recorded.

38. In a computing and recording machine, the combination with a plurality of accumulators comprising in part a series of accumulator wheels, primary and secondary actuators, wherein the secondary actuators may have a deferred return movement, means to advance said actuators simultaneously, means to rotate the accumulator wheels of the accumulator coacting with said primary actuator in both directions beyond the carrying position, means to rotate the accumulator wheels of the accumulator coacting with the secondary actuator in both directions beyond the carrying position, and means to record the rotation of the accumulator wheels of the different accumulators from the carrying position.

39. In a computing and recording machine, the combination with a plurality of computing constructions, a printing mechanism, a device for holding paper in the path of the printing mechanism, a plurality of independent self-contained combined adding and subtracting accumulators each comprising in part a series of accumulator wheels adapted to rotate forwardly or reversely, controlling means to actuate simultaneously the plurality of computing constructions one for adding and the other for subtracting, means to selectively engage the accumulators with the computing constructions for additive or subtractive operation, totalizing means for each computing construction, and means under control of said totalizing means to actuate the printing mechanism to record the totals of the accumulators.

40. The combination with the total and subtotal keys of a multiple accumulator computing machine and mechanism whereby a total or a subtotal may be printed on operating said keys, a plurality of computing constructions either of which may be operated as a primary actuator, connections between said total keys and said primary actuator to rotate the accumulator wheels of its coacting accumulator to zero, a subtracting member, a secondary actuator, and connections between said member and said secondary actuator when said member is operated to decrease the accumulation of its coacting accumulator the amount of the total or the subtotal resulting from the operation of the primary actuator.

41. In a multiple accumulator computing machine, the combination with a plurality of accumulators, actuating devices for said accumulators, a rotatable shaft associated with said accumulators to position different accumulators to coact with said actuating devices, a spring for rotating said shaft, a laterally movable paper-carriage, a printing mechanism, connections between said shaft and paper-carriage comprising a rack on the paper-carriage, a gear on said rotatable shaft, a shaft with gearing connections to said rack and gear to positively position the paper-carriage in respect to the printing mechanism as the different accumulators are moved to coact with the actuating devices, a positioning device to retain an accumulator alined with said actuating devices, means to engage the alined accumulator with the actuating devices, means to automatically displace said positioning device when the alined accumulator is engaged with the actuating devices, and means to automatically reset said positioning device as the rotatable shaft again rotates.

42. In a multiple accumulator computing machine, the combination with a plurality of accumulators, actuating devices for said accumulators, a rotatable shaft associated with said accumulators to position different accumulators to coact with said actuating devices, a spring for rotating said shaft, a positioning device to retain an accumulator alined with said actuating devices, means to engage the alined accumulator with the actuating devices, means to automatically displace said positioning device when the alined accumulator is engaged with the actuating devices, and means to reset said positioning device as the rotatable shaft again rotates.

43. The combination of two computing constructions, one construction comprising a single accumulator, the other construction comprising a plurality of accumulators, a sub-totalizing member for and common to all of the plurality of accumulators, a subtracting member for the single accumulator, and means controlled by said subtotalizing member and subtracting member, when said subtotalizing member and subtracting member are actuated, to take a subtotal of one of the plurality of accumulators and to subtract the amount simultaneously from the single accumulator.

44. In a computing machine, the combination of a plurality of self-contained independent accumulators, actuating devices common to the plurality of accumulators, means for controlling the aforesaid independent accumulators so that they will be simultaneously operated by said actuating devices to add a series of amounts to one of said accumulators when subtracting said series of amounts from another accumulator, or to subtract from one accumulator when adding into another accumulator, totalizing means for said accumulators, a printing mechanism, and means under control of said totalizing means to move the accumulators to zero and record the totals.

45. In a computing machine, the combination of a plurality of self-contained independent accumulators, each having means whereby it may be selectively conditioned at will for addition or for subtraction, actuating devices common to the plurality of accumulators, means for controlling the aforesaid independent accumulators so that they will be simultaneously operated by said actuating devices to subtract a series of amounts from one of said accumulators when adding said series of amounts to another accumulator, or to add to one accumulator and subtract from another accumulator, totalizing means for said accumulators, a printing mechanism, and means under control of said totalizing means to move the accumulators to zero and record the totals.

46. The combination of two computing constructions, each having adding means, subtracting means, and totalizing means, including accumulators embodying a series of accumulator wheels, actuators movable in the same direction for rotating the accumulator wheels of the two constructions simultaneously for additive, subtractive, or transfer operations, means to totalize either one of the accumulators by the movement of the actuators under the control of said accumulator by restoring the accumulator elements to zero, a printing mechanism common to both computing constructions, and means controlled by said adding and subtracting means for simultaneously computing in both constructions and for varying the character of operation as to addition or subtraction and actuating the printing mechanism to record the entry or amount either added or subtracted and also to compute separately in either computing construction and simultaneously actuate the printing mechanism to record the entry or amount added or subtracted, said totalizing means being adapted to record the totals of the accumulators.

47. The combination of two computing constructions, accumulators for said constructions, adding means, subtracting means and totalizing means for the computing constructions, a printing mechanism common to both computing constructions, and means controlled by said adding and subtracting means for simultaneously computing in both constructions regardless of the computation then being performed and for varying the character of operation as to addition or subtraction and actuating the printing mechanism to record the entry or amount either added or subtracted, and said totalizing means being adapted to record the totals of the accumulators.

48. The combination of two computing constructions, accumulators for said constructions, adding means, subtracting means and sub-totalizing means for the computing constructions, a printing mechanism common to both computing constructions, and means controlled by said adding and subtracting means for simultaneously computing in both constructions varying the character of operation as to addition or subtraction and actuating the printing mechanism to record the entry or amount either added or subtracted, and said sub-totalizing means to record subtotals of the accumulators.

49. In a computing machine, the combination of a plurality of independent self-contained combined adding and subtracting accumulators, a series of rotatable gears for each accumulator, means for actuating two accumulators simultaneously to add items or amounts to either accumulator when subtracting said items or amounts from the other accumulator, a printing mechanism, a totalizing means for each accumulator actuated to rotate the rotatable gears to zero and record the degree of said rotation and means for selectively determining whether the respective accumulators will add or subtract.

50. In a computing machine, the combination of a plurality of accumulators, each having a series of rotatable gears, means movable in the same direction for actuating two accumulators simultaneously to add items or amounts to both accumulators or to subtract items or amounts from both accumulators or to transfer a subtotal from one accumulator to another, a printing mechanism, a sub-totalizing means for each accumulator actuated to rotate the rotatable gears to zero by the movement of the actuators under the control of said accumulator and record the degree of said rotation and reaccumulate for subsequent operations.

51. In a computing machine, the combination of a plurality of accumulators, a series of rotatable gears for each accumulator, means for actuating two accumulators simultaneously to add items or amounts to either accumulator and subtract said items or amounts from the other accumulator, a printing mechanism, a sub-totalizing means for each accumulator actuated to rotate the rotatable gears to zero and record the degree of said rotation and reaccumulate for subsequent operations.

52. In a computing machine, two independent computing constructions, separate racks for operating the same, master means to which said racks are connected, means for determining the movement of said master means, means for releasing said master means to rotate wheels in both computing constructions for effecting addition in one construction and subtraction in the other construction, a printing mechanism, a totalizing means, and means to actuate said totalizing means to record totals and subtotals.

53. In a computing machine, two independent computing constructions, separate racks for operating the same, master means to which said racks are connected, means for determining the movement of said master means, means for releasing said master means to rotate wheels in both computing constructions for effecting subtraction in one construction and addition in the other construction, a printing mechanism, a totalizing means, and means to actuate said totalizing means to record totals and subtotals.

54. In a computing machine, two independent computing constructions, separate racks for operating the same, master means to which said racks are connected, means for determining the movement of said master means to rotate wheels in both computing constructions for effecting addition in both constructions or subtraction in both constructions, a printing mechanism, a totalizing means, and means to actuate said totalizing means to record totals and subtotals.

55. The combination with the total and subtotal keys of a multiple accumulator computing machine and mechanism whereby a total or a subtotal may be printed on operating said keys, a plurality of computing constructions, means for actuating said computing constructions simultaneously, a plurality of independent combined adding and subtracting accumulators selectively coacting with the respective computing constructions, and means for selectively determining the cooperation of the accumulators with the respective computing constructions to add with provisions to vary the character of computation by rotating the accumulator wheels to subtract or to simultaneously operate a plurality of the accumulators.

56. The combination with the total and subtotal keys of a multiple accumulator computing machine and mechanism whereby a total or a subtotal may be printed on operating said keys, a plurality of separate computing constructions each comprising accumulator wheels and actuators therefor actuating said computing constructions simultaneously when set for addition and subtraction respectively, means under control of the total and subtotal keys to move an accumulator to zero by reverse movement of the actuators.

57. The combination of a plurality of computing constructions, independent accumulators for the computing constructions, a keyboard, an entry setting-up mechanism common to the plurality of computing constructions, a printing mechanism, a laterally moving paper-carriage, means to operate the computing constructions for simultaneous addition and subtraction, means to record items added and subtracted, totalizing means for the accumulators, and means under the control of the totalizing means to record the computations.

58. In a calculating machine, the combination with the frame thereof, and a travelling carriage, of actuators, keys whose setting determines the extent of movement of the actuators when the machine is operated, a shiftably mounted group of accumulators mounted on said frame so as to be stationary in relation to the travel of said carriage, said accumulators being independently movable toward and away from the actuators for the purpose of engagement therewith or disengagement therefrom, means to automatically shift the group of accumulators to position a desired accumulator so that it will be adapted for co-operation with the actuators, and means common to the group of accumulators adapted to move the selected accumulator into or out of engagement with the actuators.

59. In a calculating machine, the combination with a travelling carriage and a platen carried thereby, of actuators, keys whose setting determines the extent of movement of said actuators when the machine is operated, a printing group adapted to print on paper carried by said platen the complete number determined by the setting of said keys and the movement of the actuators, operating means for putting the machine through its cycle of movements, a series of independent shiftably mounted accumulators each of which is independently movable toward and away from the actuators for the purpose of engagement therewith or disengagement therefrom, said accumulators being adapted to be successively positioned for co-operation with the actuators on successive tabulations of the carriage and operations of the machine, and driving means controlled by the travel of the carriage whereby the series of accumulators are shifted in step-by-step fashion as the carriage tabulates, and are returned to initial position when the carriage is returned to its starting point.

60. In a calculating machine, the combination with a travelling carriage and a platen carried thereby, of actuators, keys whose setting determines the extent of movement of said actuators when the machine is operated, a printing group adapted to print on paper carried by said platen the complete number determined by the setting of said keys and the movement of the actuators, operating means for putting the machine through its cycle of movements, a rotatable reel of independent accumulators each of which is independently movable toward and away from the actuators for the purpose of engagement therewith or disengagement therefrom, said accumulators being adapted to be successively positioned for co-operation with the actuators on successive tabulations of the carriage and operations of the machine, a driving connection between the carriage and the reel, whereby the reel is turned to shift the series of accumulators in step-by-step fashion as the carriage tabulates, and is turned backward to initial position when the carriage is returned to its starting point, and manually operable means whereby the normal co-operation of the reel and the carriage as aforesaid may be changed to permit selection as between the accumulators.

61. In a calculating machine, the combination with the frame thereof, and a travelling carriage, of a shiftably mounted group of accumulators mounted on said frame so as to be stationary in relation to the travel of the carriage, means operable by the movement of the carriage to shift the group of accumulators to select an accumulator for operation, means common to the group of accumulators adapted to actuate the selected accumulator for the entry of a number therein, and an independent accumulator also mounted on the frame of the machine which is adapted for operation by said accumulator actuating means last-named, whereby the number set up may also be automatically entered in said independent accumulator incidental to control the group of accumulators by the carriage.

62. In a calculating machine, the combination with the frame thereof, and a travelling carriage, of a shiftably mounted group of accumulators mounted on said frame so as to be stationary in relation to the travel of the carriage, means operable by the movement of the carriage to shift the group of accumulators to select an accumulator for operation, means common to the group of accumulators adapted to actuate the selected accumulator for the entry of a number therein, an independent accumulator also mounted on the frame of the machine which is adapted for operation by said accumulator actuating means last-named, and means for automatically selecting said independent accumulator for use conjointly with the automatically selected accumulator of the aforesaid group for the purpose of accumulating amounts or transferring totals or sub-totals incidental to control of the group of accumulators by the carriage.

63. In a calculating machine, the combination with the frame thereof, and a travelling carriage, of a shiftably mounted group of accumulators mounted on said frame so as to be stationary in relation to the travel of the carriage, said accumulators being adapted for addition or subtraction, means operable by the movement of the carriage to shift the group of accumulators to select an accumulator for operation, means common to the group of accumulators adapted to actuate the selected accumulator for the entry of a number therein, an independent combined adding and subtracting accumulator also mounted on the frame of the machine which is adapted for operation by said accumulator actuating means last-named, and means for selecting said independent accumulator for use conjointly with the automatically selected accumulator of the aforesaid group for additive or subtractive operations in the accumulation of amounts or the transferring of totals or sub-totals.

64. In a calculating machine, the combination with a travelling carriage and a platen carried thereby, of actuators, keys whose setting determines the extent of movement of said actuators when the machine is operated, a printing group adapted to print on paper carried by said platen the complete number determined by the setting of said keys and the movement of the actuators, operating means for putting the machine through its cycle of movements, a series of shiftably mounted accumulators each of which is independently movable toward and away from the actuators for the purpose of engagement therewith or disengagement therefrom, said accumulators being adapted to be successively positioned for co-operation with the actuators on successive tabulations of the carriage and operations of the machine, a spring co-operating with the series of accumulators and adapted to shift them, and positive gearing operated by the carriage as it moves from one tabulated position to another tabulated position, whereby the series of accumulators are shifted in step-by-step fashion as the carriage is moved from one position to another position.

65. In a calculating machine, the combination with a travelling carriage and a platen carried thereby, of actuators, keys whose setting determines the extent of movement of said actuators when the machine is operated, a printing group adapted to print on paper carried by said platen the complete number determined by the setting of said keys and the movement of the actuators, operating means for putting the machine through its cycle of movements, a rotatable reel of independent accumulators each of which is independently movable toward and away from the actuators for the purpose of engagement therewith or disengagement therefrom, said accumulators being adapted to be successively positioned for co-operation with the actuators on successive tabulations of the carriage and operations of the machine, a helical spring co-operating with said reel of accumulators adapted to turn said reel, and a positive gear drive connecting the carriage and the reel, whereby the reel is turned in co-ordination with the shifting of the carriage.

66. In a machine of the class described, the combination with manipulative devices, actuators controlled thereby, a group of accumulators, a carrier therefor, and means to adjust the carrier to select any of the accumulators for co-operation with the actuators, of means to engage the selected accumulator with, and disengage it from, the actuators, including a plurality of shifting arms engaged by the accumulator as it is selected for operation, and means to shift the arms and accumulator relatively to the carrier.

67. In a machine of the class described, the combination with manipulative devices, actuators controlled thereby, a group of accumulators, a carrier therefor, and means to adjust the carrier to select any of the accumulators for co-operation with the actuators, of means to engage the selected accumulator with, and disengage it from, the actuators, including a plurality of shifting arms engaged by the accumulator as it is selected for operation, means to shift the arms and accumulator relatively to the carrier, means to latch the selected accumulator in engagement with the actuators, and means to release the latching means.

68. In a machine of the class described, the combination with a plurality of accumulators, having projecting portions, and actuators therefor, of an adjustable carrier for the several accumulators, the carrier having slots in which the projecting portions of the accumulators are slidably mounted, means against which the projections abut to retain the accumulators in idle position relative to the actuators, shifting arms with which the projections successively engage as the carrier is adjusted, and means to rock the arms to cause them to engage the selected accumulator with, and to disengage it from, the actuators.

69. In a calculating machine, an accumulator having a rack provided with two sets of teeth disposed in offset relationship to each other.

70. In a calculating machine, an accumulator having a rack provided with two sets of relative offset teeth, one set of which is for an additive operation and the other set for a subtractive operation.

71. In a calculating machine, an accumulator having a rack provided with two sets of teeth disposed in offset relationship to each other, in combination with a single accumulator pinion adapted for engagement with either set of teeth by relative shifting of the rack and pinion, whereby the same direction of travel of the rack may be utilized for an additive or a subtractive operation.

72. In a calculating machine, the combination with actuators, and keys whose value determines the extent of their travel, of an accumulator, and racks having three sets of teeth, two of said sets being independently engageable with the accumulator for additive or subtractive operations, and tens-carrying means engageable with the third set of teeth.

73. In a calculating machine, the combination with a group of accumulators mounted for travel to position them for use, of a travelling carriage, means operatively connecting the group of accumulators with the carriage so that said accumulator group and said carriage are co-ordinated to move in unison in both directions of travel, and spring means for effecting travel of the group of accumulators in one direction and, through the means operatively connecting the group to the carriage, also effecting travel of the carriage in one direction, said carriage when shifted in the opposite direction causing movement of the group in the opposite direction in opposition to the propelling action of said spring means on the group of accumulators.

74. In a calculating machine, the combination with a rotatably mounted reel of accumulators, of a travelling carriage, means operatively connecting the reel with the carriage so that said reel and said carriage are co-ordinated to move in unison in both directions of travel, and spring means co-operating with the reel for turning the reel in one direction and, through the means operatively connecting the reel to the carriage, also effecting travel of the carriage in one direction, said carriage when shifted in the opposite direction causing the turning of the reel in the opposite direction in opposition to the propelling action of said spring means on said reel.

75. In a calculating machine, the combination with a group of accumulators mounted for travel to position them for use, of a travelling carriage, means operatively connecting the group of accumulators with the carriage so that said accumulator group and said carriage are co-ordinated to move in unison in both directions of travel, spring means for effecting travel of the group of accumulators in one direction and, through the means operatively connecting the group to the carriage, also effecting travel of the carriage in one direction, said carriage when shifted in the opposite direction causing movement of the group in the opposite direction in opposition to the propelling action of said spring means on the group of accumulators, and manually operable means for freeing said group of accumulators to the propelling action of the spring means.

76. In a calculating machine, the combination with a group of accumulators mounted for travel to position them for use, of a travelling carriage, means operatively connecting the group of accumulators with the carriage so that said accumulator group and said carriage are co-ordinated to move in unison in both directions of travel, spring means for effecting travel of the group of accumulators in one direction and, through the means operatively connecting the group to the carriage, also effecting travel of the carriage in one direction, said carriage when shifted in the opposite direction causing movement of the group in the opposite direction in opposition to the action of said spring means, detent means for holding the group of accumulators against shifting under the action of the said spring means, and manually operable means controlling said detent means, whereby the group of accumulators may be freed to the propelling action of the spring means.

77. In a calculating machine, the combination with a rotatably mounted reel of accumulators, of a travelling carriage, means operatively connecting the reel with the carriage so that said reel and said carriage are co-ordinated to move in unison in both directions of travel, spring means co-operating with the reel for turning the reel in one direction and, through the means operatively connecting the reel to the carriage, also effecting travel of the carriage in one direction, said carriage when shifted in the opposite direction causing the turning of the reel in the opposite direction in opposition to the action of said spring means, and manually operable means for freeing said reel of accumulators to the propelling action of the spring means.

78. In a calculating machine, the combination with a rotatably mounted reel of accumulators, of a travelling carriage, means operatively connecting the reel with the carriage so that said reel and said carriage are co-ordinated to move in unison in both directions of travel, spring means co-operating with the reel for turning the reel in one direction and, through the means operatively connecting the reel and the carriage, also effecting travel of the carriage in one direction, said carriage when shifted in the opposite direction causing the turning of the reel in the opposite direction in opposition to the action of said spring means, detent means for holding the reel of accumulators against turning under the action of said spring means and manually operable means controlling said detent means whereby the reel of accumulators may be freed to the propelling action of the spring means.

79. In a machine of the class described, the combination with an accumulator, of actuating means therefor, including driving pinions relatively to which the accumulator is engageable and disengageable, reversing gear wheel means associated with each driving pinion, double racks, the respective toothed sections of which are adapted to engage with its respective reversing gear wheel means at different times to effect either addition or subtraction, and means for effecting relative shifting of the reversing gear wheel means, and the racks, whereby the reversing gear wheel means may be engaged with either section of the double rack.

80. In a calculating machine, the combination with accumulator-actuators having two racks, one for addition and the other for subtraction, of a movable accumulator carrier, a plurality of accumulators carried by said carrier, the movement of said carrier bringing said accumulators into position for use, driving pinions relatively to which the respective accumulators are engageable and disengageable when any selected accumulator is brought into position for use, reversing gear wheel means associated with each driving pinion and adapted for selective engagement with the respective racks of the actuators, and means for determining which of said two racks the said reversing gear wheel means will engage at a given time.

81. In a calculating machine, the combination with accumulator-actuators having two racks, one for addition and the other for subtraction, of a movable accumulator carrier, a plurality of accumulators carried by said carrier, the movement of said carrier bringing said accumulators into position for use, driving pinions relatively to which the respective accumulators are engageable and disengageable when any selected accumulator is brought into position for use, reversing gear wheel means associated with each driving pinion and adapted for selective engagement with the respective racks of the actuators, and manually operable means for determining which of said two racks will be engaged by said reversing gear wheel means at a given time.

82. In a calculating machine, the combination with actuators, of a rotatably mounted reel of independent accumulators, driving means for turning said reel of accumulators, detent means for holding the reel in different pre-determined positions of its rotation to determine the selection of an accumulator for use by the actuators, and manually operable means whereby the detent means may be maintained in released condition for any desired period to permit the reel of accumulators to turn to any desired extent, thereby the permit preselection of any accumulator carried by the reel.

83. In a calculating machine, the combination with actuators, of a rotatably mounted reel of independent accumulators, driving means for turning said reel of accumulators, detent means for holding the reel in different pre-determined positions of its rotation to determine the selection of an accumulator for use by the actuators, a travelling carriage co-ordinated with the reel of accumulators, and manually operable means whereby the detent means may be maintained in released condition for any desired period to permit the reel of accumulators to turn to any desired extent, thereby to permit pre-selection of any accumulator carried by the reel.

84. In a calculating machine, the combination with an accumulator, of an actuator therefor adapted for co-operation with said accumulator to effect addition or subtraction on the movement of the actuator in the same direction, said accumulator and actuator being adapted for relative shifting in the direction of the axis of the accumulator wheels to determine whether the actuator and accumulator will engage for the performance of addition or for subtraction.

85. In a calculating machine, the combination with actuators, of a group of shiftably mounted accumulators adapted for co-operation therewith, a travelling carriage adapted to exercise control over the shifting of said accumulators for the purpose of selecting an accumulator for co-operation with said actuators, a totalizer, and means whereby the totalizer may be selected for co-operation with said actuators simultaneously with the accumulator selected from the aforesaid group for the simultaneous performance of addition or subtraction, and transfer of additive or subtractive amounts, sub-totals and totals from either accumulator to the other.

86. In a calculating machine, the combination of two computing constructions, one construction comprising a single accumulator, the other construction comprising a group of selectively used accumulators, a series of double racks for the single accumulator, whereby addition or subtraction may be carried on in said single accumulator, another series of double racks for the group of accumulators, whereby addition or subtraction may be carried on in any selected accumulator of said group, a series of master means to actuate the double racks, and means to determine the movement of said master means.

87. In a computing machine, the combination of a plurality of accumulators, each accumulator having a series of accumulator wheels, actuators movable in the same direction for rotating the accumulator wheels of two accumulators simultaneously for additive and total transfer operations, and means to totalize either one of the accumulators by movement of the actuators under the control of said accumulator by a zeroizing operation.

88. In a multiple accumulator calculating machine, the combination with actuators, of a plurality of accumulators of which one or more is adapted for addition or subtraction, by forward or reverse movement of the same elements while said elements are engaged with the actuators, said accumulators being adapted for addition or subtraction where engaged with the actuators during the same part of the cycle of movement of said actuators, and means to take a total or sub-total from anyone of the accumulators by restoring the accumulator elements to zero.

89. In a calculating machine, the combination with the frame thereof, and a travelling carriage, of a shiftably mounted group of accumulators mounted on said frame so as to be stationary in relation to the travel of the carriage, means operable by the movement of the carriage to shift the group of accumulators to select an accumulator for operation, means common to the group of accumulators adapted to actuate the selected accumulator for the entry of a number therein, and manually operable means directly controlling said group of accumulators, whereby the normal sequence of co-operation of the group of accumulators and said actuating means may be changed to permit selection as between the accumulators.

90. In a calculating machine, the combination with the frame thereof, and a travelling carriage, of a shiftably mounted group of accumulators mounted on said frame so as to be stationary in relation to the travel of the carriage, gearing operatively connecting the group of accumulators to the carriage so that the group will shift in pre-determined order as the carriage travels, means common to the group of accumulators adapted to actuate the given accumulator which is arranged for use by the tabulated position of the carriage, a spring which is adapted to shift the group of accumulators to normally cause them to successively assume a position which adapts them for co-operation with the actuating means last-named, and means directly controlling said group of accumulators, whereby the group may be freed to the action of the spring to vary the normal relationship of the accumulators to the said actuating means.

91. In a calculating machine, the combination with actuators, keys for determining the extent of movement thereof, and operating means for the machine, of a movable group of accumulators, means for automatically bringing successive accumulators into position for co-operation with the actuators on successive operations of the machine, an additional accumulator adapted for automatic conjoint operation with the selected accumulator on a given operation of the machine, and manually operable means for conditioning said additional accumulator so that it will be adapted to be automatically operable as aforesaid, or for rendering it inoperative at will.

92. In a calculating machine, the combination with actuators, keys for determining the extent of movement thereof, and operating means for the machine, of a movable group of accumulators, means for automatically bringing successive accumulators into position for co-operation with the actuators on successive operations of the machine, an additional accumulator adapted for automatic operation simultaneously with the selected accumulator on a given operation of the machine, and manually operable means for conditioning the said additional accumulator so that it will be adapted to be automatically operable simultaneously with the operation of any selected accumulator of the group of accumulators aforesaid when the selection of said accumulator from said group is effected.

93. In a calculating machine, the combination with actuators, keys for determining the extent of movement thereof, a travelling carriage, and operating means for the machine, of a movable group of accumulators, means operated by the carriage when travelling from one position to another for automatically bringing successive accumulators into position for co-operation with the actuators on successive operations of the machine, an additional accumulator adapted for automatic operation simultaneously with the selected accumulator when the carriage is in a given position of its travel, and manually operable means for conditioning said additional accumulator so that it will be adapted to be automatically operable simultaneously with the operation of the accumulator selected from the group of accumulators.

94. In a calculating machine, the combination with actuators, of a travelling carriage, a shiftably mounted group of accumulators coupled with the carriage for co-ordinated movement therewith, whereby the accumulators will normally shift in a pre-determined order, means for causing said accumulators normally to shift to a pre-determined extent, and manually operable means for sifting the group of accumulators one or more steps on a given actuation of said means.

95. In a calculating machine, the combination with actuators, of a travelling carriage, a rotatably mounted reel having a plurality of independent accumulators, said reel being coupled with the carriage for co-ordinated movement therewith, whereby the reel will normally turn in a pre-determined manner to cause the said accumulators to shift to a pre-determined extent to position them for co-operation with the actuators, driving means for turning the reel of accumulators, and manually operable means whereby the reel of accumulators may be turned one or more steps on a given actuation of said means.

96. In a calculating machine, the combination with actuators, and a paper carriage, of a shiftable group of accumulators mounted separately from said carriage adapted for co-operation with the actuators, and a single manually operable means directly controlling said group of accumulators for determining at will the extent of shifting of the group of accumulators, thereby to pre-determine which accumulator will co-operate with the actuators.

97. In a calculating machine, the combination with a paper carriage, and a rotatably mounted reel of independent accumulators mounted separately from said carriage, of spring means for turning the said reel of accumulators in one direction and permitting said reel to be turned in a reverse direction, actuators with which the respective accumulators may co-operate, and a single manually operable means directly controlling said group of accumulators, whereby the extent of turning of the reel of accumulators by the action of the spring means may be determined at will.

98. In a calculating machine, the combination with a paper carriage, of a rotatably mounted reel of independent accumulators mounted separately from said carriage, of spring means for turning said reel of accumulators in one direction and permitting said reel to be turned in a reverse direction, actuators with which the respective accumulators may co-operate, and a single manually operable means whereby the extent of turning of the reel of accumulators by the action of the spring means may be determined at will, said travelling paper carriage being independent of said manually operable means and co-operatively related to the reel of accumulators, whereby said reel will turn in co-ordinated relationship to the travel of the carriage.

99. In a calculating machine, the combination with the frame thereof, and actuators mounted thereon, of a plurality of accumulators mounted on the frame and adapted for selective co-operation with the actuators, another accumulator adapted for control at will for co-operation with said actuators when desired for either addition or subtraction irrespective of the use of the aforesaid plurality of accumulators, means for effecting transfer of accumulations as between a selected one of the aforesaid plurality of accumulators and said single accumulator, and key-controlled means for selecting one of the first-named accumulators for operation by the actuators for addition or subtraction jointly with the last-named accumulator.

100. In a calculating machine, the combination with the frame thereof, and actuators mounted thereon, of a plurality of accumulators mounted on the frame and adapted for selective co-operation with the same actuators, another accumulator adapted for control at will for co-operation with said actuators when desired for either addition or subtraction irrespective of the use of the aforesaid plurality of accumulators, means for effecting transfer of accumulations as between a selected one of the aforesaid plurality of accumulators and said single accumulator, key-controlled means for selecting one of the first-named accumulators for operation by the actuators for addition or subtraction jointly with the last-named accumulator, and a carriage adapted to exercise selective control on the first-named accumulators, the aforesaid accumulators being mounted independently of the said carriage.

101. In a calculating machine, the combination with the frame thereof, and actuators mounted thereon, of a plurality of accumulators mounted on the frame and adapted for selective co-operation with the same actuators, another accumulator adapted for control at will for co-operation with the said actuators when desired irrespective of the use of the aforesaid plurality of accumulators, means for effecting transfer of accumulations as between a selected one of the aforesaid plurality of accumulators and said single accumulator, and key-controlled means for the respective accumulators to determine the independent or joint co-operation of one of the first-named accumulators and the last-named accumulator with said actuators.

102. In a calculating machine, the combination with actuators movable in the same direction for either additive or subtractive or transfer operations, of a plurality of accumulators adapted for selective co-operation with the actuators for either addition or subtraction, and another accumulator adapted for co-operation with the actuators for additively computing therein or directly subtracting therein by movement of the actuators in the same direction either independently of the first-named accumulator or simultaneously therewith for the performance of either addition or subtraction in the selected accumulator first-named when the actuators are moved in the same direction during the same cycle of operation of the machine, and means for zeroizing any accumulator by movement of the actuators under control of the elements of the said accumulator, said accumulators being adapted for the transfer of amounts from one to the other in a zeroizing operation.

103. In a calculating machine, the combination with actuators movable in the same direction for either additive or subtractive or transfer operations, of a plurality of accumulators adapted for selective co-operation with the actuators, said actuators being common to said plurality of accumulators, by which any accumulator thereof may be selectively independently operated at will for performing either addition or subtraction therein when the actuators are moved in the same direction, another accumulator in which addition or direct subtraction may be performed simultaneously therewith, and means for zeroizing any accumulator by movement of the actuators under control of the elements of the said accumulator, said accumulators being adapted for the transfer of amounts from one to the other in a zeroizing operation.

104. In a calculating machine, the combination with a plurality of accumulators, of actuators therefor, means for totalizing in each of said accumulators, and means whereby the accumulation then standing on either accumulator may be additively or subtractively simultaneously automatically transferred as such to another accumulator during a single cycle of operation of the machine by joint co-operation of a plurality of the accumulators with said actuators when totalizing in either accumulator.

105. In a calculating machine, the combination with a plurality of accumulators, of actuators therefor for the different orders of the accumulators, keys for determining the extent of movement of the actuators, and means for simultaneously subtracting from one of said accumulators by reverse movement of the accumulator elements the amount contained within another of them independently of said keys and during a totalizing operation of the last-named accumulator while those of the accumulators which are used are engaged with the actuators.

106. In a calculating machine, the combination with a plurality of accumulators, of actuators therefor, and means adapted for selective use for addition or subtraction for simultaneously transferring from either accumulator to the other accumulator when totalizing on an accumulator.

107. In a calculating machine, the combination with a main accumulator, of an auxiliary accumulator comprising a plurality of separate accumulators adapted for selective utilization, an addition controlling member, a subtracting controlling member, and a totalizing controlling member for the main accumulator, an addition controlling member, a subtracting controlling member and a totalizing controlling member common to all of the plurality of auxiliary accumulators, a printing mechanism common to the main accumulator and to any selected one of the plurality of auxiliary accumulators, and means to effect simultaneous accumulation in the main accumulator and any selected auxiliary accumulator and to actuate the printing mechanism to record the entry of the item, or, to accumulate separately in the main accumulator or in a selected one of the plurality of auxiliary accumulators and to actuate the printing mechanism to record the entry therein.

108. In a calculating machine, the combination with a plurality of shiftably mounted accumulators, and means for determining the different stopping positions of said plurality of accumulators, of a movable paper carriage, a printing mechanism, means controlled by the position of said accumulators when in their different stopping positions to dispose the paper carriage longitudinally with reference to the printing mechanism, and means to operate the printing mechanism to record the amount accumulated in the selected position of the paper carriage.

109. In a calculating machine, the combination with a shiftably mounted group of accumulators, of a series of double racks, gears selectively engageable with different sections of the double racks for transmitting movement from the racks to a selected accumulator for addition or subtraction, means for determining the extent of travel of the racks, and means for effecting engagement of a selected accumulator with the gears.

110. In a calculating machine, the combination with a shiftably mounted group of accumulators, of differentially movable actuators adapted for co-operation with any selected accumulator of said group for the purpose of addition or subtraction therein, and means for transmitting movement from the actuators to the selected accumulator in either direction of movement for addition or subtraction, respectively, said means being directly engageable with the actuators for either addition or subtraction.

111. In a machine of the class described, the combination with a plurality of accumulators, having projecting portions, actuators therefor, and manipulative devices to control the excursions of the actuators, of an adjustable carrier for the several accumulators, the carrier having slots in which the projecting portions of the accumulators are slidably mounted, means against which the projections abut to retain the accumulators in idle position relative to the actuators, shifting arms having slots lying in the paths of the projections on the accumulators, and with which the projections successively engage as the carrier is adjusted, and means to rock the arms to cause them to engage the selected accumulator with, and to disengage it from, the actuators.

In testimony whereof I have signed this specification.

JOHN G. DUNKER.